(12) United States Patent
Lys et al.

(10) Patent No.: US 7,511,437 B2
(45) Date of Patent: Mar. 31, 2009

(54) METHODS AND APPARATUS FOR HIGH POWER FACTOR CONTROLLED POWER DELIVERY USING A SINGLE SWITCHING STAGE PER LOAD

(75) Inventors: Ihor A. Lys, Milton, MA (US); Igor Shikh, Newton Center, MA (US); Mark David Rabiner, Cambridge, MA (US)

(73) Assignee: Philips Solid-State Lighting Solutions, Inc., Burlington, MA (US)

( * ) Notice: Subject to any disclaimer, the term of this patent is extended or adjusted under 35 U.S.C. 154(b) by 428 days.

(21) Appl. No.: 11/429,715

(22) Filed: May 8, 2006

(65) Prior Publication Data

US 2007/0188114 A1 Aug. 16, 2007

Related U.S. Application Data

(60) Provisional application No. 60/772,136, filed on Feb. 10, 2006.

(51) Int. Cl.
*H05B 37/02* (2006.01)

(52) U.S. Cl. .......................... 315/307; 315/224; 315/247

(58) Field of Classification Search ......... 315/149–152, 315/224–225, 247, 291, 307, 362
See application file for complete search history.

(56) References Cited

U.S. PATENT DOCUMENTS

| | | |
|---|---|---|
| 4,536,631 A | 8/1985 | Tazima et al. |
| 5,640,061 A | 6/1997 | Bornhorst et al. |
| 5,661,645 A | 8/1997 | Hochstein |
| 5,786,992 A | 7/1998 | Vinciarelli et al. |
| 5,994,869 A | 11/1999 | Becerra |
| 6,016,038 A | 1/2000 | Mueller et al. |
| 6,072,280 A | 6/2000 | Allen |
| 6,091,614 A | 7/2000 | Malenfant |
| 6,118,259 A | 9/2000 | Bucks et al. |
| 6,147,458 A | 11/2000 | Bucks et al. |
| 6,150,771 A | 11/2000 | Perry |
| 6,150,774 A | 11/2000 | Mueller et al. |
| 6,154,086 A | 11/2000 | Manolescu |

(Continued)

FOREIGN PATENT DOCUMENTS

WO          03/069958          8/2003

(Continued)

OTHER PUBLICATIONS

Office Action mailed Oct. 31, 2007 from co-pending U.S. Appl. No. 11/079,904.

(Continued)

*Primary Examiner*—David Hung Vu
*Assistant Examiner*—Tung X Le

(57) ABSTRACT

Methods and apparatus for high power factor power transfer to a load using a single switching stage. In exemplary implementations, a controllable variable power may be delivered to a load using a single switching stage while maintaining high power factor, in some cases without requiring any feedback information relating to the load conditions (i.e., without monitoring load voltage and/or current) to control normal switching operations in the single switching stage, and without requiring regulation of load voltage and/or load current. In one example, a single stage high power factor driver is used to control power delivery to an LED-based light source.

45 Claims, 23 Drawing Sheets

U.S. PATENT DOCUMENTS

| | | | |
|---|---|---|---|
| 6,166,496 | A | 12/2000 | Lys et al. |
| 6,211,626 | B1 | 4/2001 | Lys et al. |
| 6,259,613 | B1 | 7/2001 | Lee et al. |
| 6,285,139 | B1 | 9/2001 | Ghanem |
| 6,292,901 | B1 | 9/2001 | Lys et al. |
| 6,304,464 | B1 | 10/2001 | Jacobs et al. |
| 6,320,330 | B1 | 11/2001 | Haavisto et al. |
| 6,340,868 | B1 | 1/2002 | Lys et al. |
| 6,369,525 | B1 | 4/2002 | Chang et al. |
| 6,388,429 | B1 | 5/2002 | Mao |
| 6,441,558 | B1 * | 8/2002 | Muthu et al. .................. 315/149 |
| 6,459,919 | B1 | 10/2002 | Lys et al. |
| 6,461,019 | B1 | 10/2002 | Allen |
| 6,495,964 | B1 | 12/2002 | Muthu et al. |
| 6,510,995 | B2 | 1/2003 | Muthu et al. |
| 6,528,954 | B1 | 3/2003 | Lys et al. |
| 6,531,854 | B2 | 3/2003 | Hwang |
| 6,548,967 | B1 | 4/2003 | Dowling et al. |
| 6,577,080 | B2 | 6/2003 | Lys et al. |
| 6,586,890 | B2 | 7/2003 | Min et al. |
| 6,608,453 | B2 | 8/2003 | Morgan et al. |
| 6,618,031 | B1 | 9/2003 | Bohn et al. |
| 6,624,597 | B2 | 9/2003 | Dowling et al. |
| 6,639,198 | B2 | 10/2003 | Riess et al. |
| 6,667,583 | B2 * | 12/2003 | Kerenyi ....................... 315/219 |
| 6,717,376 | B2 | 4/2004 | Lys et al. |
| 6,720,745 | B2 | 4/2004 | Mueller et al. |
| 6,734,639 | B2 | 5/2004 | Chang et al. |
| 6,768,047 | B2 | 7/2004 | Chang et al. |
| 6,774,584 | B2 | 8/2004 | Lys et al. |
| 6,777,891 | B2 | 8/2004 | Lys et al. |
| 6,781,329 | B2 | 8/2004 | Morgan et al. |
| 6,788,011 | B2 | 9/2004 | Mueller et al. |
| 6,801,003 | B2 | 10/2004 | Schanberger et al. |
| 6,806,659 | B1 | 10/2004 | Mueller et al. |
| 6,807,202 | B1 | 10/2004 | Plamper et al. |
| 6,836,081 | B2 | 12/2004 | Swanson et al. |
| 6,853,150 | B2 | 2/2005 | Clauberg et al. |
| 6,869,204 | B2 | 3/2005 | Morgan et al. |
| 6,883,929 | B2 | 4/2005 | Dowling |
| 6,888,322 | B2 | 5/2005 | Dowling et al. |
| 6,888,383 | B1 | 5/2005 | Fairbanks |
| 6,888,529 | B2 | 5/2005 | Bruning et al. |
| 6,897,624 | B2 | 5/2005 | Ducharme et al. |
| 6,922,022 | B2 | 7/2005 | Bucks et al. |
| 6,930,452 | B2 | 8/2005 | De Krijger et al. |
| 6,930,893 | B2 | 8/2005 | Vinciarelli |
| 6,933,767 | B2 | 8/2005 | Bucks et al. |
| 6,936,978 | B2 | 8/2005 | Morgan et al. |
| 6,940,733 | B2 | 9/2005 | Schie et al. |
| 6,943,504 | B1 | 9/2005 | York |
| 6,965,205 | B2 | 11/2005 | Piepgras et al. |
| 6,967,448 | B2 | 11/2005 | Morgan et al. |
| 6,969,954 | B2 | 11/2005 | Lys |
| 6,975,079 | B2 | 12/2005 | Lys et al. |
| 7,009,348 | B2 | 3/2006 | Mogilner et al. |
| 7,012,413 | B1 | 3/2006 | Ye |
| 7,015,654 | B1 | 3/2006 | Kuhlmann et al. |
| 7,030,572 | B2 | 4/2006 | Nijhof et al. |
| 7,031,920 | B2 | 4/2006 | Dowling et al. |
| 7,038,398 | B1 | 5/2006 | Lys et al. |
| 7,038,399 | B2 | 5/2006 | Lys et al. |
| 7,042,172 | B2 | 5/2006 | Dowling et al. |
| 7,042,743 | B2 | 5/2006 | Pidutti et al. |
| 7,071,630 | B1 | 7/2006 | York |
| 7,154,233 | B2 | 12/2006 | Busse et al. |
| 7,202,608 | B2 | 4/2007 | Robinson et al. |
| 7,215,086 | B2 | 5/2007 | Maxik |
| 7,378,805 | B2 * | 5/2008 | Oh et al. ..................... 315/291 |
| 2002/0038157 | A1 | 3/2002 | Dowling et al. |
| 2002/0044066 | A1 | 4/2002 | Dowling et al. |
| 2002/0048169 | A1 | 4/2002 | Dowling et al. |
| 2002/0070688 | A1 | 6/2002 | Dowling et al. |
| 2002/0074559 | A1 | 6/2002 | Dowling et al. |
| 2002/0078221 | A1 | 6/2002 | Blackwell et al. |
| 2002/0106540 | A1 | 8/2002 | Shioya |
| 2002/0130627 | A1 | 9/2002 | Dowling et al. |
| 2002/0145394 | A1 | 10/2002 | Morgan et al. |
| 2002/0145869 | A1 | 10/2002 | Dowling |
| 2002/0152045 | A1 | 10/2002 | Dowling et al. |
| 2002/0154525 | A1 | 10/2002 | Duerbaum |
| 2002/0158583 | A1 | 10/2002 | Lys et al. |
| 2002/0176259 | A1 | 11/2002 | Ducharme |
| 2003/0011538 | A1 | 1/2003 | Lys et al. |
| 2003/0028260 | A1 | 2/2003 | Blackwell |
| 2003/0057884 | A1 | 3/2003 | Dowling et al. |
| 2003/0057887 | A1 | 3/2003 | Dowling et al. |
| 2003/0057888 | A1 | 3/2003 | Archenhold et al. |
| 2003/0072156 | A1 | 4/2003 | Pohlert et al. |
| 2003/0076281 | A1 | 4/2003 | Morgan et al. |
| 2003/0085749 | A1 | 5/2003 | Xu et al. |
| 2003/0100837 | A1 | 5/2003 | Lys et al. |
| 2003/0107887 | A1 | 6/2003 | Eberl |
| 2003/0133292 | A1 | 7/2003 | Mueller et al. |
| 2003/0161169 | A1 | 8/2003 | Kwon |
| 2003/0169014 | A1 | 9/2003 | Kadah |
| 2003/0189412 | A1 | 10/2003 | Cunningham |
| 2003/0222587 | A1 | 12/2003 | Dowling et al. |
| 2003/0222603 | A1 | 12/2003 | Mogliner et al. |
| 2004/0036006 | A1 | 2/2004 | Dowling |
| 2004/0052076 | A1 | 3/2004 | Mueller et al. |
| 2004/0090191 | A1 | 5/2004 | Mueller et al. |
| 2004/0090787 | A1 | 5/2004 | Dowling et al. |
| 2004/0095185 | A1 | 5/2004 | Bucks et al. |
| 2004/0105261 | A1 | 6/2004 | Ducharme et al. |
| 2004/0113568 | A1 | 6/2004 | Dowling et al. |
| 2004/0116039 | A1 | 6/2004 | Mueller et al. |
| 2004/0130909 | A1 | 7/2004 | Mueller et al. |
| 2004/0145320 | A1 | 7/2004 | Nijhof et al. |
| 2004/0155844 | A1 | 8/2004 | Stopa |
| 2004/0178751 | A1 | 9/2004 | Mueller et al. |
| 2004/0212320 | A1 | 10/2004 | Dowling et al. |
| 2004/0212321 | A1 | 10/2004 | Lys et al. |
| 2004/0212993 | A1 | 10/2004 | Morgan et al. |
| 2004/0264193 | A1 | 12/2004 | Okumura |
| 2005/0029527 | A1 | 2/2005 | Yamamoto et al. |
| 2005/0099824 | A1 | 5/2005 | Dowling et al. |
| 2005/0116667 | A1 | 6/2005 | Mueller et al. |
| 2005/0122065 | A1 | 6/2005 | Young |
| 2005/0151489 | A1 | 7/2005 | Lys et al. |
| 2005/0156583 | A1 | 7/2005 | Nachamiev et al. |
| 2005/0213352 | A1 | 9/2005 | Lys et al. |
| 2005/0213353 | A1 | 9/2005 | Lys |
| 2005/0218828 | A1 * | 10/2005 | Busse et al. .................. 315/224 |
| 2005/0218838 | A1 | 10/2005 | Lys |
| 2005/0218870 | A1 | 10/2005 | Lys |
| 2005/0219872 | A1 | 10/2005 | Lys |
| 2005/0231133 | A1 | 10/2005 | Lys |
| 2005/0236029 | A1 | 10/2005 | Dowling |
| 2005/0236998 | A1 | 10/2005 | Mueller |
| 2005/0253533 | A1 | 11/2005 | Lys et al. |
| 2005/0275626 | A1 | 12/2005 | Mueller |
| 2005/0276053 | A1 | 12/2005 | Nortrup |
| 2006/0002110 | A1 | 1/2006 | Dowling |
| 2006/0012987 | A9 | 1/2006 | Ducharme |
| 2006/0016960 | A1 | 1/2006 | Morgan |
| 2006/0022214 | A1 | 2/2006 | Morgan |
| 2006/0050509 | A9 | 3/2006 | Dowling |
| 2006/0076908 | A1 | 4/2006 | Morgan |
| 2006/0087298 | A1 | 4/2006 | Turchi |
| 2006/0098077 | A1 | 5/2006 | Dowling |
| 2006/0104058 | A1 | 5/2006 | Chemel et al. |
| 2006/0109649 | A1 | 5/2006 | Ducharme et al. |

| | | | |
|---|---|---|---|
| 2007/0285031 A1* | 12/2007 | Shteynberg et al. | 315/294 |

FOREIGN PATENT DOCUMENTS

| | | |
|---|---|---|
| WO | 2004/057924 | 7/2004 |
| WO | 2004/100612 | 11/2004 |
| WO | 2004/100614 | 11/2004 |
| WO | 2005/009086 | 1/2005 |

OTHER PUBLICATIONS

Office Action mailed Dec. 14, 2007 from co-pending U.S. Appl. No. 11/079,461.
Office Action dated May 30, 2007 from co-pending U.S. Appl. No. 11/079,904.
Office Action dated Oct. 2, 2006 from co-pending U.S. Appl. No. 11/079,904.
Notice of Allowance dated Jun. 22, 2007 from co-pending U.S. Appl. No. 11/079,450.
Claims as Allowed from co-pending U.S. Appl. No. 11/079,450.
Office Action dated May 31, 2007 from co-pending U.S. Appl. No. 11/079,450.
Office Action dated Sep. 27, 2006 from co-pending U.S. Appl. No. 11/079,450.
Notice of Allowance dated Feb. 8, 2007 from co-pending U.S. Appl. No. 11/079,928.
Claims as Allowed from co-pending U.S. Appl. No. 11/079,928.
Office Action dated Oct. 16, 2006 from co-pending U.S. Appl. No. 11/079,928.
Office Action dated Jun. 29, 2007 from co-pending U.S. Appl. No. 11/079,905.
Office Action mailed Apr. 7, 2008 from co-pending U.S. Appl. No. 11/079,448.
Notice of Allowance mailed Dec. 14, 2007 from co-pending U.S Appl. No. 11/079,905.
Claims as Allowed from co-pending U.S. Appl. No. 11/079,905, filed Dec. 14, 2007.
Office Action mailed Apr. 3, 2008 from co-pending U.S. Appl. No. 11/079,904.

* cited by examiner

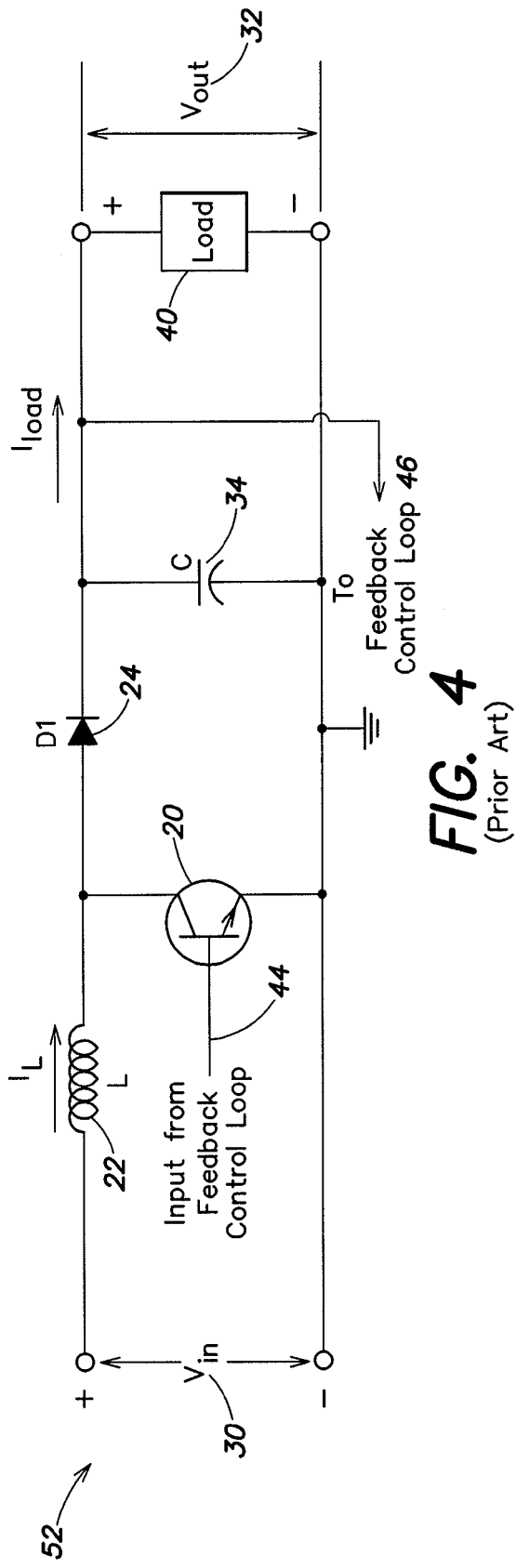
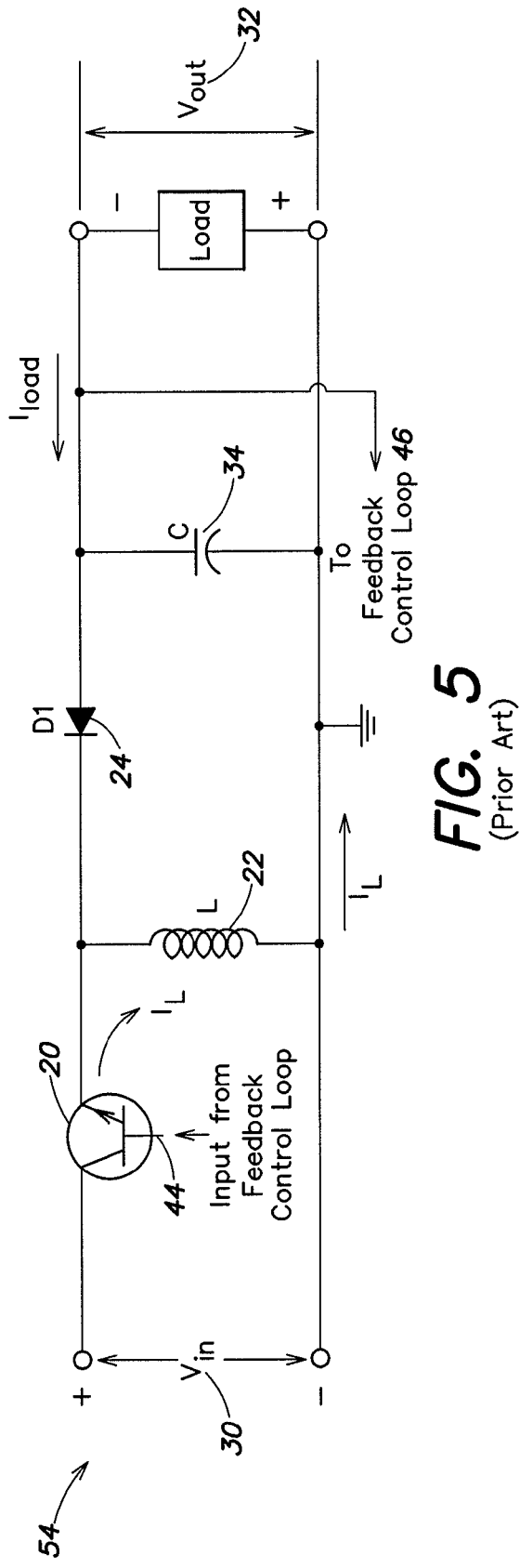
FIG. 4 (Prior Art)
FIG. 5 (Prior Art)

METHODS AND APPARATUS FOR HIGH POWER FACTOR CONTROLLED POWER DELIVERY USING A SINGLE SWITCHING STAGE PER LOAD

CROSS-REFERENCE TO RELATED APPLICATIONS

The present application claims the benefit, under 35 U.S.C. § 119(e), of U.S. Provisional Application Ser. No. 60/772, 136, filed Feb. 10, 2006, entitled "Power Control Methods and Apparatus," which application is hereby incorporated herein by reference.

BACKGROUND

A DC-DC converter is a well-known electrical device that accepts a DC input voltage and provides a DC output voltage. For many applications, DC-DC converters are configured to provide a regulated DC output voltage to a load based on an unregulated DC input voltage; generally, a DC-DC converter may be employed to transform an unregulated voltage provided by any of a variety of DC power sources to a more appropriate regulated voltage for driving a given load. In many common power supply implementations, the unregulated DC input voltage is derived from an AC power source, such as a 120 Vrms/60 Hz AC line voltage which is rectified and filtered by a bridge rectifier/filter circuit arrangement. In this case, as discussed further below, protective isolation components generally are employed in the DC-DC converter to ensure safe operation, given the potentially dangerous voltages involved.

FIG. 1 illustrates a circuit diagram of a conventional step-down DC-DC converter 50 configured to provide a regulated DC output voltage 32 ($V_{out}$) to a load 40, based on a higher unregulated DC input voltage 30 ($V_{in}$). The step-down converter of FIG. 1 also is commonly referred to as a "buck" converter. From a functional standpoint, the buck converter of FIG. 1 generally is representative of other types of DC-DC converters, some examples of which are discussed in turn below.

DC-DC converters like the buck converter of FIG. 1 employ a transistor or equivalent device that is configured to operate as a saturated switch which selectively allows energy to be stored in an energy storage device (e.g., refer to the transistor switch 20 and the inductor 22 in FIG. 1). Although FIG. 1 illustrates such a transistor switch as a bipolar junction transistor (BJT), field effect transistors (FETs) also may be employed as switches in various DC-DC converter implementations. By virtue of employing such a transistor switch, DC-DC converters also are commonly referred to as "switching regulators" due to their general functionality.

In particular, the transistor switch 20 in the circuit of FIG. 1 is operated to periodically apply the unregulated DC input voltage 30 ($V_{in}$) across an inductor 22 (L) for relatively short time intervals (in FIG. 1 and the subsequent figures, unless otherwise indicated, a single inductor is depicted to schematically represent one or more actual inductors arranged in any of a variety of serial/parallel configurations to provide a desired inductance). During the intervals in which the transistor switch is "on" or closed (i.e., passing the input voltage $V_{in}$ to the inductor), current flows through the inductor based on the applied voltage and the inductor stores energy in its magnetic field. When the switch is turned "off" or opened (i.e., the DC input voltage is removed from the inductor), the energy stored in the inductor is transferred to a filter capacitor 34 which functions to provide a relatively smooth DC output voltage $V_{out}$ to the load 40 (i.e., the capacitor provides essentially continuous energy to the load between inductor energy storage cycles).

More specifically, in FIG. 1, when the transistor switch 20 is on, a voltage $V_L=V_{out}-V_{in}$ is applied across the inductor 22. This applied voltage causes a linearly increasing current $I_L$ to flow through the inductor (and to the load and the capacitor) based on the relationship $V_L=L \cdot dI_L/dt$. When the transistor switch 20 is turned off, the current $I_L$ through the inductor continues to flow in the same direction, with the diode 24 (D1) now conducting to complete the circuit. As long as current is flowing through the diode, the voltage $V_L$ across the inductor is fixed at $V_{out}-V_{diode}$, causing the inductor current $I_L$ to decrease linearly as energy is provided from the inductor's magnetic field to the capacitor and the load. FIG. 2 is a diagram illustrating various signal waveforms for the circuit of FIG. 1 during the switching operations described immediately above.

Conventional DC-DC converters may be configured to operate in different modes, commonly referred to as "continuous" mode and "discontinuous" mode. In continuous mode operation, the inductor current $I_L$ remains above zero during successive switching cycles of the transistor switch, whereas in discontinuous mode, the inductor current starts at zero at the beginning of a given switching cycle and returns to zero before the end of the switching cycle. To provide a somewhat simplified yet informative analysis of the circuit of FIG. 1, the discussion below considers continuous mode operation, and assumes for the moment that there are no voltage drops across the transistor switch when the switch is on (i.e., conducting) and that there is a negligible voltage drop across the diode D1 while the diode is conducting current. With the foregoing in mind, the changes in inductor current over successive switching cycles may be examined with the aid of FIG. 3.

FIG. 3 is a graph on which is superimposed the voltage at the point $V_X$ shown in FIG. 1 (again, ignoring any voltage drop across the diode D1) based on the operation of the transistor switch 20, and the current through the inductor $I_L$ for two consecutive switching cycles. In FIG. 3, the horizontal axis represents time t and a complete switching cycle is represented by the time period T, wherein the transistor switch "on" time is indicated as $t_{on}$ and the switch "off" time is indicated as $t_{off}$ (i.e., $T=t_{on}+t_{off}$).

For steady state operation, it should be appreciated that the inductor current $I_L$ at the start and end of a switching cycle is essentially the same, as can be observed in FIG. 3 by the indication $I_o$. Accordingly, from the relation $V_L=L \cdot dI_L/dt$, the change of current $dI_L$ over one switching cycle is zero, and may be given by:

$$dI_L = 0 = \frac{1}{L}\left(\int_0^{t_{on}} (V_{in} - V_{out})\,dt + \int_{t_{on}}^T (-V_{out})\,dt\right)$$

which simplifies to $$(V_{in} - V_{out})t_{on} - (V_{out})(T - t_{on}) = 0$$

or $$\frac{V_{out}}{V_{in}} = \frac{t_{on}}{T} = D,$$

where D is defined as the "duty cycle" of the transistor switch, or the proportion of time per switching cycle that the switch is on and allowing energy to be stored in the inductor. From the foregoing, it can be seen that the ratio of the output voltage to the input voltage is proportional to D; namely, by varying the duty cycle D of the switch in the circuit of FIG. 1, the output voltage $V_{out}$ may be varied with respect to the input voltage $V_{in}$ but cannot exceed the input voltage, as the maximum duty cycle D is 1.

Hence, as mentioned earlier, the conventional buck converter of FIG. 1 is particularly configured to provide to the load 40 a regulated output voltage $V_{out}$ that is lower than the input voltage $V_{in}$. To ensure stability of the output voltage $V_{out}$, as shown in FIG. 1, the buck converter employs a feedback control loop 46 to control the operation of the transistor switch 20. Generally, as indicated in FIG. 1 by connection 47, power for various components of the feedback control loop 46 may be derived from the DC input voltage $V_{in}$ or alternatively another independent source of power.

In the feedback control loop 46 of FIG. 1, a scaled sample voltage $V_{sample}$ of the DC output voltage $V_{out}$ is provided as an input to the feedback control loop 46 (e.g., via the resistors $R_2$ and $R_3$) and compared by an error amplifier 28 to a reference voltage $V_{ref}$. The reference voltage $V_{ref}$ is a stable scaled representation of the desired regulated output voltage $V_{out}$. The error amplifier 28 generates an error signal 38 (in this example, a positive voltage signal over some predetermined range) based on the comparison of $V_{sample}$ and $V_{ref}$ and the magnitude of this error signal ultimately controls the operation of the transistor switch 20, which in turn adjusts the output voltage $V_{out}$ via adjustments to the switch's duty cycle. In this manner, the feedback control loop maintains a stable regulated output voltage $V_{out}$.

More specifically, the error signal 38 serves as a control voltage for a pulse width modulator 36 which also receives a pulse stream 42 having a frequency f=1/T provided by an oscillator 26. In conventional DC-DC converters, exemplary frequencies f for the pulse stream 42 include, but are not limited to, a range from approximately 50 kHz to 100 kHz. The pulse width modulator 36 is configured to use both the pulse stream 42 and the error signal 38 to provide an on/off control signal 44 that controls the duty cycle of the transistor switch 20. In essence, a pulse of the pulse stream 42 acts as a "trigger" to cause the pulse width modulator to turn the transistor switch 20 on, and the error signal 38 determines how long the transistor switch stays on (i.e., the length of the time period $t_{on}$ and hence the duty cycle D).

For example, if the error signal 38 indicates that the sampled output voltage $V_{sample}$ is higher than $V_{ref}$ (i.e., the error signal 38 has a relatively lower value), the pulse width modulator 36 is configured to provide a control signal 44 with relatively shorter duration "on" pulses or a lower duty cycle, thereby providing relatively less energy to the inductor while the transistor switch 20 is on. In contrast, if the error signal 38 indicates that $V_{sample}$ is lower than $V_{ref}$ (i.e., the error signal has a relatively higher value), the pulse width modulator is configured to provide a control signal with relatively longer duration "on" pulses or a higher duty cycle, thereby providing relatively more energy to the inductor while the transistor switch 20 is on. Accordingly, by modulating the duration of the "on" pulses of the control signal 44 via the error signal 38, the output voltage $V_{out}$ is regulated by the feedback control loop 46 to approximate a desired output voltage represented by $V_{ref}$.

Other types of conventional DC-DC converters in addition to the buck converter discussed above in connection with FIG. 1 include, for example, a step-up or "boost" converter which provides a regulated DC output voltage that is higher than the input voltage, an inverting or "buck-boost" converter that may be configured to provide a regulated DC output voltage that is either lower or higher than the input voltage and has a polarity opposite to that of the input voltage, and a "CUK" converter that is based on capacitive coupled energy transfer principles. Like the buck converter, in each of these other types of converters the duty cycle D of the transistor switch determines the ratio of the output voltage $V_{out}$ to the input voltage $V_{in}$.

FIG. 4 illustrates a conventional boost converter 52 and FIG. 5 illustrates a conventional buck-boost converter or inverting regulator 54. Both of these converters may be analyzed similarly to the buck converter of FIG. 1 to determine how the duty cycle D affects the ratio $V_{out}/V_{in}$. FIG. 6 illustrates an example of a "CUK" converter 56, which employs capacitive coupling rather than primarily inductive coupling. The circuit of FIG. 6 is derived from a duality principle based on the buck-boost converter of FIG. 5 (i.e., the relationship between the duty cycle D and the ratio $V_{out/Vin}$ in the CUK converter is identical to that of the buck-boost converter). One noteworthy characteristic of the CUK converter is that the input and output inductors $L_1$ and $L_2$ shown in FIG. 6 create a substantially smooth current at both the input and the output of the converter, while the buck, boost, and buck-boost converters have either a pulsed input current (e.g., see FIG. 2, second diagram from top) or a pulsed output current.

For all of the converters shown in FIGS. 4-6, the details of the voltage regulation feedback control loop have been omitted for simplicity; however, it should be appreciated that like the buck converter shown in FIG. 1, each of the converters shown in FIGS. 4-6 would include a feedback control loop to provide output voltage regulation, as discussed above in connection with FIG. 1.

For many electronics applications, power supplies may be configured to provide a regulated DC output voltage from an input AC line voltage (e.g., 120 $V_{rms}$, 60 Hz). In some power supplies based on switching regulators, an unregulated DC voltage may be provided as an input to a DC-DC converter directly from a rectified and filtered AC line voltage. Such an arrangement implies that there is no protective isolation between the AC line voltage and the DC input voltage to the DC-DC converter. Also, the unregulated DC input voltage to the converter may be approximately 160 Volts DC (based on a rectified 120 $V_{rms}$ line voltage) or higher (up to approximately 400 Volts if power factor correction is employed, as discussed below in connection with FIGS. 8A and 8B), which is potentially quite dangerous. In view of the foregoing, DC-DC converters for such power supply arrangements typically are configured with isolation features to address these issues so as to generally comport with appropriate safety standards.

FIG. 7 is a circuit diagram illustrating an example of such a power supply 66 incorporating a DC-DC converter or switching regulator. As discussed above, the power supply 66 receives as an input an AC line voltage 67 which is rectified by a bridge rectifier 68 and filtered by a capacitor 35 ($C_{filter}$) to provide an unregulated DC voltage as an input $V_{in}$, to the DC-DC converter portion 69. The DC-DC converter portion 69 is based on the inverting regulator (buck-boost) arrangement shown in FIG. 5; however, in FIG. 7, the energy-storage inductor has been replaced with a high frequency transformer 72 to provide isolation between the unregulated high DC input voltage $V_{in}$ and the DC output voltage $V_{out}$. Such a DC-DC converter arrangement incorporating a transformer rather than an inductor commonly is referred to as a "flyback" converter.

In the circuit of FIG. 7, the "secondary side" of the converter portion 69 (i.e., the diode D1 and the capacitor C) is arranged such that the converter provides an isolated DC output voltage. The DC-DC converter portion 69 also includes an isolation element 70 (e.g., a second high-frequency transformer or optoisolator) in the voltage regulation feedback control loop to link the error signal from the error amplifier 28 to the modulator 36 (the error signal input to and output from the isolation element 70 is indicated by the reference numerals 38A and 38B).

In view of the various isolation features in the circuit of FIG. 7, although not shown explicitly in the figure, it should be appreciated that power for the oscillator/modulation circuitry generally may be derived from the primary side unregulated higher DC input voltage $V_{in}$, whereas power for other elements of the feedback control loop (e.g., the reference voltage $V_{ref}$, the error amplifier 28) may be derived from the secondary side regulated DC output voltage $V_{out}$. Alternatively, as mentioned above, power for the components of the feedback loop may in some cases be provided by an independent power source.

Because of the switching nature of DC-DC converters, these apparatus generally draw current from a power source in a pulsed manner. This condition may have some generally undesirable effects when DC-DC converters draw power from an AC power source (e.g., as in the power supply arrangements of FIG. 7).

In particular, for maximum power efficiency from an AC power source, the input current ultimately drawn from the AC line voltage ideally should have a sinusoidal wave shape and be in phase with the AC line voltage. This situation commonly is referred to as "unity power factor," and generally results with purely resistive loads. The switching nature of the DC-DC converter and resulting pulsed current draw (i.e., and corresponding significantly non-sinusoidal current draw from the AC power source) causes these apparatus to have less than unity power factor, and thus less than optimum power efficiency. Additionally, with reference again to FIG. 7, the presence of a substantial filter capacitor 35 ($C_{filter}$) between the bridge rectifier 68 and DC-DC converter 69 further contributes to making the overall load on the bridge rectifier less resistive, resulting in appreciably less than unity power factor.

More specifically, the "apparent power" drawn from an AC power source by a load that is not a purely resistive load is given by multiplying the RMS voltage applied to the load and the RMS current drawn by the load. This apparent power reflects how much power the device appears to be drawing from the source. However, the actual power drawn by the load may be less than the apparent power, and the ratio of actual to apparent power is referred to as the load's "power factor." For example, a device that draws an apparent power of 100 Volt-amps and has a 0.5 power factor actually consumes 50 Watts of power, not 100 Watts; stated differently, in this example, a device with a 0.5 power factor appears to require twice as much power from the source than it actually consumes.

As mentioned above, conventional DC-DC converters characteristically have significantly less than unity power factor due to their switching nature and pulsed current draw. Additionally, if the DC-DC converter were to draw current from the AC line voltage with only intervening rectification and filtering, the pulsed non-sinusoidal current drawn by the DC-DC converter would place unwanted stresses and introduce generally undesirable noise and harmonics on the AC line voltage (which may adversely affect the operation of other devices).

In view of the foregoing, some conventional switching power supplies are equipped with, or used in conjunction with, power factor correction apparatus that are configured to address the issues noted above and provide for a more efficient provision of power from an AC power source. In particular, such power factor correction apparatus generally operate to "smooth out" the pulsed current drawn by a DC-DC converter, thereby lowering its RMS value, reducing undesirable harmonics, improving the power factor, and reducing the chances of an AC mains circuit breaker tripping due to peak currents.

In some conventional arrangements, a power factor correction apparatus is itself a type of switched power converter device, similar in construction to the various DC-DC converters discussed above, and disposed for example between an AC bridge rectifier and a filtering capacitor that is followed by a DC-DC converter. This type of power factor correction apparatus acts to precisely control its input current on an instantaneous basis so as to substantially match the waveform and phase of its input voltage (i.e., a rectified AC line voltage). In particular, the power factor correction apparatus may be configured to monitor a rectified AC line voltage and utilize switching cycles to vary the amplitude of the input current waveform to bring it closer into phase with the rectified line voltage.

FIG. 8 is a circuit diagram generally illustrating such a conventional power factor correction apparatus 520. As discussed above, the power factor correction apparatus is configured so as to receive as an input 65 the full-wave rectified AC line voltage $V_{AC}$ from the bridge rectifier 68, and provide as an output the voltage $V_{in}$ that is then applied to a DC-DC converter portion of a power supply (e.g., with reference to FIG. 7, the power factor correction apparatus 520, including the filter capacitor 35 across an output of the apparatus 520, would be disposed between the bridge rectifier 68 and the DC-DC converter portion 69). As can be seen in FIG. 8, a common example of a power factor correction apparatus 520 is based on a boost converter topology (see FIG. 4 for an example of a DC-DC converter boost configuration) that includes an inductor $L_{PFC}$, a switch $SW_{PFC}$, a diode $D_{PFC}$, and the filter capacitor 35 across which the voltage $V_{in}$ is generated.

The power factor correction apparatus 520 of FIG. 8 also includes a power factor correction (PFC) controller 522 that monitors the rectified voltage $V_{AC}$, the generated voltage $V_{in}$ provided as an output to the DC-DC converter portion, and a signal 71 ($I_{samp}$) representing the current $I_{AC}$ drawn by the apparatus 520. As illustrated in FIG. 8, the signal $I_{samp}$ may be derived from a current sensing element 526 (e.g., a voltage across a resistor) in the path of the current $I_{AC}$ drawn by the apparatus. Based on these monitored signals, the PFC controller 522 is configured to output a control signal 73 to control the switch 75 ($SW_{PFC}$) such that the current $I_{AC}$ has a waveform that substantially matches, and is in phase with, the rectified voltage $V_{AC}$.

FIG. 9 is a diagram that conceptually illustrates the functionality of the PFC controller 522. Recall that, generally speaking, the function of the power factor correction apparatus 520 as a whole is to make itself look essentially like a resistance to an AC power source; in this manner, the voltage provided by the power source and the current drawn from the power source by the "simulated resistance" of the power factor correction apparatus have essentially the same waveform and are in phase, resulting in substantially unity power factor. Accordingly, a quantity $R_{PFC}$ may be considered as representing a conceptual simulated resistance of the power factor correction apparatus, such that, according to Ohm's law, $$V_{AC} = I_{AC} R_{PFC}$$

or $$G_{PFC} V_{AC} = I_{AC},$$

where $G_{PFC} = 1/R_{PFC}$ and represents an effective conductance of the power factor correction apparatus 520.

With the foregoing in mind, the PFC controller 522 shown in FIG. 9 implements a control strategy based on two feedback loops, namely a voltage feedback loop and a current feedback loop. These feedback loops work together to manipulate the instantaneous current $I_{AC}$ drawn by the power factor correction apparatus based on a derived effective conductance $G_{PFC}$ for the power factor correction apparatus. To this end, a voltage feedback loop 524 is implemented by comparing the voltage $V_{in}$ (provided as an output across the filter capacitor 35) to a reference voltage $V_{refPFC}$ representing a desired regulated value for the voltage $V_{in}$. The comparison of these values generates an error voltage signal $V_e$ which is applied to an integrator/low pass filter having a cutoff frequency of approximately 10-20 Hz. This integrator/low pass filter imposes a relatively slow response time for the overall power factor control loop, which facilitates a higher power factor; namely, because the error voltage signal $V_e$ changes slowly compared to the line frequency (which is 50 or 60 Hz), adjustments to $I_{AC}$ due to changes in the voltage $V_{in}$ (e.g., caused by sudden and/or significant load demands) occur over multiple cycles of the line voltage rather than abruptly during any given cycle.

In the controller shown in FIG. 9, a DC component of the slowly varying output of the integrator/low pass filter essentially represents the effective conductance $G_{PFC}$ of the power factor correction apparatus; hence, the output of the voltage feedback loop 524 provides a signal representing the effective conductance $G_{PFC}$. Accordingly, based on the relationship given above, the PFC controller 522 is configured to multiply this effective conductance by the monitored rectified line voltage $V_{AC}$ to generate a reference current signal $I^*_{AC}$ representing the desired current to be drawn from the line voltage, based on the simulated resistive load of the apparatus 520. This signal $I^*_{AC}$ thus provides a reference or "set-point" input to the current control loop 528.

In particular, as shown in FIG. 9, in the current control loop 528, the signal $I^*_{AC}$ is compared to the signal $I_{samp}$ which represents the actual current $I_{AC}$ being drawn by the apparatus 520. The comparison of these values generates a current error signal $I_e$ that serves as a control signal for a pulse width modulated (PWM) switch controller. The PWM switch controller in turn outputs a signal 73 to control the switch $SW_{PFC}$ so as to manipulate the actual current $I_{AC}$ being drawn (refer again to FIG. 8). Exemplary frequencies commonly used for the control signal 73 output by the PWM switch controller (and hence for the switch $SW_{PFC}$) are on the order of approximately 100 kHz. With the foregoing in mind, it should be appreciated that it is the resulting average value of a rapidly varying $I_{AC}$ that resembles a full-wave rectified sinusoidal waveform (e.g., having a frequency of two times the frequency of the line voltage), with an approximately 100 kHz ripple resulting from the switching operations. Accordingly, the current feedback loop and the switch control elements have to have enough bandwidth to follow a full-wave rectified waveform (hence, a bandwidth of a few KHz generally is more than sufficient).

It should be appreciated that the foregoing discussion in connection with FIGS. 8 and 9 is primarily conceptual in nature to provide a general understanding of the power factor correction functionality. Presently, integrated circuit power factor correction controllers that may be employed as the PFC controller 522 shown in FIGS. 8 and 9 are available from various manufacturers (e.g., the Fairchild Semiconductor ML4821 PFC controller, the Linear Technology LT1248 or LT1249 PFC controllers, the ST Microelectronics L6561 PFC controller, etc.). Such controllers generally may be configured to operate the power factor correction apparatus 520 in either continuous or discontinuous switching modes (or around a boundary between continuous and discontinuous modes).

Thus, in the conventional power factor correction schemes outlined in connection with FIGS. 8 and 9, the power factor correction apparatus 520 provides as an output the regulated voltage $V_{in}$ across the capacitor 35, from which current may be drawn as needed by a load coupled to $V_{in}$ (e.g., by a subsequent DC-DC converter portion of a power supply). For sudden and/or excessive changes in load power requirements, the instantaneous value of the voltage $V_{in}$ may change dramatically; for example, in instances of sudden high load power requirements, energy reserves in the capacitor are drawn upon and $V_{in}$ may suddenly fall below the reference $V_{refPFC}$. As a result, the voltage feedback loop 524, with a relatively slow response time, attempts to adjust $V_{in}$ by causing the power factor correction apparatus to draw more current from the line voltage. Due to the relatively slow response time, though, this action may in turn cause an over-voltage condition for $V_{in}$, particularly if the sudden/excessive demand from the load no longer exists by the time an adjustment to $V_{in}$ is made. The apparatus then tries to compensate for the over-voltage condition, again subject to the slow response time of the voltage feedback loop 524 leading to some degree of potential instability. Similar sudden changes (either under- or over-voltage conditions) to $V_{in}$ may result from sudden/excessive perturbations on the line voltage 67, to which the apparatus 520 attempts to respond in the manner described above.

From the foregoing, it should be appreciated that the slow response time that on the one hand facilitates power factor correction at the same time may result in a less than optimum input/output transient response capability. Accordingly, the voltage feedback loop response time/bandwidth in conventional power factor correction apparatus generally is selected to provide a practical balance between reasonable (but less than optimal) power factor correction and reasonable (but less than optimal) transient response.

It should be appreciated that in some switching power supply applications, a power factor correction apparatus may not be required or even significantly effective. For example, for small loads that draw relatively low power from a power source, the power factor of the switching power supply conventionally is considered to be not as important as in higher power applications; presumably, the power drawn by a small load comprises a relatively insignificant portion of the overall power available on a particular AC power circuit.

In contrast, power factor correction may be important for larger loads consuming relatively higher power, in which the input current to the switching power supply may approach the maximum available from the AC power source. Power factor correction also may be important for situations in which several relatively small loads are coupled to the same AC power circuit; if the power factor associated with each of the relatively small loads is low, the net effect of many such low power factor loads coupled to the same AC power circuit may have significant detrimental effects.

SUMMARY

As discussed above in connection with FIGS. 7 and 8, a high power factor switching power supply generally requires two "switching stages," namely, a first switching stage exemplified by the power factor correction apparatus 520 shown in FIG. 8, followed by a second switching stage exemplified by the DC-DC converter 69 shown in FIG. 7. As also illustrated in FIGS. 7 and 8, each of these switching stages generally requires some form of feedback to appropriately control its switching operations. For example, the PFC controller 522 of FIG. 8 monitors input AC voltage and current as well as the voltage 30 ($V_{in}$) which is provided to the DC-DC converter; similarly, the switch controller (pulse width modulator 36) of the DC-DC converter shown in FIG. 7 monitors the output voltage 32 ($V_{out}$) provided to a load 40.

Applicants have recognized and appreciated that, in some cases, the foregoing arrangement results in unnecessary functional redundancy.

In view of the foregoing, the present disclosure relates generally to methods and apparatus for high power factor power transfer using a single switching stage. Specifically, according to various embodiments disclosed herein, power may be delivered to a load via a single switching stage, while at the same time achieving significantly high power factor. As a result, overall power efficiency typically is improved and functional redundancy of components is significantly reduced as compared to conventional arrangements. In different aspects, implementations of methods and apparatus according to various embodiments of the disclosure may result in significantly streamlined circuits having fewer components, higher overall power efficiencies, and smaller space requirements.

In some embodiments, a controllable variable power may be delivered to a load while maintaining high power factor without requiring any feedback information relating to the load conditions (i.e., without monitoring load voltage and/or current) to control switching operations in the single switching stage. Furthermore, in one aspect of these embodiments, no regulation of load voltage and/or load current is required. In another aspect, eliminating the need for one or more feedback loops avoids potentially challenging issues relating to feedback circuit stability.

Based on the foregoing concepts, one embodiment of the present disclosure is directed to a single stage high power factor "feed-forward" driver for an LED-based light source. Such a feed-forward driver (also referred to herein as a "power control apparatus") utilizes information known in advance regarding a desired power to be provided to the light source. The feed-forward driver controls the intensity (i.e., perceived brightness) of radiation generated by the light source based on modulating the average power delivered to the light source in a given time period, without regulating the voltage or current provided to the light source or monitoring load voltage or current to control the single switching stage during normal operation.

In one aspect of this embodiment, the feed-forward driver is configured to store energy to, and release energy from, one or more energy transfer elements using a discontinuous mode switching operation. This type of switching operation facilitates the transfer of a predictable controlled power to the light source. The discontinuous mode switching operation employed in this embodiment may be similarly used in various feed-forward implementations for providing power to loads other than LED-based light sources (e.g., motors, actuators, relays, heating elements, etc.)

In another embodiment, multiple apparatus each including one or more loads and one or more single stage high power factor power control apparatus (i.e., feed-forward drivers) may be coupled to a distributed source of AC power in a network configuration. In one aspect of this embodiment, the multiple apparatus coupled to the distributed AC voltage may be configured as addressable devices so as to facilitate appropriate communication of load control information throughout the network. In another aspect of this embodiment, the load control information may be formatted for communication throughout the network in any of a variety of conventional communication protocols including, but not limited to, a DMX protocol.

In sum, one embodiment of the present disclosure is directed to a lighting apparatus, comprising at least a first load that includes at least one first LED-based light source, and a switching power supply including a first single switching stage for the first load. The switching power supply is configured to provide power factor correction and a first load power to the first load via control of the first single switching stage. The switching power supply further is configured to control the first single switching stage to provide the first load power without monitoring or regulating a first load current or a first load voltage associated with the first load.

Another embodiment is directed to a lighting method, comprising acts of generating first light from a first load including at least one first LED-based light source, and providing power factor correction and a first load power to the first load via control of a first single switching stage without monitoring or regulating a first load current or a first load voltage associated with the first load.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like.

In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of from approximately 700 degrees K (typically considered the first visible to the human eye) to over 10,000 degrees K; white light generally is perceived at color temperatures above 1500-2000 degrees K.

Lower color temperatures generally indicate white light having a more significant red component or a "warmer feel," while higher color temperatures generally indicate white light having a more significant blue component or a "cooler feel." By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The terms "lighting unit" and "lighting fixture" are used interchangeably herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present disclosure discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

This application incorporates by reference the entirety of U.S. non-provisional application Ser. No. 11/079,904, filed Mar. 14, 2005, entitled "Power Control Methods and Apparatus."

It should be appreciated that all combinations of the foregoing concepts and additional concepts discussed in greater detail below are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWING

FIG. 4 is a circuit diagram of a conventional step-up or "boost" type DC-DC converter.

FIG. 5 is a circuit diagram of a conventional inverting or "buck-boost" type DC-DC converter.

DETAILED DESCRIPTION

The present disclosure is directed generally to various improved methods and apparatus for providing and controlling power to at least some types of loads using a single switching stage while maintaining a high power factor (in some instances, approximately or essentially unity power factor). In some embodiments discussed further below, a controlled predetermined power is provided at high power factor to a load using a single switching stage, without requiring any feedback information from the load during normal operation (e.g., without monitoring and/or regulation of load voltage and current), thereby significantly reducing circuit complexity, number of components, size and efficiency. In one aspect of various embodiments, a single switching stage is configured to store energy to and release energy from one or more energy transfer elements using a discontinuous mode switching operation. This type of switching operation, as discussed further below, facilitates a predictable controlled delivery of power to the load.

In different embodiments disclosed herein, of particular interest are loads in which one or more functional components of the load are controlled by modulating power to the functional components. Examples of such functional components may include, but are not limited to, motors or other actuators and motorized/movable components (e.g., relays, solenoids), temperature control components (e.g. heating/cooling elements) and at least some types of light sources. More specifically, one type of load of interest for a streamlined single stage high power factor power supply/control configuration according to various embodiments of the present disclosure is a lighting apparatus including one or more light-emitting diode (LED) light sources whose perceived brightness may be varied based on modulated pulsed power delivery. Examples of power modulation control techniques that may be employed in the load to control the functional components include, but are not limited to, pulse frequency modulation, pulse width modulation, and pulse number modulation (e.g., one-bit D/A conversion).

Following below are more detailed descriptions of various concepts related to, and embodiments of, single stage high power factor power control methods and apparatus according to the present disclosure. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Figure 10:
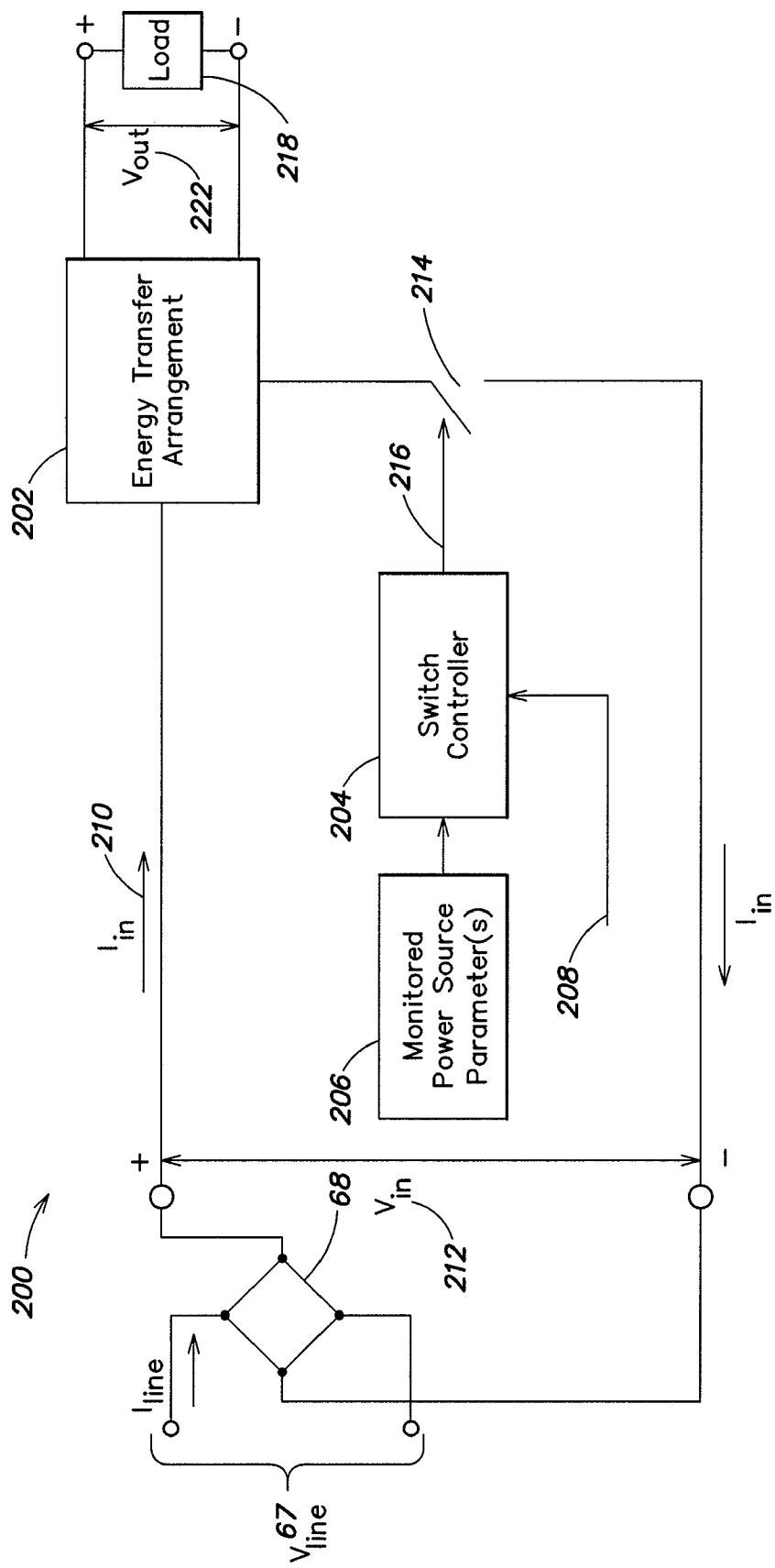
FIG. 10 is a block diagram illustrating a single stage high power factor power control apparatus, according to one embodiment of the present disclosure.

FIG. 10 is a block diagram illustrating a "feed-forward" single stage high power factor power control apparatus 200 based at least in part on a switching power supply configuration, according to one embodiment of the present disclosure. The terms "feed-forward" used in connection with the embodiment of FIG. 10, as well as other embodiments discussed below, refer to circuit configurations in which information associated with a load (e.g., a desired power to be drawn by the load, a desired voltage to be applied across the load, etc.) is known in advance and used to facilitate circuit operation.

For example, in various examples of feed-forward power control apparatus disclosed herein, a controlled predetermined power is provided to a load via a switched energy transfer method without requiring any feedback information from the load; i.e., there is no requirement to monitor load voltage and/or load current to control routine switching operations during normal operation to provide power to the load (in one embodiment discussed further below, a load voltage may be monitored solely to detect an open circuit condition for protection purposes in the case of component failure). Rather than monitoring or regulating load voltage or current, a controlled predetermined power is provided to the load based on monitoring one or more parameters relating to the source of power provided to the power control apparatus (e.g., a voltage input or current drawn from an A.C. power source), as well as other control information or data known in advance relating to desired load parameters (hence, the "feeding forward" of information relating to load power).

Figure 7:
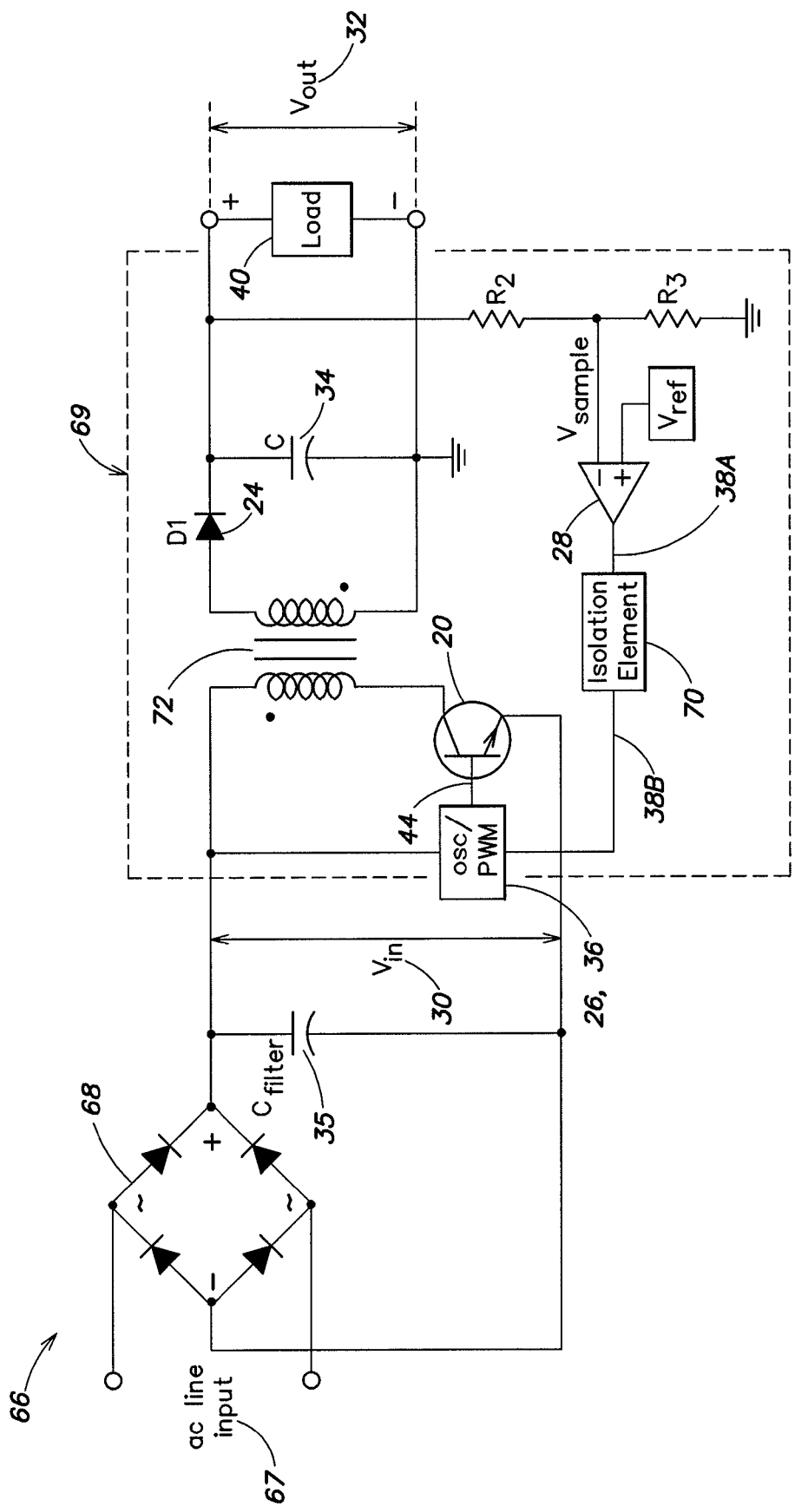
FIG. 7 is a circuit diagram of a power supply drawing power from an AC power source and including conventional "flyback" type DC-DC converter.
Figure 8:
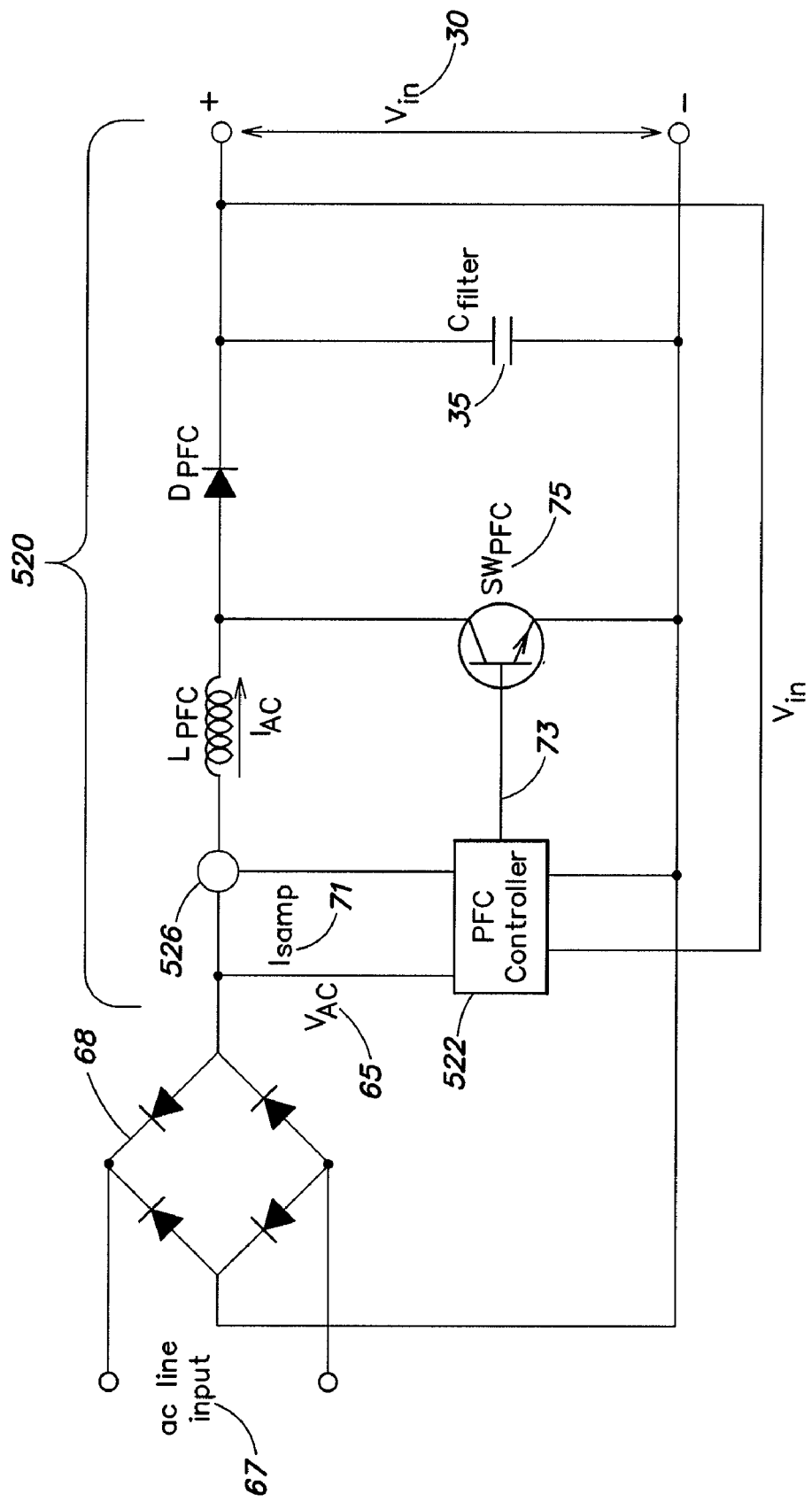
FIG. 8 is a circuit diagram of a conventional power factor correction apparatus based on a boost converter topology.
Figure 9:
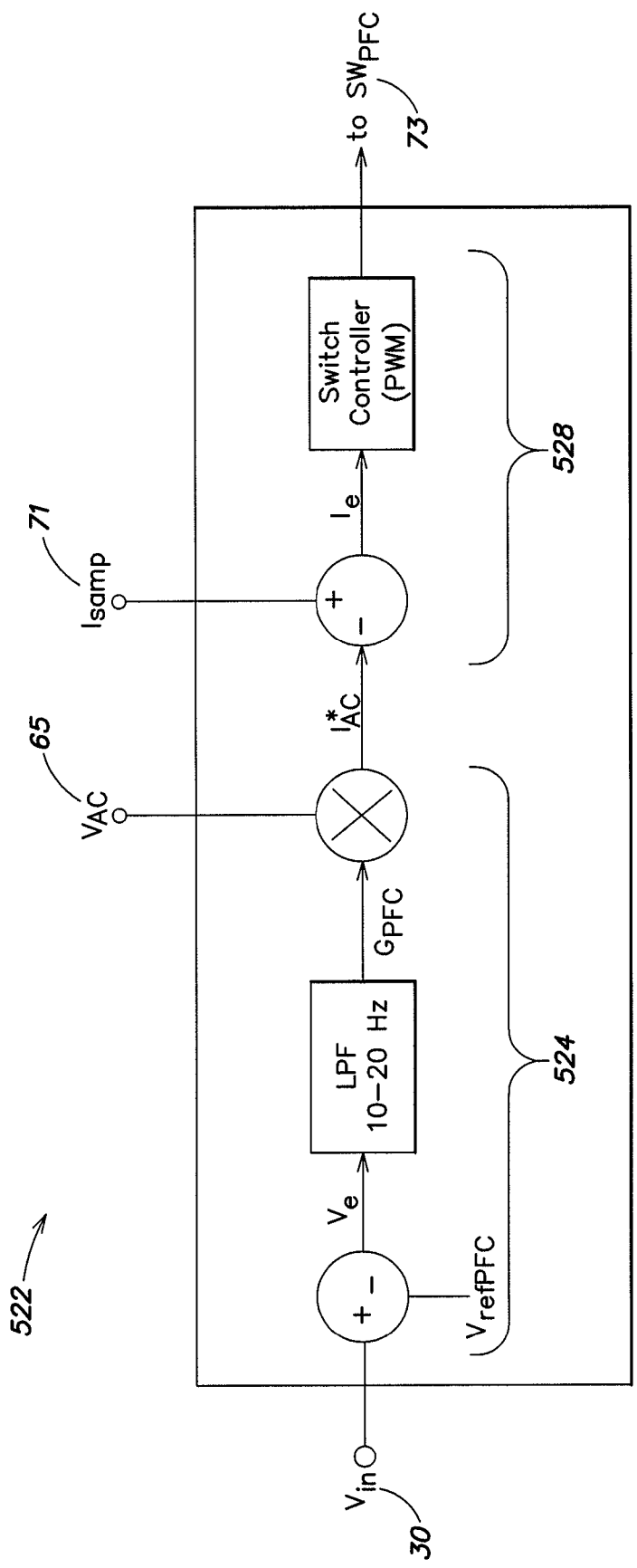
FIG. 9 is a diagram that conceptually illustrates the functionality of a power factor correction controller of the power factor correction apparatus shown in FIG. 8.

As shown in FIG. 10, the single stage high power factor power control apparatus 200 receives an input voltage 212 ($V_{in}$) and draws an input current 210 ($I_{in}$) from the output of a full-wave bridge rectifier 68; the rectifier 68 is in turn coupled to an AC line voltage 67 which provides a source of power. Recall that, to ensure high power factor, the "total load" presented by the power control apparatus 200 to the AC power source should appear to be primarily resistive. To this end, it is noteworthy in the diagram of FIG. 10 that a significant energy storage element such as a filter capacitor (e.g., see the capacitor 35 in FIG. 7) is not employed on the output of the bridge rectifier 68, so as to facilitate the goal of high power factor. Accordingly, in this embodiment, the input voltage 212 ($V_{in}$) is essentially a full-wave rectified (i.e., sinusoidally varying) voltage waveform having a frequency of two times the line voltage frequency (e.g., at a line frequency of 60 Hz, the input voltage $V_{in}$ has a frequency of 120 Hz).

FIG. 10 also shows that the power control apparatus 200 is configured such that the input current $I_{in}$ passes through an energy transfer arrangement 202 via the operation of a switch 214. The switch 214 in turn is controlled by a switch controller 204, which is configured to control the switch 214 via a control signal 216 that is generated based at least in part on one or more monitored power source parameters 206 (e.g., $V_{in}$ and/or $I_{in}$) as well as other control information or data 208 provided to the apparatus 200. While not explicitly shown in FIG. 10, according to various implementations discussed in greater detail below, operating power for the switch controller 204 may be derived from the input voltage $V_{in}$ or another source of power.

In FIG. 10, the switch 214 performs a role substantially similar to that of the transistor switches 20 shown in earlier figures. Accordingly, one exemplary implementation of the switch 214 includes, but is not limited to, one or more transistors (e.g., BJTs, FETs) configured to operate as a saturated switch, together with other signal amplifier/switch driver circuitry that may be required to properly operate the transistors. Accordingly, the switch 214 is shown generically in FIG. 10 as a controllable "make-brake" circuit connection to indicate that various components may be utilized to implement the function of the switch.

The energy transfer arrangement 202 illustrated in FIG. 10 generally represents one of several possible circuit arrangements configured to implement the general functionality of a DC-DC converter providing power to a load, albeit in the context of a full-wave rectified input voltage. According to different implementations of this embodiment, the energy transfer arrangement 202 may include various components configured to implement the general functionality of one of a buck converter, a boost converter, a buck-boost converter, a CUK converter, a flyback converter, and a forward converter (many which were discussed above in connection with FIGS. 1 and 4-8), as well as other converter arrangements not specifically discussed herein.

As shown in FIG. 10, the energy transfer arrangement 202 is configured to provide an output voltage 222 ($V_{out}$) to a load 218. In one aspect of this embodiment, as mentioned above and discussed in greater detail below, there are no circuit connections, either in the energy transfer arrangement 202 or otherwise associated with the load, to provide any information pertaining to the load (e.g., load voltage and/or load current) as feedback to affect the control of the switch 214 under normal operation (i.e., to provide a predetermined power to the load 218).

The interconnection of the energy transfer arrangement 202 to other components of the power control apparatus 200 is shown generally in FIG. 10 to facilitate an introductory discussion of the operation of the power control apparatus. It should be appreciated, however, that a particular interconnection of components in a given implementation of the power control apparatus 200 may be dictated by the type of converter employed in the energy transfer arrangement 202. Some examples of particular circuit arrangements are discussed in greater detail below, in connection with FIGS. 11 and 16.

In another aspect of the embodiment of FIG. 10, the feedforward power control apparatus 200 may be configured to store energy to, and release energy from, one or more energy transfer elements of the energy transfer arrangement 202 using a "discontinuous mode" switching operation implemented by the switch controller 204 and the switch 214. This type of switching operation facilitates a predictable controlled power delivery to the load 218. The discontinuous mode switching operation is now discussed in greater detail, with reference initially to FIGS. 11 and 12.

Figure 11:
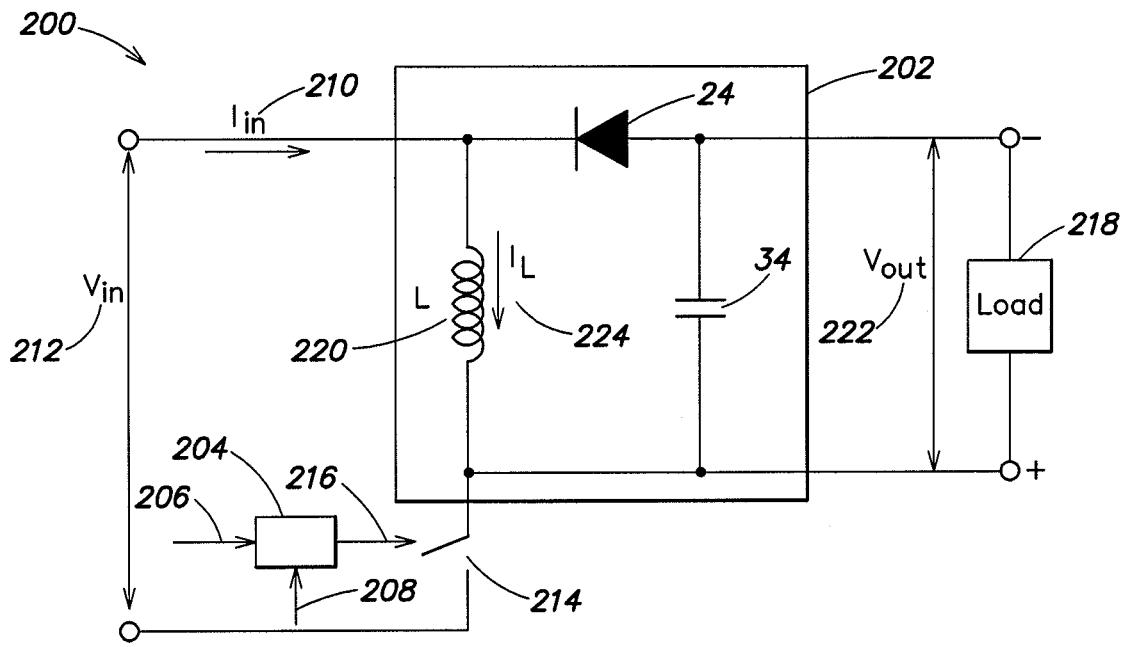
FIG. 11 is a diagram showing some additional details of the power control apparatus of FIG. 10, according to one embodiment of the disclosure.

FIG. 11 is a diagram similar to FIG. 10 schematically illustrating additional details of an exemplary energy transfer arrangement 202 of the single stage high power factor power control apparatus 200 according to one embodiment of the present disclosure. In the example of FIG. 11, the energy transfer arrangement is shown as a buck-boost or inverting converter, including the inductor 220 as an energy transfer element having an inductance L, as well as other converter circuitry that is configured to provide the output voltage 222 to the load 218. As discussed above in connection with FIG. 10, it should be appreciated that the exemplary buck-boost configuration shown in FIG. 11 is provided primarily for purposes of illustrating various concepts relating to discontinuous mode operation; however, power control apparatus according to the present disclosure are not limited to this particular configuration, and other configurations may be operated in discontinuous mode according to other embodiments. In FIG. 11, the current 210 ($I_{in}$) flows through the inductor 220 with operation of the switch 214, based on the voltage 212 ($V_{in}$) applied to the inductor. For purposes of highlighting some of the more salient general concepts underlying the operation of the power control apparatus 200, ideal components and a substantially lossless transfer of energy are assumed in the following discussion.

Figure 1:
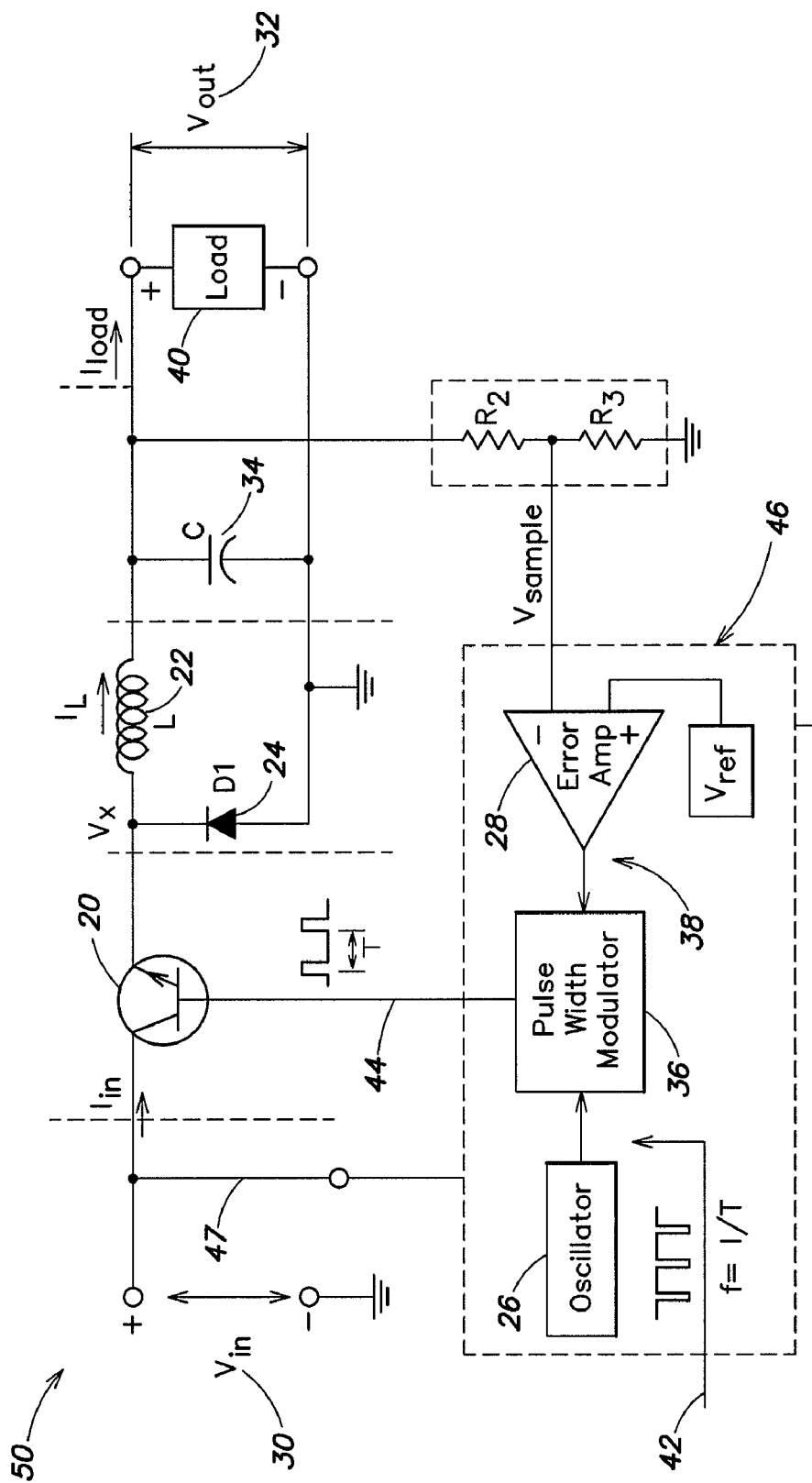
FIG. 1 is a circuit diagram of a conventional step-down or "buck" type DC-DC converter.
Figure 2:
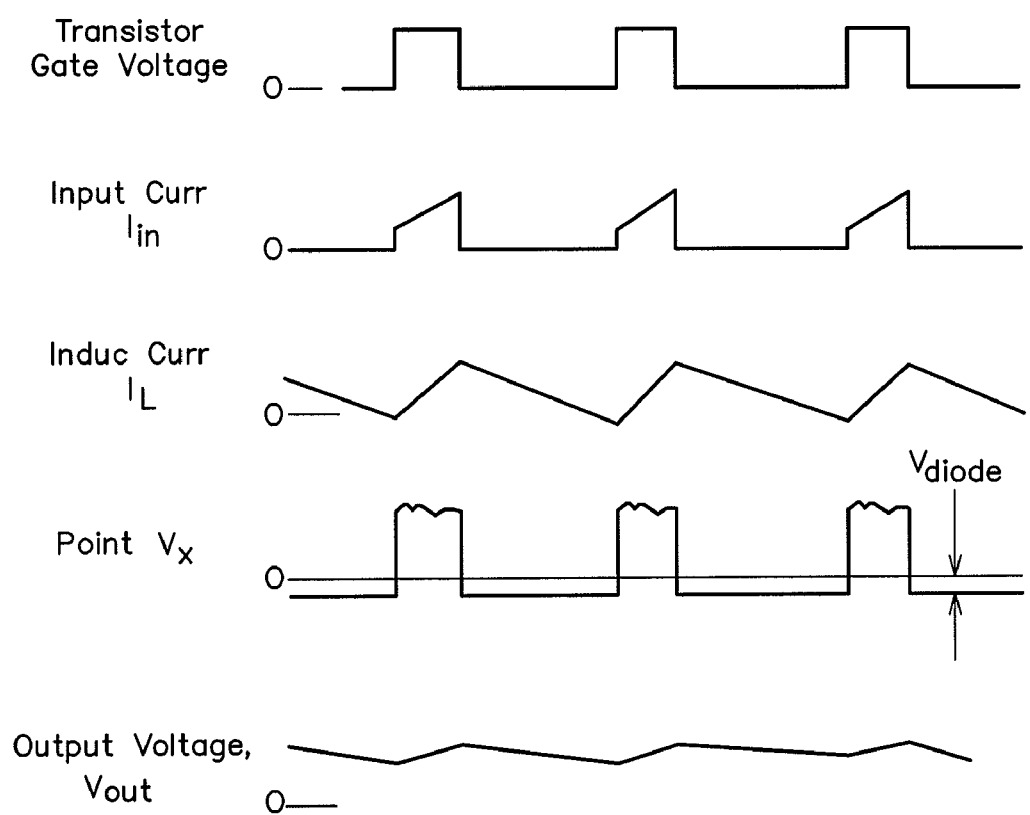
FIG. 2 is a diagram illustrating various operating signals associated with the DC-DC converter of FIG. 1.
Figure 3:
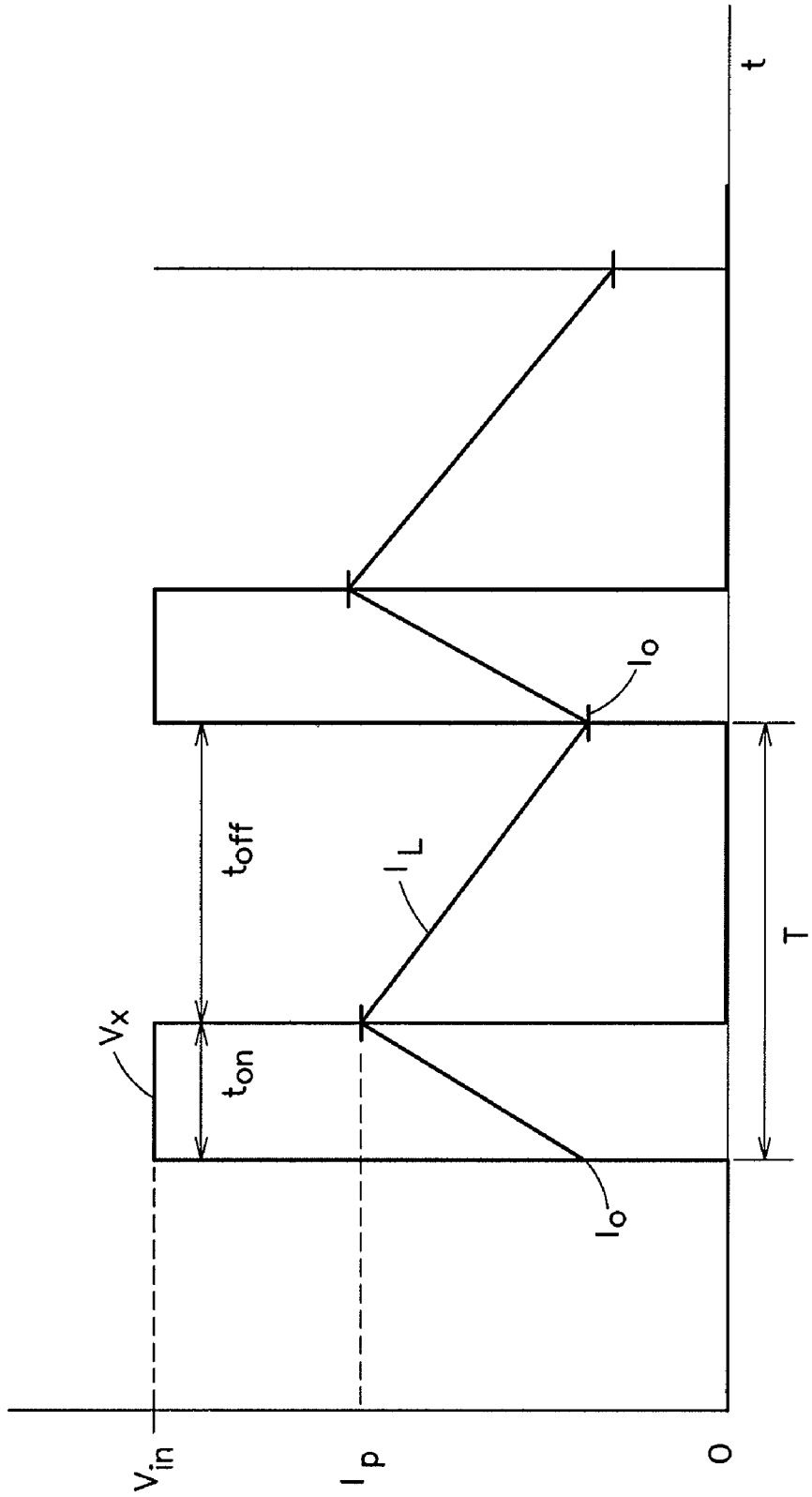
FIG. 3 is a diagram particularly illustrating inductor current vs. applied voltage during two consecutive switching operations in the converter of FIG. 1.
Figure 6:
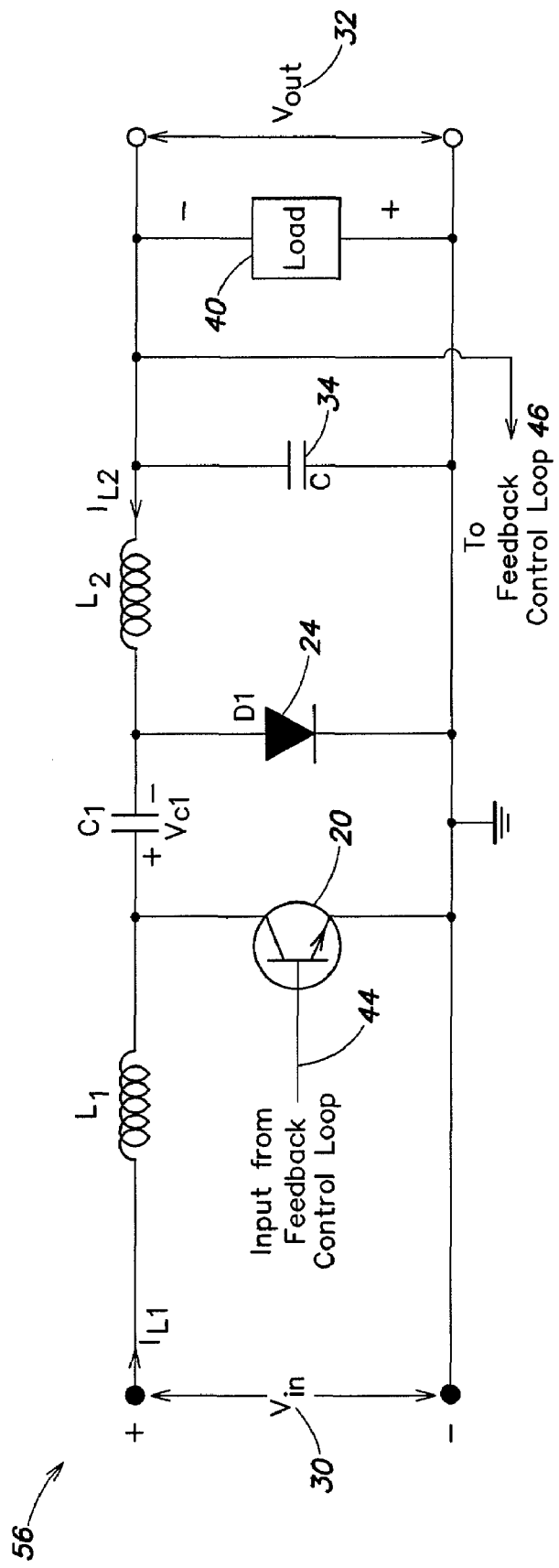
FIG. 6 is a circuit diagram of a conventional "CUK" type DC-DC converter.
Figure 12:
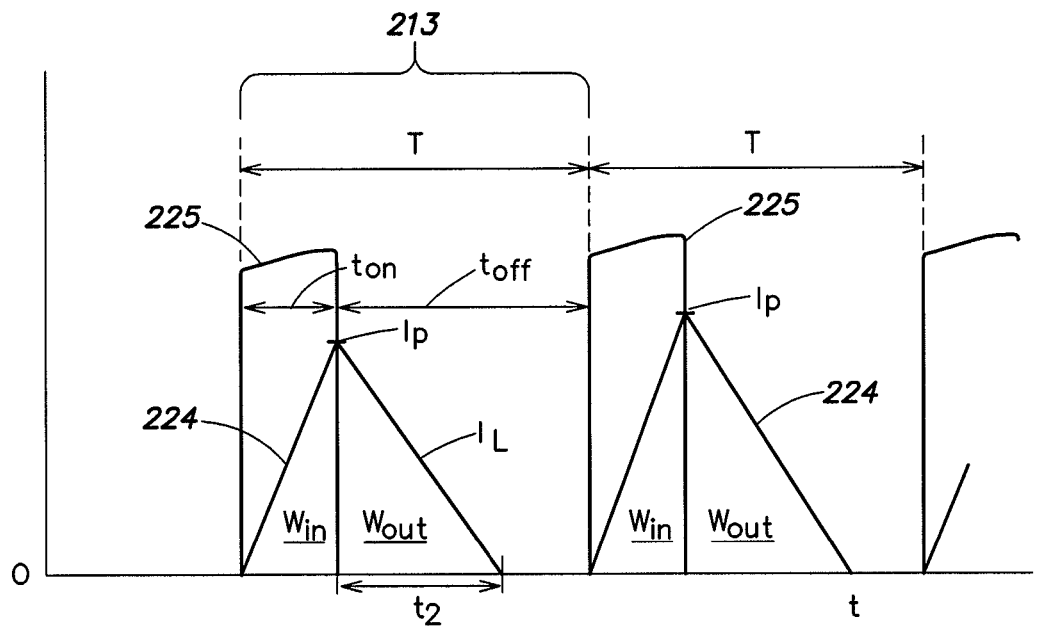
FIG. 12 is an exemplary timing diagram for the apparatus of FIGS. 10 and 11, according to one embodiment of the disclosure.

FIG. 12 is an exemplary timing diagram showing two consecutive switching cycles 213 of the switch 214 shown in FIGS. 10 and 11, according to one embodiment of the disclosure. FIG. 12 shows a pulsed voltage 225 ($V_L$) applied across the inductor 220 based on the input voltage $V_{in}$ during consecutive on/off switching cycles of the switch 214. As in FIG. 3, the time during which the switch 214 is on or closed is indicated in FIG. 12 as $t_{on}$, and the time during which the switch is off or open is indicated as $t_{off}$. Hence, as discussed above, the period T of a given switching cycle 213 is given by $t_{on}+t_{off}$, and the frequency f of multiple switching cycles (i.e., the "switching frequency") is given by 1/T.

As illustrated in FIG. 12, the pulsed voltage $V_L$ applied across the inductor during a given time interval $t_{on}$ is essentially a sample of the full-wave rectified voltage $V_{in}$. Hence, assuming for the moment a switching frequency f that is significantly faster than the full-wave rectified voltage $V_{in}$ at two times the line frequency, the magnitude of consecutive pulses of the pulsed voltage 225 is slowly varying from cycle to cycle, but generally appears substantially constant during any given time interval $t_{on}$ (the changes in magnitude of consecutive pulses of the pulsed voltage 225 is somewhat exaggerated in FIG. 12 for purposes of illustration).

Superimposed on the pulsed voltage 225 in FIG. 12 is the current 224 ($I_L$) through the inductor 220. As discussed above in connection with FIG. 3, when the switch 214 is closed for the time interval $t_{on}$, the voltage $V_L$ applied to the inductor causes a linearly increasing current $I_{in}=I_L$ to flow through the inductor based on the relationship $V_L=L \cdot dI_L/dt$, during which energy is stored in the inductor's magnetic field. At the end of the time interval $t_{on}$, FIG. 12 indicates that the inductor current $I_L$ reaches a maximum peak value $I_P$. This same relationship $V_L=L \cdot dI_L/dt$ causes the inductor current $I_L$ to linearly decrease during the time interval $t_{off}$ when the switch 214 is off or opened, as the stored energy is provided to the load via the other converter circuitry. It should be appreciated that, if the time interval $t_{on}$ remains constant from cycle to cycle, the peak inductor current $I_P$ varies slowly from cycle to cycle, as the magnitude of the voltage $V_L$ similarly varies slowly from cycle to cycle (as it follows the rectified voltage waveform $V_{in}$ at two times the line frequency).

The timing diagram of FIG. 12 is similar to that shown earlier in FIG. 3, but differs from FIG. 3 in that the inductor current $I_L$ illustrated in FIG. 12 reflects a "discontinuous mode" switching operation rather than a continuous mode switching operation. In particular, at the beginning and end of each switching cycle 213, the power control apparatus in this embodiment is configured such that the inductor current $I_L$ is zero; specifically, the inductance L of the inductor and the duty cycle of the switch 214, as well as other components of the apparatus, are configured such that essentially all of the energy stored in the inductor during the time interval $t_{on}$ is transferred to the load in a time interval $t_2$ which is less than $t_{off}$, thereby ensuring essentially no current through the inductor at the beginning and end of each switching cycle (and no significant residual stored energy in the inductor's magnetic field). As shown in FIG. 12, the period of time between the end of $t_2$ and the end of $t_{off}$ represents a discontinuity in the inductor current $I_L$; hence the term "discontinuous" mode. Given the slowly varying nature of both $V_L$ and $I_P$, in one aspect of this embodiment discontinuous mode is ensured by considering the anticipated respective values of $V_L$ and $I_P$ and desired power transferred to the load under some predetermined operating conditions, and selecting circuit components so as to ensure that the inductor current $I_L$ is able to fall to zero before the end of the switching cycle corresponding to these anticipated values. One such illustrative design example is discussed below in connection with FIG. 16.

By employing a discontinuous mode switching operation, and ensuring essentially zero inductor current at the beginning and end of each switching cycle, the transfer of a predictable quantity of energy per switching cycle is facilitated, and hence a predictable controlled power delivery to the load. For example, with reference to FIG. 12, the quantity of energy $W_{in}$ (in Joules) stored in the inductor's magnetic field by the end of the time interval $t_{on}$, assuming a zero initial inductor current, is given by $W_{in}=\frac{1}{2}L(I_p)^2$. Assuming a lossless transfer of energy, a quantity of energy $W_{out}$ equal to $W_{in}$ is transferred, during the time interval $t_2 < t_{off}$, from the inductor's magnetic field to the load while the switch 214 is opened for the period $t_{off}$. With each successive switching cycle, a predictable quantity of energy is thusly transferred (it should be appreciated that, again since $I_p$ is slowly varying, different quantities of energy are transferred in successive cycles).

Since instantaneous power is defined as a rate of energy flow, or the amount of energy transferred in a given time period (i.e., P=dW/dt), the instantaneous power $P_{out}$ transferred to the load may be expressed as:

$$P_{out} = \frac{dW}{dt} = \frac{\frac{1}{2}L(I_p)^2}{T} = \frac{1}{2}L(I_p)^2 f, \qquad (1)$$

where f=1/T is the switching frequency of the switch 214. Again recall that since $I_p$ is slowly varying, Eq. (1) represents a time varying power.

From Eq. (1), it may be appreciated that the instantaneous power to the load may be modulated by varying one or both of the switching frequency f and the peak inductor current $I_P$, given the inductance L of the inductor. As discussed above, the peak inductor current $I_P$ is determined by the duty cycle of the switch 214 (in particular, the time interval $t_{on}$). Hence, in the embodiments of FIGS. 10-12, one or both of the frequency and the duty cycle of the switch 214 may be controlled to provide a predictable variable power to the load without any feedback information pertaining to the load. From Eq. (1), it may be readily appreciated that while the change in power varies linearly with switching frequency, the change in power has a quadratic (square) relationship with the peak current $I_P$ and hence the time interval $t_{on}$ (as will be further evident from the discussion of Eqs. (9) and (13) below).

With reference again to the general power control apparatus configuration illustrated in FIG. 10, a power factor associated with the power control apparatus 200 now is considered based on the discontinuous mode switching operation discussed above in connection with FIG. 12. For purposes of the following mathematical analysis, a unity power factor condition is imposed on the power drawn by the power control apparatus 200 (a significant portion of which ultimately is transferred to the load), with the results confirming that indeed, in theory, a unity power factor condition may be satisfied assuming a switching frequency f in Eq. (1) that is significantly higher than the line frequency $f_{line}$ of the A.C. power source. In practice, because the analysis herein assumes lossless conditions, power control apparatus implementations according to various concepts discussed herein may not achieve exactly unity power factor, but nonetheless provide an appreciably high power factor that in many cases is essentially or approximately unity power factor.

As discussed above, for an essentially unity power factor condition, the load on the power circuit (in this case, the power control apparatus 200) needs to appear to be resistive, which results in a sinusoidally varying instantaneous line current in phase with the line voltage. Thus, for a unity power factor condition, the instantaneous line voltage $V_{line}$ and line current $I_{line}$ may be expressed as:

$$V_{line}=\sqrt{2}V_{rms} \sin(2\pi f_{line}t)$$

$$I_{line}=\sqrt{2}I_{rms} \sin(2\pi f_{line}t), \qquad (2)$$

where $f_{line}$ represents the line frequency (e.g., 50 or 60 Hz). The average power $P_{rms}$ drawn by the apparatus 200 from the A.C. power source represented by the line voltage 67 is given as:

$$P_{rms}=V_{rms} \cdot I_{rms}, \qquad (3)$$

where $V_{rms}$ and $I_{rms}$ represent the root-mean-square (RMS) values of the instantaneous line voltage and line current drawn by the apparatus, respectively. Of course, the line voltage (and hence $V_{rms}$) generally is known (but may vary slightly from time to time based on changes in the overall loading of the AC power circuit from which power is being drawn).

For purposes of the present discussion, it is also presumed that the average power $P_{rms}$ drawn by the apparatus 200 is known a priori and provided as information to control the apparatus. In particular, as discussed further below, a desired load power is provided as "feed-forward" information to control the apparatus 200, and this desired load power is essentially equal to the average power $P_{rms}$ drawn from the A.C. power source, assuming "lossless" conditions (i.e., after taking into consideration nominal power consumption of other circuit components). Since $V_{line}$ and $V_{rms}$ are known, and $P_{rms}$ is presumed to be given (i.e., as a desired load power), it is convenient to express the line current $I_{line}$ terms of these values by substituting for $I_{rms}$ Eq. (2) using Eq. (3):

$$I_{rms} = \frac{P_{rms}}{V_{rms}} \qquad (4)$$

$$\frac{V_{line}}{V_{rms}} = \sqrt{2}\sin(\omega t)$$

$$I_{line} = V_{line} \frac{P_{rms}}{(V_{rms})^2}.$$

It is also reasonable to assume for purposes of calculating power that Eq. (4) may be rewritten by substituting the rectified current $I_{in}$ for the line current and the rectified voltage $V_{in}$ for the line voltage, giving:

$$I_{in} = V_{in} \frac{P_{rms}}{(V_{rms})^2}. \quad (5)$$

The instantaneous power $P_{in}$ drawn from the A.C. power source via the bridge rectifier 68 is given by:

$$P_{in} = V_{in} \cdot I_{in},$$

which may be re-written by substituting for $I_{in}$ using Eq. (5) as:

$$P_{in} = V_{in}^2 \left( \frac{P_{rms}}{V_{rms}^2} \right). \quad (6)$$

Again, assuming lossless conditions for the moment, the instantaneous power $P_{in}$ given in Eq. (6) as drawn from the A.C. power source is theoretically equal to the instantaneous power $P_{out}$ given in Eq. (1) that is transferred to the load 218 coupled to the power control apparatus 200. Thus, setting Eq. (6) equal to Eq. (1) gives the relationship:

$$V_{in}^2 \left( \frac{P_{rms}}{V_{rms}^2} \right) = \frac{1}{2} L (I_P)^2 f. \quad (7)$$

As discussed above in connection with Eq. (1), the instantaneous power to the load may be modulated by varying one or both of the switching frequency f and the peak inductor current $I_P$, given the inductance L of the inductor, wherein the peak inductor current $I_P$ is determined in turn by the duty cycle of the switch 214 (in particular, the time interval $t_{on}$). Hence, one or both of the frequency and the duty cycle of the switch 214 may be controlled to provide a predictable variable power to the load without any feedback information pertaining to the load. First, the case of maintaining a constant switching frequency f and varying the duty cycle via the time interval $t_{on}$ is considered. In this case, given f, a known inductance L, and a desired load power represented by $P_{rms}$, an appropriate $t_{on}$ needs to be determined based on the relationship given in Eq. (7).

Figure 13:
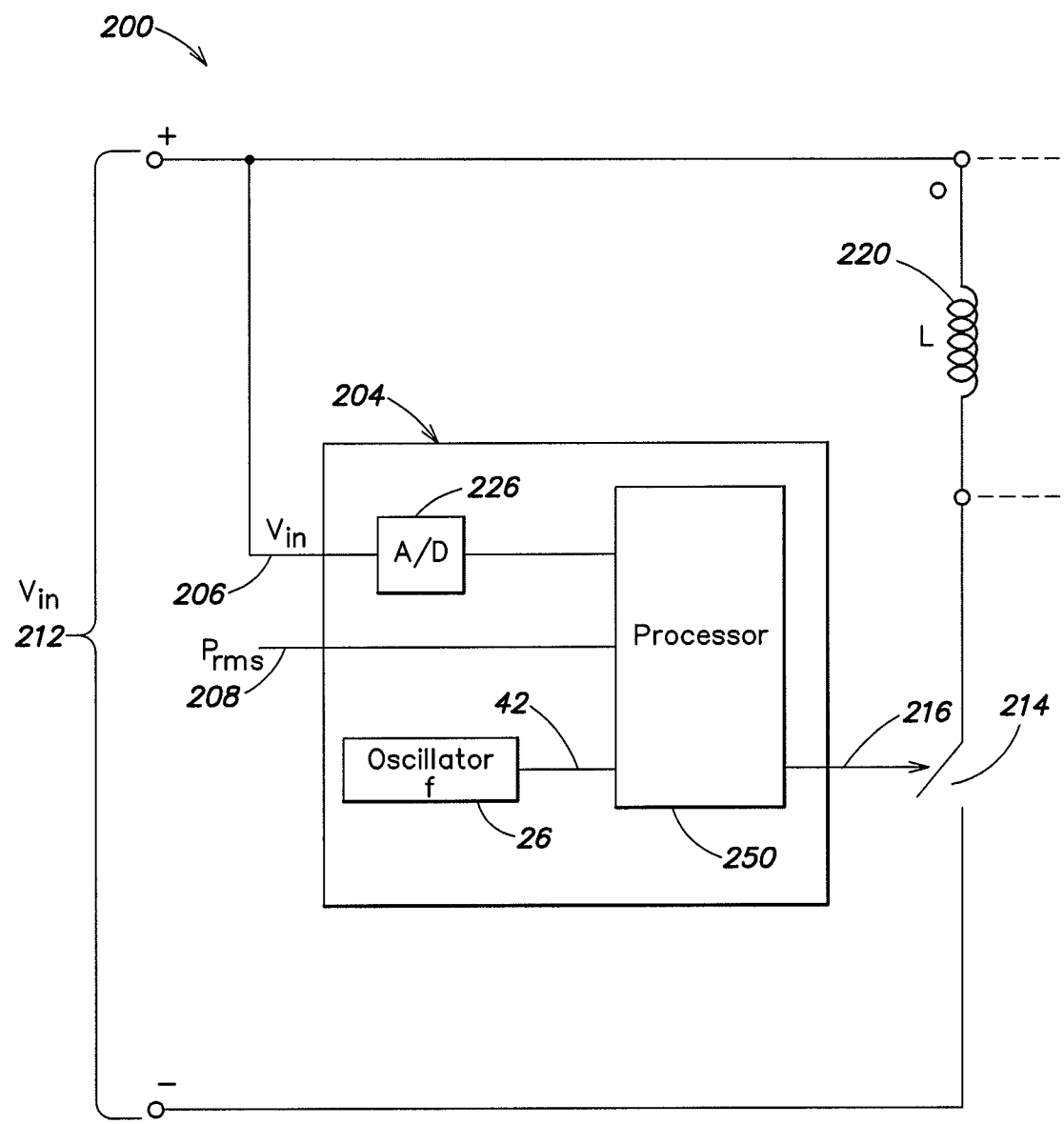
FIG. 13 is a circuit diagram illustrating a portion of the power control apparatus of FIGS. 10 and 11 according to another embodiment of the disclosure, in which the apparatus is controlled based in part on monitoring an input voltage to the apparatus and adjusting a duty cycle of a switching operation.

FIG. 13 illustrates a portion of the power control apparatus 200 based on the configuration of FIG. 11 according to one embodiment, in which the time interval $t_{on}$, and hence the duty cycle of the switch 214, may be controlled based on monitoring the input voltage 212 ($V_{in}$) to the power control apparatus 200. Again, while $V_{in}$ is generally known within a certain expected range, there may be instantaneous variations in the line voltage due to dynamic demands on the A.C. power circuit. Accordingly, while in some implementations $V_{in}$ need not be necessarily monitored (but rather presumed to be at some nominal expected line voltage value), in some embodiments $V_{in}$ may be monitored as part of a determination of the interval $t_{on}$. With reference again to the timing diagram of FIG. 12, based on the relationship $V_L = L \cdot dI_L/dt$, the peak inductor current $I_P$ may be expressed in terms of the input voltage $V_{in}$, which in the embodiment of FIG. 13 appears across the inductor when the switch 214 is on or closed:

$$V_{in} = L \frac{\Delta I_L}{\Delta t} = L \left( \frac{I_P - 0}{t_{on} - 0} \right) = \frac{L I_P}{t_{on}}; \quad (8)$$

$$I_P = \frac{V_{in} t_{on}}{L}.$$

As discussed above in connection with FIG. 12, the pulsed voltage $V_L$ applied across the inductor during a given time interval $t_{on}$ is essentially a sample of the full-wave rectified voltage $V_{in}$. Hence, again assuming a switching frequency f that is significantly faster than the full-wave rectified voltage $V_{in}$ at two times the line frequency, the magnitude of $V_{in}$ generally appears substantially constant during any given time interval $t_{on}$ (although slowly changing from cycle to cycle). Substituting for $I_P$ in Eq. (7) using Eq. (8) and regrouping terms, it may be readily appreciated that $V_{in}$ drops out of the relationship, and that the interval $t_{on}$ is given as:

$$t_{on} = \frac{1}{V_{rms}} \cdot \sqrt{\frac{2 L P_{rms}}{f}}. \quad (9)$$

FIG. 13 illustrates that, according to one embodiment, the switch controller 204 may include an analog-to-digital converter 226 and a processor 250 to periodically monitor the voltage $V_{in}$ at an appropriate sampling rate and provide a suitable digitized representation of the voltage, from which $V_{rms}$ may be calculated. The processor 250 also receives some representation of the parameter $P_{rms}$ as the input information 208, which in turn represents the desired load power. In another aspect, the switch controller 204 also includes an oscillator 26 providing a pulse train 42 at the switching frequency f. The processor 250 is configured to generate the control signal 216 having a duty cycle based on a desired $t_{on}$ from Eq. (9) above by using the known values for L and f (e.g., stored as constants in processor memory), measuring $V_{in}$ and calculating $V_{rms}$, and using the input information 208 relating to the desired load power ($P_{rms}$).

In one exemplary implementation, the input information 208 in FIG. 13 may be received as a value that represents a desired load power $P_{rms}$ relative to some maximum load power $P_{max}$ (i.e., the input information 208 may be some value representing $P_{rms}/P_{max}$, or a percentage of some maximum available load power). In this implementation, the processor would then multiply the input information 208 by a known predetermined calibration value representing $P_{max}$ (e.g., also stored in processor memory) so as to provide the variable $P_{rms}$ in Eq. (9) (alternatively, of course a single calibration constant may be predetermined representing the inductance L, the frequency f, and the maximum load power $P_{max}$, which may then be used to multiply the input information 208 representing load power in relative terms). The determination of such a value representing $P_{max}$ is discussed further below in connection with FIGS. 20A-D.

Thus, the foregoing analysis demonstrates that via varying the duty cycle of a single switching stage in the power control apparatus 200 shown in FIGS. 10, 11 and 13, average power may be varied to a load in a predictable and controlled fashion while at the same time maintaining essentially unity power factor. It may also be appreciated particularly from Eq. (1) that the instantaneous power transferred via the switching operations pursuant to the foregoing analysis has a varying component (due to the varying peak inductor current $I_P$ during the energy storage portion of successive switching cycles). Another way to view the time varying nature of the instantaneous power is to consider the relationship between input and output voltages of a converter; with reference again to FIG. 10, and assuming a substantially resistive load 218, the output voltage 222 ($V_{out}$) to the load is proportional to the converter input voltage 212 ($V_{in}$) by some factor related to the duty cycle of the switching operations; hence, if the input voltage has a full-wave rectified waveform, absent any specific filtering the output voltage also has this general waveform (with a ripple component based on the switching frequency). Accordingly, appropriate filtering may be employed on the output voltage for some types of loads (e.g., such as LEDs), to mitigate the presence of a component at two times the line frequency, as discussed further below in connection with FIG. 18 and FIGS. 20A-20D.

Having discussed the control of load power based on varying the duty cycle of the switching operation while holding the number of energy transfers over time (e.g., the switching frequency f) constant, attention now turns to the effects on load power based on varying the number of energy transfers over time while holding the duty cycle of the switching operation constant. To this end, Eq. (9) may be simply rearranged as:

$$f = \frac{1}{V_{rms}^2} \cdot \frac{2LP_{rms}}{t_{on}^2}. \quad (10)$$

Although the relationship given in Eq. (10) (as well as Eq. (1)) suggests that power to the load may be varied linearly with switching frequency f generally there are practical limits on the range of switching frequencies that place corresponding constraints on the controlled variation of power to the load. For example, there may be practical limits placed on the range of switching frequencies due to the component(s) used to implement the switch 214 as well as other circuit components. At sufficiently high frequencies, switching losses (which generally increase with increasing frequency) may present practical limitations on the highest usable frequency f in a given application. Also, radiated noise resulting from high frequency switching operations may present practical limitations on the highest usable frequency f due to regulatory constraints (presently, a general range of switching frequencies f conventionally employed in many types of DC-DC converters includes, but is not limited to, frequencies from approximately 50 KHz-100 KHz).

Also, the type of load to be controlled may influence the range of switching frequencies f that may be practically employed to control power to the load. For example, as discussed above, one load of interest according to some embodiments of the present disclosure includes one or more LEDs, in which the perceived brightness of light generated by the LED(s) is controlled based on pulsed power delivery. Preferably, the LED(s) of such a load are energized in a pulsed fashion at a frequency that is greater than that capable of being detected by the human eye (e.g., greater than approximately 100 Hz) so as to avoid a "flicker" effect. Hence, in this application, the "flicker frequency" of the human eye may represent a lower limit for the switching frequency. Obviously, a potential flicker effect also needs to be taken into consideration with respect to significant variations in the output voltage at two times the line frequency, as noted above. Again, this situation is discussed further below in connection with FIG. 18 and FIGS. 20A-20D. In any case, frequencies on the order of a couple of hundred Hz may present a practical lower limit for the range of switching frequencies.

While the switching frequency f may be directly modulated to vary power to a load according to Eqs. (1) and (10), another possibility for varying power is given by a "pulse dropping" or "pulse number modulation" technique based on the concept of one-bit D/A conversion, and corresponds to varying an effective frequency $f_{eff}$ of the switching operation between some minimum and maximum value (based on the reference pulse stream frequency f) so as to vary power to the load.

Figure 14:
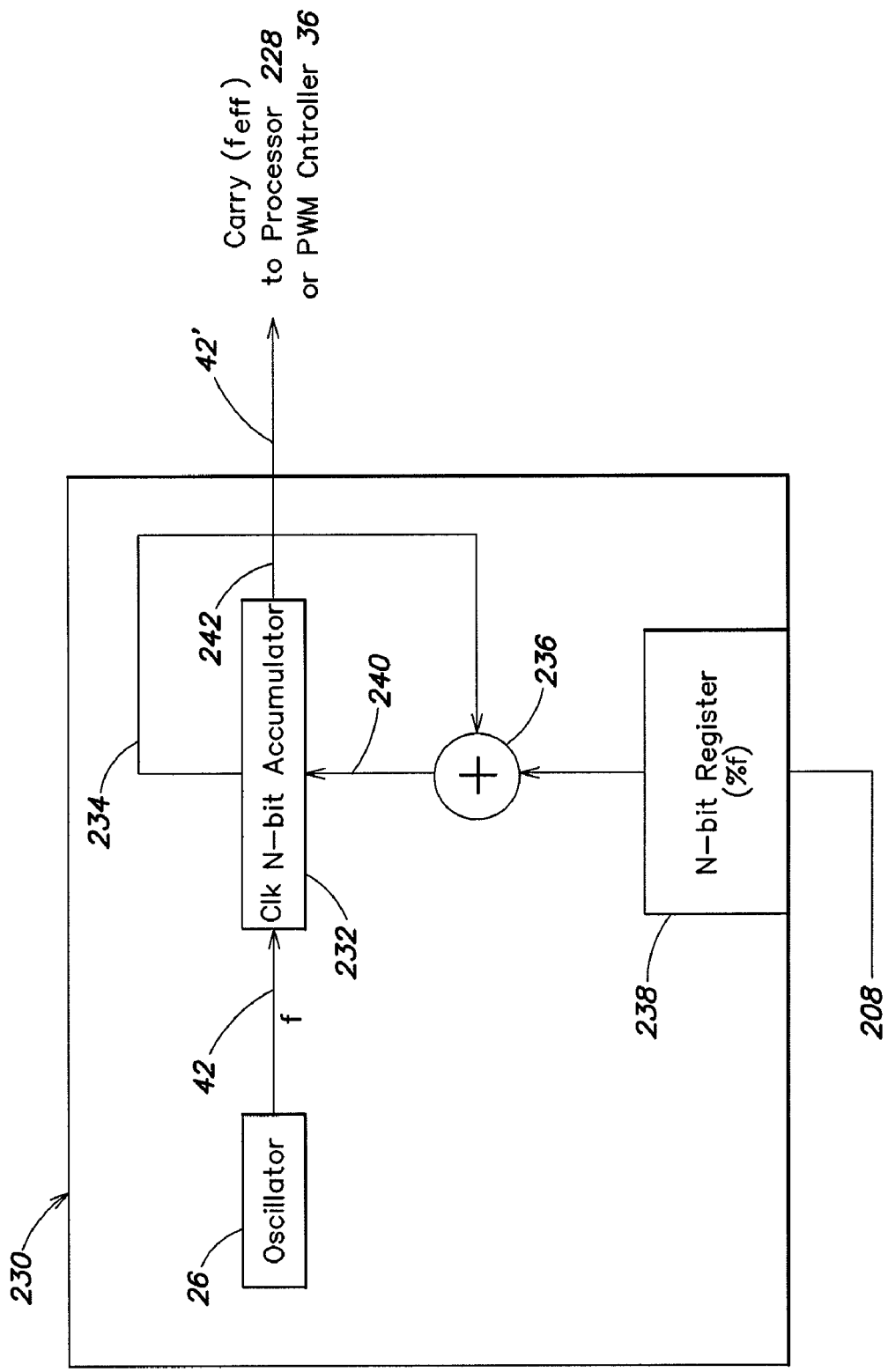
FIG. 14 is a circuit diagram illustrating a portion of a switch controller of the power control apparatus of FIGS. 10 and 11 according to another embodiment of the disclosure, in which the apparatus is controlled based on adjusting an effective frequency of a switching operation.

FIG. 14 is a block diagram schematically illustrating a pulse generation controller 230, which may be included as part of a switch controller 204 of a power control apparatus 200, according to one embodiment of the present disclosure. In one exemplary implementation of a switch controller based on the embodiment of FIG. 14, the pulse generation controller 230 may be employed to replace the oscillator 26 of the switch controller 204 shown in FIG. 13, and the input information 208 (representing a desired average power $P_{rms}$ drawn from the A.C. power source due to the load) may be used to control the pulse generation controller 230. In particular, the pulse generation controller 230 of FIG. 14 is configured to facilitate control of power to the load via a pulse dropping or pulse number modulation technique, rather than controlling the quantum of energy per transfer via the duty cycle of the switch 214 (as in the embodiment shown in FIG. 13). To this end, the pulse generation controller 230 outputs a modified pulse stream 42' having an effective frequency $f_{eff}$ that may be varied with respect to a reference oscillator frequency f This modified pulse stream 42' is in turn used by a switch controller to control an effective frequency, rather than the duty cycle, of the control signal 216 that controls the switch 214 (e.g., the modified pulse stream 42' may be provided as an input to a processor similar to the processor 250 shown in FIG. 13, in place of the pulse stream 42).

As discussed above, in some embodiments of a switch controller based on the pulse generation controller 230 of FIG. 14, the switch controller may be configured to establish a preset fixed duty cycle. In one aspect of such a switch controller, the input information 208 ($P_{rms}$) then is used to determine a desired effective switching frequency $f_{eff}$ for the switch 214, wherein the preset fixed duty cycle represents a maximum average power $P_{max}$ to the load when the input information 208 calls for a maximum effective frequency $f_{eff}$. In this sense, in this embodiment, the input information representing the desired average power $P_{rms}$ drawn from the A.C. power source by the load effectively represents a desired effective frequency that is some percentage of the reference frequency f.

As shown in FIG. 14, in one exemplary implementation, the pulse generation controller 230 includes an N-bit register 238 to store a digital value between zero and ($2^N-1$) based on the input information 208. Again, according to one aspect, the digital value stored in the N-bit register 238 represents a desired effective switching frequency $f_{eff}$ in the form of a percentage of the reference frequency f and is accordingly indicated in FIG. 14 as % f. The pulse generation controller 230 also includes the oscillator 26 providing the pulse stream 42 at the reference frequency f.

In FIG. 14, an N-bit accumulator 232 receives as a "clock" input the pulse stream 42, and is configured to load an N-bit digital input value 240 into the accumulator 232 with every pulse of the pulse stream 42. The N-bit input value 240 loaded into the accumulator is the sum of the previous value 234 stored in the accumulator, plus the digital value % f stored in the N-bit register 238 (based on the input information 208), as indicated by the adder 236. Like the register 238, the N-bit accumulator has a maximum digital value of ($2^N-1$); hence, if the input value 240 exceeds ($2^N-1$), the accumulator is configured to store the difference between the input value 240 and ($2^N-1$), and output a carry signal 242 representing an overflow condition. The carry signal returns to zero if the next pulse of the pulse stream 42 removes the overflow condition (i.e., if the next input value 240 loaded into the accumulator is less than ($2^N-1$)).

Hence, the carry signal 242 of the N-bit accumulator 232 represents a modified pulse stream 42', wherein the number of pulses in the modified pulse stream output by the accumulator in a given time period (# pulses out) is related to the number of pulses of the pulse stream 42 for the same time period (# pulses in) by:

$$\frac{\# \text{ pulses out}}{\# \text{ pulses in}} = \frac{\%f}{2^N}, \quad (11)$$

where, again, % f represents the digital value stored in the N-bit register 238 (ranging from zero to $2^N-1$). As discussed above, according to one embodiment, this modified pulse stream 42' is used by the switch controller to determine the effective switching frequency $f_{eff}$ of the switch 214 of the power control apparatus. From the above relationship, dividing the numerator and denominator by units of time to obtain frequency (i.e., frequency =# pulses/unit time), this effective switching frequency $f_{eff}$ relates to the reference frequency f according to:

$$f_{eff} = \left(\frac{\%f}{2^N}\right)f. \quad (12)$$

Hence, by varying the parameter % f between zero and ($2^N-1$), the power to the load similarly may be varied according to Eq. (1) above (where $f_{eff}$ is substituted for f). Of course, it should be readily appreciated from Eq. (12) that the number N dictates the resolution of power increments, and that N may be chosen based at least in part on the particular requirements of a given load for a given application.

As discussed above, there may be some practical lower limit on the effective frequency $f_{eff}$ depending on the type of load. For example, considering an exemplary load including one or more LEDs, switching frequencies significantly lower than approximately a couple of hundred Hz may result in an undesirable "flicker effect" in which the perceived brightness of the illumination generated by the LED(s) is no longer essentially continuous. Also, any filtering required for the output voltage to mitigate variations at two times the line frequency may limit the lower range of effective switching frequency.

For purposes of providing a practical example of control of one or more LEDs based on a pulse number modulation technique as discussed above in connection with FIG. 14, we consider an exemplary reference frequency f of 130 KHz for the pulse stream 42. It should be appreciated that various implementations according to the present disclosure are not limited in this respect, but rather that oscillator frequencies on the order of 100 KHz or so are commonly employed in various DC-DC converter configurations; accordingly, this reference frequency provides an appropriate example for purposes of illustration, but other reference frequencies may be used in various embodiments.

Given a reference frequency of 130 KHz and a minimum frequency of approximately 500 Hz (e.g., based on output voltage filtering), it may be readily appreciated that the ratio of minimum to maximum frequency for the effective switching frequency $f_{eff}$ is on the order of 1:250. Stated differently, to provide a minimum power to the LED-based load without noticeable flicker in the present example, for every 250 pulses of the pulse stream 42 at a frequency of 130 KHz, the pulse generation controller 230 of FIG. 14 should provide at least one pulse in the modified pulse stream 42'.

Accordingly, to accommodate this range of effective switching frequencies based on a reference frequency of 130 KHz, in one embodiment an N=8-bit register 238 and an N=8-bit accumulator 232 may be employed in the pulse generation controller 230 of FIG. 14, where $2^8=256$. Thus, according to Eq. (12) above, a minimum effective frequency $f_{eff}$ of (1/256) f, or approximately 508 Hz, is achieved when the digital value of % f=1, and a maximum effective frequency $f_{eff}$ of (255/256) f, or approximately 129.5 KHz, is achieved when the digital value of % f=255. It should also be appreciated that, in the present example, variations in power to the load based on varying the value of % f are limited to increments of 1/256 of the maximum power $P_{max}$ (i.e., the minimum power resolution capable of being achieved using a 8-bit register and accumulator is 1/256).

One issue that may arise in connection with controlling power to a load including one or more LEDs relates to a somewhat non-linear relationship between applied average power to the LED(s) and a corresponding perceived brightness of the light generated by the LED(s). For example, the perceived brightness of light generated by one or more LEDs generally changes more dramatically with changes in power at relatively low power levels, whereas changes in power at relatively higher power levels generally results in a somewhat less pronounced change in perceived brightness. In view of the foregoing, another embodiment of the pulse generation controller 230 shown in FIG. 14 is directed to enhancing the power resolution capability of the controller (i.e., reducing the minimum increment of power variation capable of being achieved by the controller) while at the same time essentially maintaining a predetermined ratio of minimum to maximum frequency for the effective switching frequency $f_{eff}$. By enhancing the power resolution, greater control of power variation may be facilitated, which in some cases may be especially desirable (e.g., at lower load powers for loads such as LEDs).

More specifically, according to one aspect of this embodiment, the number of bits N for the N-bit register 238 and the N-bit accumulator 232 is selected such that the minimum to maximum frequency ratio (i.e., $1:2^N$) for the effective switching frequency $f_{eff}$ is less than a predetermined required minimum ratio. For instance, in the example discussed above regarding LEDs, given a maximum reference frequency of 130 KHz and a minimum frequency of approximately 500 Hz to avoid an undesirable flicker effect, a value of N=8 provides a required ratio of minimum to maximum frequency for the effective switching frequency $f_{eff}$ (and a minimum power resolution) of 1:256. By selecting an N>10, thereby reducing the ratio $1:2^N$, the power resolution may be enhanced (i.e., the minimum power increment may be reduced). However, so as to maintain the required minimum to maximum frequency ratio of 1:256, the minimum value of % f needs to be offset (i.e., increased) so as to ensure that the minimum effective frequency does not fall significantly below 500 Hz.

Figure 17:
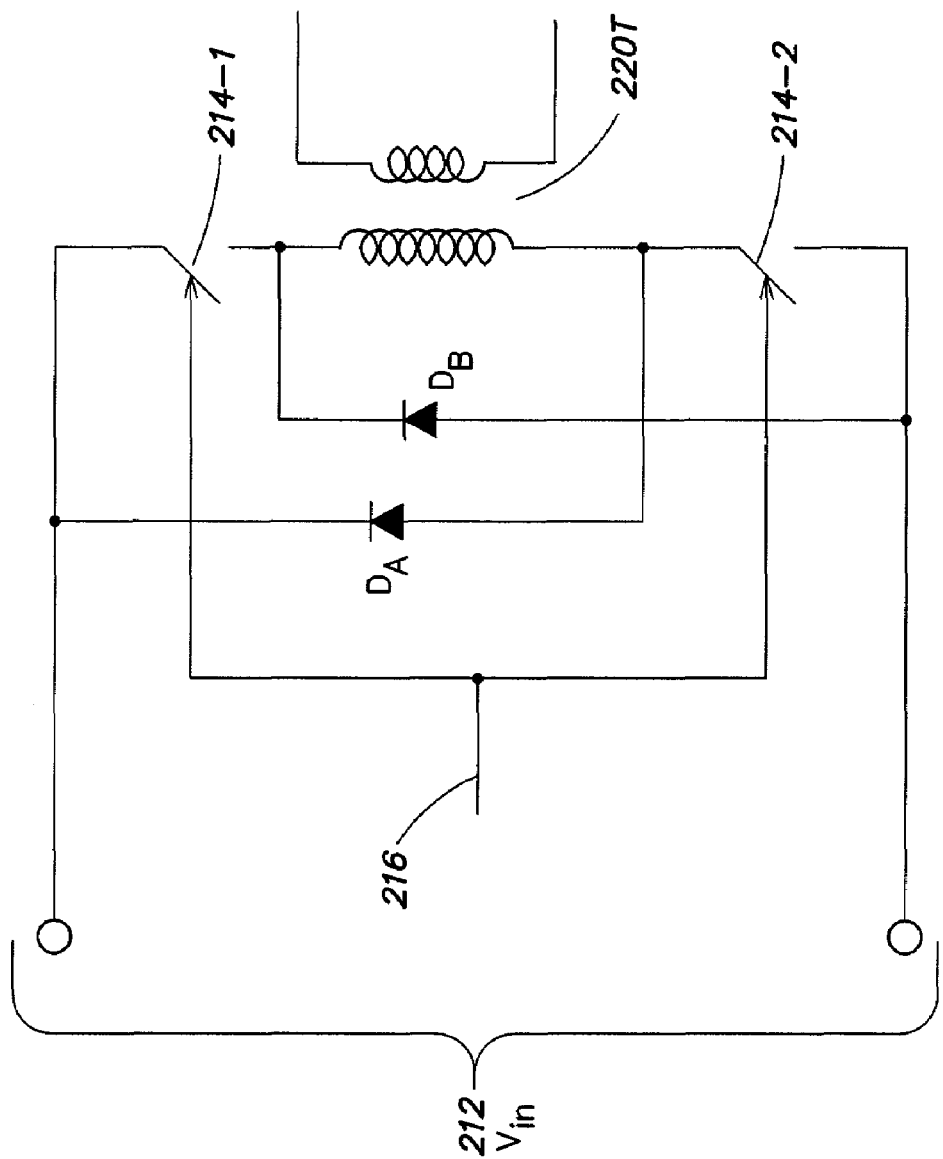
FIG. 17 is a circuit diagram illustrating a portion of the power control apparatus shown in FIG. 16 including the primary winding of the transformer, with additional components to reduce residual stored energy, according to one embodiment of the disclosure.

For purposes of illustration, consider the case of N=16 for the N-bit register 238 and the N-bit accumulator 232 of FIG. 17. In this case, the minimum power increment is given by $1:2^{16}$ or 1:65,536 (i.e., a significant improvement in resolution over N=8). However, if the minimum value for % f were still allowed to be % f=1, the minimum effective frequency $f_{eff}$ would be approximately 2 Hz (i.e., 1/65,536·130 KHz), well below the minimum frequency to avoid an undesirable flicker effect. Accordingly, in one embodiment, the minimum value for % f is offset so as to maintain the appropriate ratio of minimum to maximum frequency for the effective switching frequency $f_{eff}$. Hence, in the present example in which N=16, the minimum value of % f, including an offset, would be 252, such that the minimum effective switching frequency would be (252/65,536·130 KHz), or approximately 500 Hz. From this minimum value, the effective switching frequency may be increased in increments of (1/65,536·130 KHz)=2 Hz (as % f is increased from 252 to 253 to 254, etc.), affording a significant increase in power control ability as compared to the example in which N=8.

It should be appreciated that, in the discussion above relating to enhanced power resolution in the pulse generation controller 230 of FIG. 14, exemplary values for N and the number of bits in the input information 208 are provided primarily for purposes of illustration, and that various embodiments of the present disclosure are not limited in this respect.

Having now discussed the control of load power based on varying the duty cycle of switching operations while holding the number of energy transfers over time constant, and varying the number of energy transfers over time while holding the duty cycle of the switching operations constant, it should be appreciated that according to other embodiments, both the duty cycle and switching frequency (or effective switching frequency) of the switching operations may be varied, based on the concepts discussed above, to achieve a wide range of power control capability. In particular, rearranging Eq. (10) to isolate the average power $P_{rms}$ drawn from the A.C. power source by the load (represented by the input information 208), and substituting $f_{eff}$ for f, gives:

$$P_{rms} = \frac{1}{2L} \cdot V_{rms}^2 \cdot t_{on}^2 \cdot f_{eff}. \tag{13}$$

Accordingly, for some given desired load power and measured $V_{rms}$, one or both of $t_{on}$ and $f_{eff}$ may be determined to provide the desired power.

Figure 15:
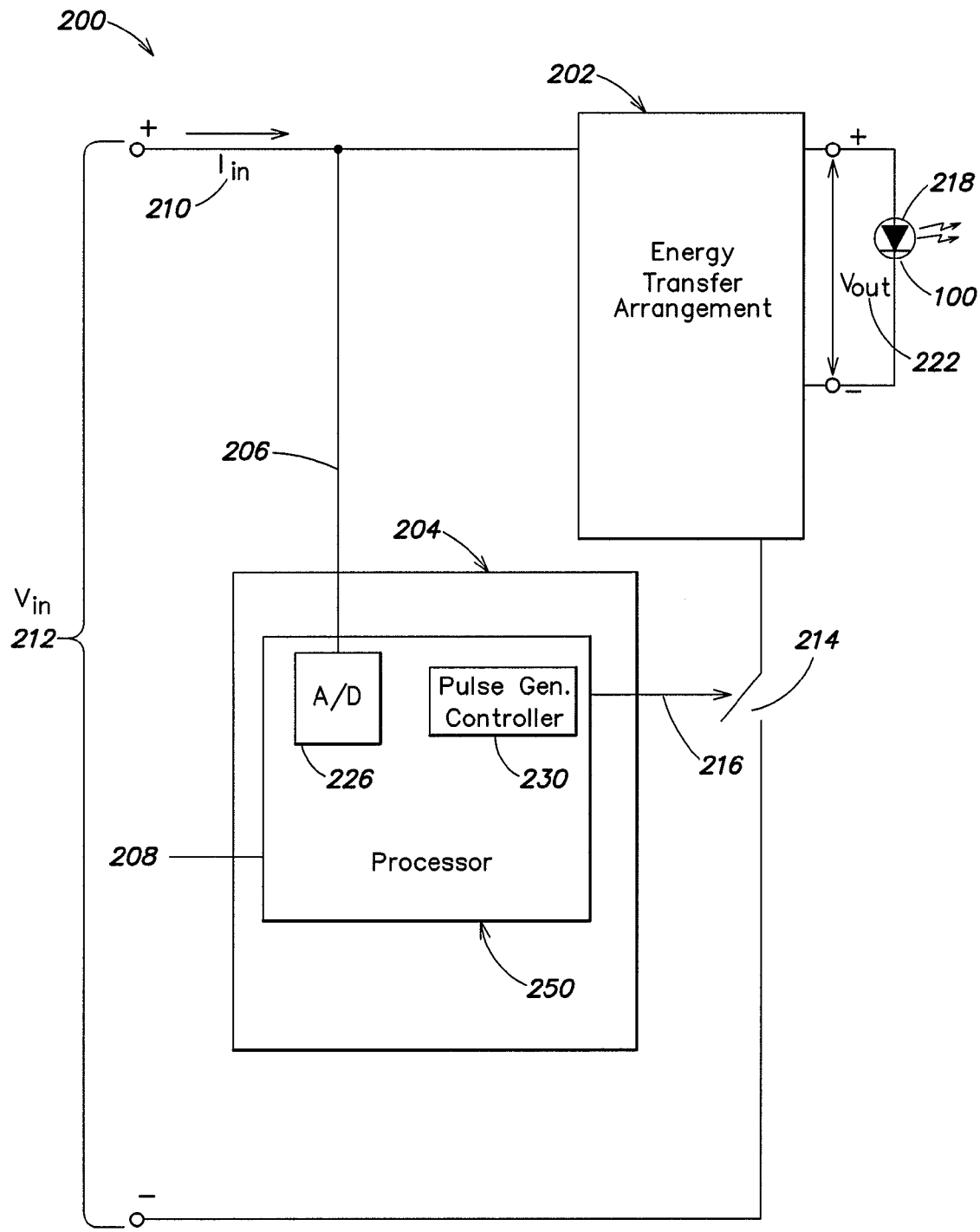
FIG. 15 is a diagram illustrating a power control apparatus according to another embodiment of the disclosure, in which both the duty cycle and effective switching frequency of a switching operation may be controlled to control power to a load.

FIG. 15 is a diagram illustrating a power control apparatus 200 according to yet another embodiment of the present disclosure, in which both the duty cycle and effective switching frequency of switching operations performed by the switch 214 may be controlled to control power to the load 218. In FIG. 15, the processor 250 receives the input information 208 representing a desired load power ($P_{rms}$); in response to the input information 208, the processor is configured to control the duty cycle of the switch 214 (e.g., according to Eq. (9) above), and/or the effective switching frequency of the switch 214 via the control signal 216. To these ends, in various aspects, the processor 250 of the switch controller shown in FIG. 15 may include an A/D converter 226 to monitor the voltage $V_{in}$ n so as to determine $V_{rms}$. Also, the processor 250 in FIG. 15 may be configured to implement the function of the pulse generator controller 230 discussed above in connection with FIG. 14.

In the embodiment of FIG. 15, the processor 250 may be configured to process the input information 208 in any of a variety of manners; generally, the processor may be configured to vary one or both of the parameters $t_{on}$ and $f_{eff}$ based on a desired load power represented by the input information 208. This capability provides for a wide range of flexibility in controlling load power for different types of loads. For example, in one aspect of this embodiment, for a relatively lower range of desired load powers, the processor may be configured to fix $t_{on}$ at a predetermined value, thereby fixing the switch's duty cycle and hence the quantum of energy transferred to the load in a given switching cycle. With $t_{on}$ fixed, the processor may be configured to then control load power via adjustments to the effective switching frequency $f_{eff}$ (via changes to the modified pulse stream 42'). In contrast, for a relatively higher range of desired load powers, the processor may be configured to vary the duty cycle via the time interval $t_{on}$ while holding $f_{eff}$ constant at some appropriate predetermined value. In yet another aspect, for some intermediate range of desired load powers, the processor may be configured to vary both $t_{on}$ and $f_{eff}$ to vary load power within the intermediate range More generally, the respective "weights" given to $t_{on}$ and $f_{eff}$ in ultimately determining the load power according to Eq. (13) may be apportioned in a variety of manners. For purposes of the following discussion, it is presumed that based on a given circuit implementation, there is some maximum switch on time $t_{max}$, and some maximum switching frequency $f_{max}$ that provides some maximum average load power $P_{max}$. If the input information 208 is provided as a power command representing some percentage of the maximum average load power $P_{max}$ (i.e., in relative rather than absolute terms, namely, $P_{rms}/P_{max}$), the relationship given in Eq. (13) may be re-expressed as:

$$\frac{P_{rms}}{P_{max}} = \left(\frac{t_{on}}{t_{max}}\right)^2 \cdot \frac{f_{eff}}{f_{max}}. \tag{14}$$

Thus, for some given power command representing $P_{rms}/P_{max}$ (i.e., having a value from zero to one), one or both of $t_{on}$ and $f_{eff}$ may be determined as some percentage of a maximum value. For purpose of determining some apportionment for $t_{on}$ and $f_{eff}$ assuming that both are variable, these respective percentages may be represented by the variables $t_{gain}$ and $f_{gain}$, and Eq. (14) may be rewritten as:

$$\frac{P_{rms}}{P_{max}} = t_{gain}^2 \cdot f_{gain}. \tag{15}$$

Eq. (15) provides a convenient relationship by which to assess the respective relative effects of duty cycle and switching frequency on load power based on the maximum power available to the load. According to Eq. (15), virtually any number of possible relationships between $t_{gain}$ and $f_{gain}$ are possible, and different relationships between $t_{gain}$ and $f_{gain}$ over different ranges of relative power $P_{rms}/P_{max}$ are possible, provided that the product indicated in Eq. (15) is less than or equal to one. For example, in some implementations (as discussed above in connection with FIGS. 13 and 14) either of $t_{gain}$ or $f_{gain}$ may be held constant while the other is varied so as to vary load power (e.g., either of $t_{gain}$ or $f_{gain}$ may be set to 1 in Eq. (15)). In another exemplary implementation, an "equal" apportionment may be used, according to the constraint:

$$t_{gain}^2 = f_{gain},\qquad(16)$$

such that Eq. (15) becomes:

$$\frac{P_{rms}}{P_{max}} = f_{gain}^2.\qquad(17)$$

For this exemplary implementation, input information in the form of a power command representing $P_{rms}/P_{max}$ (i.e., having a value from zero to one) may be processed by the processor 250 of FIG. 15 thusly; first, the square root of the power command is taken to obtain a value for $f_{gain}$ according to Eq. (17).

The processor 250 then calculates $f_{\mathit{eff}}$ based on a known value for $f_{max}$ (e.g., based on the frequency f of the oscillator 26, which may be a parameter stored in memory accessible to the processor). Subsequently, the processor 250 may calculate $t_{on}$ using Eq. (9), based on periodically updated measurements of $V_{in}$ and calculations of $V_{rms}$ as discussed above in connection with FIG. 13, and using the value $f_{\mathit{eff}}$ calculated immediately above. Rewriting Eq. (9) as:

$$t_{on} = \frac{1}{V_{rms}} \cdot \sqrt{\frac{1}{f_{\mathit{eff}}}} \cdot \sqrt{2LP_{max}} \cdot \sqrt{\text{power command}},\qquad(18)$$

the quantity $2LP_{max}$ may be viewed as another parameter stored in memory accessible to the processor (e.g., EEPROM), which parameter may be determined during manufacture and initial testing of the apparatus based on various circuit components employed in the apparatus. Based on Eq. (18), the processor would multiply the input command by the factor $2LP_{max}$ and then take the square root. In one exemplary implementation discussed below in connection with FIGS. 20A-20D, the parameter $2LP_{max}$ may be determined as a calibration value during initial testing such that a power command representing maximum load power (i.e., $P_{rms}/P_{max}=100\%$) determines a time interval $t_{on}$ at a maximum effective switching frequency $f_{max}$ that actually provides a target maximum power to the load.

In some implementations of a power control apparatus according to various embodiments of the present disclosure, one or more energy transfer elements (e.g., inductors, transformers) of an energy transfer arrangement 202 may include a tapped inductor or a transformer with multiple windings having different numbers of turns to which an input voltage is applied and from which an output voltage is derived. Such components may facilitate the implementation of a power control apparatus that effectively controls power to a load in situations where the input voltage $V_{in}$ and the output voltage $V_{out}$ of the power control apparatus are significantly different (i.e., when the input voltage is significantly greater or less than the output voltage).

With reference again to FIG. 1, consider the basic input-output voltage relationship for the conventional buck converter, given by:

$$\frac{V_{out}}{V_{in}} = D$$

(where D is the duty cycle of the switch). As discussed earlier, other DC-DC converter configurations have somewhat similar relationships between voltage ratio and duty cycle. In any case, the relationship above generally illustrates the premise that as the desired output voltage becomes significantly different than the available input voltage, in some instances the required duty cycle of the switch may become very short or very long as compared to the total period of a switching cycle. In general, an extremely low duty cycle (extremely short pulse time $t_{on}$) or an extremely long duty cycle (extremely short off time $t_{off}$) may make it more difficult to accurately control the amount of energy transferred to the load with each switching cycle.

In view of the foregoing, in some implementations of power control apparatus according to various embodiments of the present disclosure, a tapped inductor or a transformer having windings with different numbers of turns may be employed in an energy transfer arrangement 202, such that a turns ratio N of the inductor or transformer facilitates a more accurate control of energy transfer (the turns ratio N commonly is defined as the number of windings of a transformer or inductor to which an input voltage is applied, divided by the number of windings from which an output voltage is taken). In various embodiments, the turns ratio N of the inductor or transformer may be selected such that the pulse time $t_{on}$ is increased relative to the time $t_{off}$ while essentially maintaining a desired input-output voltage relationship. In particular, larger values of N (i.e., relatively smaller numbers of output windings) increase the current during the transfer of energy to the load and hence allow the stored energy to be transferred faster to the load.

Figure 16:
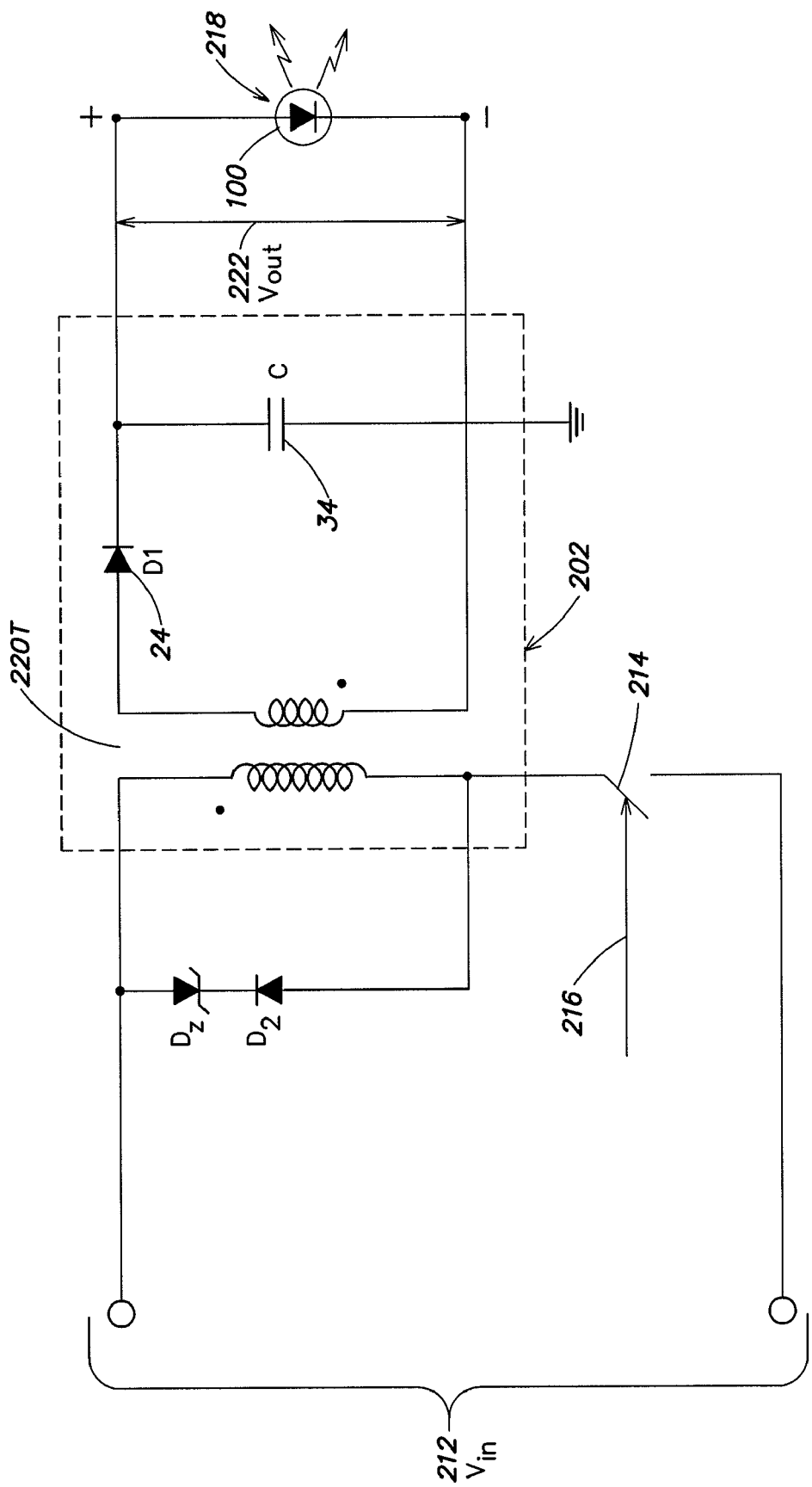
FIG. 16 is a circuit diagram illustrating a portion of a power control apparatus incorporating a transformer, according to one embodiment of the disclosure.

FIG. 16 is a circuit diagram illustrating a portion of a power control apparatus having an energy transfer arrangement that incorporates a transformer 220T and has a configuration of a flyback converter, according to one embodiment of the present disclosure (a flyback converter configuration was initially discussed above in connection with FIG. 7, and is similar in nature to a buck-boost, or inverting converter). It should be appreciated that any of the other energy transfer arrangements discussed herein may be equipped with a tapped inductor or transformer having some non-unity turns ratio N, and that the exemplary flyback converter configuration shown in FIG. 16 is provided primarily for purposes of illustration.

To provide one exemplary implementation of a power control apparatus employing the energy transfer arrangement 202 shown in FIG. 16 and exemplary circuit values for such an implementation, a convenient design approximation to ensure discontinuous mode operation is to set the inductance of the primary winding of the transformer to satisfy the condition that $t_{on}$ is approximately one-third to one-half the total period T at a minimum expected line voltage (from which $V_{in}$ is derived) and a maximum switching frequency f (i.e., essentially a worse case scenario for transferring some predetermined maximum power to the load under minimum input voltage conditions). Thus, rearranging Eq. (10), gives:

$$L = \frac{t_{on}^2 f V_{rms}^2}{2P_{rms}}.\qquad(20)$$

Using exemplary values of $T/3<t_{on}<T/2$, $f=130$ KHz, $V_{rms}=90$ Vrms, and a desired output power $P_{rms}=25$ Watts, the resulting values for L fall into a range of from 138 micro Henries to 310 micro Henries. The time necessary to transfer the energy from the secondary winding to the load (e.g., see $t_2$ in FIG. 12) can then be set to approximately T/3 via the turns ratio N to ensure discontinuous mode operation. Using a primary inductance of 310 micro Henries and a secondary voltage of about 45 Vrms, a turns ratio of N=three results in a secondary inductance of about 34.6 micro Henries.

Again, it should be appreciated that the foregoing example is provided primarily for purposes of generally illustrating an exemplary range of input and output voltage parameters and desired load power given some exemplary circuit values for one possible implementation. In general, the inductance value L and turns ratio N of the transformer may be selected to facilitate predictable transfer of a desired range of load powers given the expected input voltage, desired output voltage and general range of switching frequencies.

In some implementations of power control apparatus according to various embodiments of the present disclosure, depending on the actual components employed, one or more energy storage elements may not completely discharge their stored energy to the load during the time interval $t_{off}$ of each switching cycle. In the case of inductors or transformers serving as energy storage elements, this residual energy may be due primarily to a winding capacitance. The amount of the residual energy stored in the winding capacitance is voltage dependent (since the energy-capacitance relationship $W=(½)CV^2$ includes the voltage squared as a principal term). Such residual energy may be observed as a "ringing" at the conclusion of a switching cycle, which represents the continual transfer of energy from the winding capacitance to the inductance and back again. In some instances, this residual energy may affect the precision with which power may be transferred to the load.

According to one embodiment, this ringing effect due to residual energy may be reduced primarily by selecting inductors or transformers with a low winding capacitance. Any remaining residual energy further may be reduced, or even substantially eliminated, by providing a discharge path for the residual energy once the transfer of energy to the load is complete. For example, with reference again to the exemplary circuit shown in FIG. 16, once the diode 24 stops conducting during the time interval $t_{off}$ (i.e., at a point when substantially all of the energy stored in the transformer 220T has been transferred to the load), a low impedance may be appropriately placed across the transformer primary 220T for a short time, so as to effectively discharge any residual energy. In one exemplary implementation, this may be accomplished by placing an auxiliary transistor (e.g., FET) across the inductor winding (not shown in FIG. 16), which is switched on briefly at an appropriate time (e.g., after the diode 24 ceases to conduct).

In another exemplary implementation, a series connection of a zener diode $D_Z$ and a diode $D_2$, as shown in FIG. 16, may be placed across the primary winding of the transformer to discharge residual energy. In yet another implementation, as shown in FIG. 17, two simultaneously controlled switches 214-1 and 214-2 may be employed to replace the switch 214, wherein the primary winding of the transformer 220T is disposed in series between the two switches. Two diodes $D_A$ and $D_B$ are used to couple the primary winding to the input voltage $V_{in}$ in the manner shown in FIG. 17 such that, when the switches are open, any residual energy in the winding has a path to the input voltage. It should be readily appreciated that although two switches are employed in this implementation, the power control apparatus employing this feature nonetheless remains as a "single switching stage" configuration to transfer power to a load while maintaining high power factor.

Figure 18:
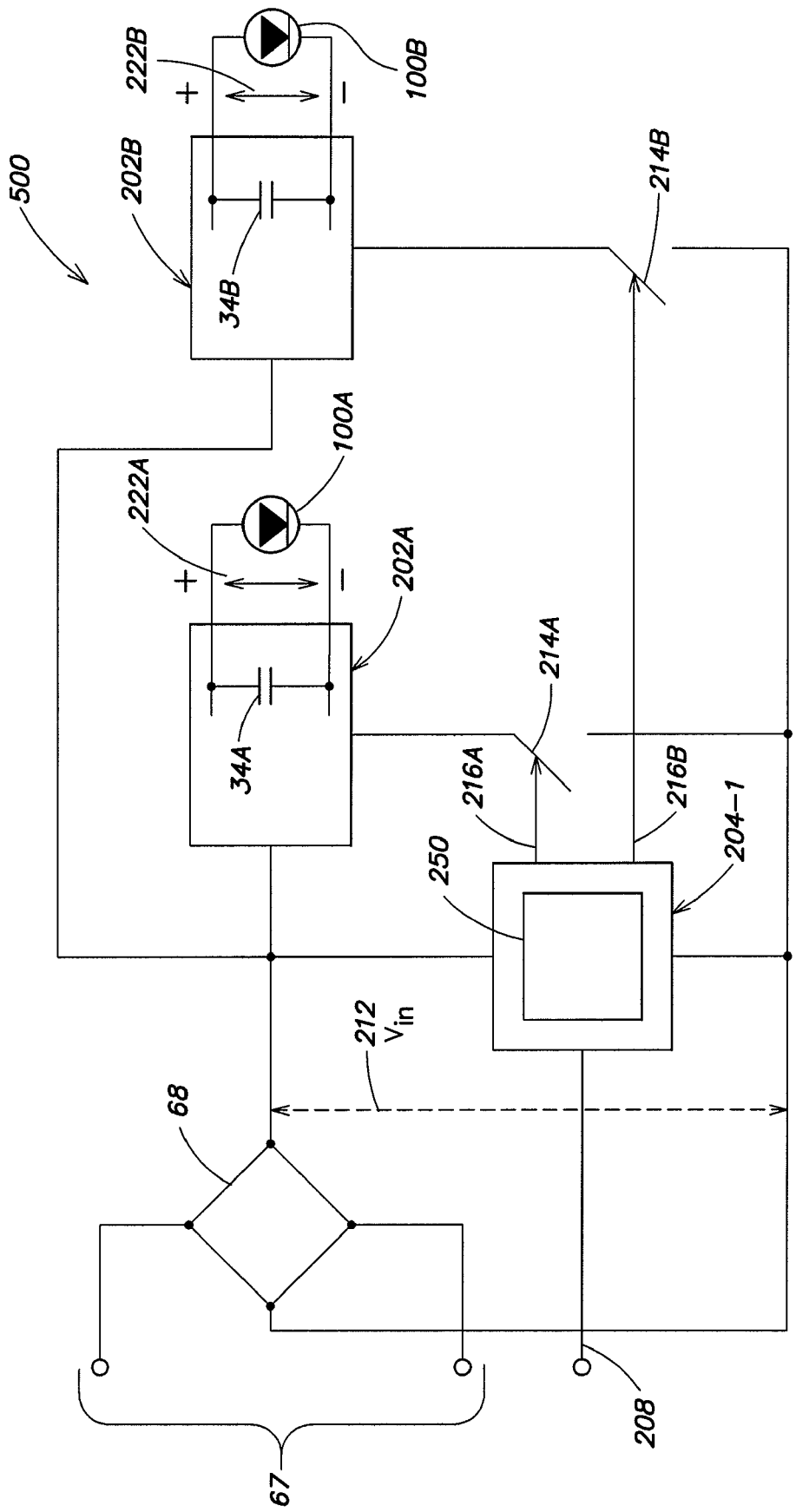
FIG. 18 is a block diagram illustrating a multiple channel lighting apparatus based on the power control apparatus of FIGS. 10-17, according to one embodiment of the disclosure.

FIG. 18 illustrates yet another embodiment of the present disclosure, based on the various power control apparatus discussed above. In particular, FIG. 18 is a block diagram of a multi-channel lighting apparatus 500 including multiple energy transfer arrangements 202A and 202B that are employed to deliver power to respective LED loads 100A and 100B. As in other embodiments discussed above in connection with FIGS. 10-17, the lighting apparatus 500 derives power from an AC power source (i.e., the AC line voltage 67) via the bridge rectifier 68. Both of the energy transfer arrangements 202A and 202B are coupled to the input voltage 212 ($V_{in}$) and provide respective output voltages 222A and 222B to the loads. The energy transfer arrangements may include any of a number of possible converter configurations discussed herein, including the flyback arrangements shown in FIGS. 16 and 17. The energy transfer arrangements are respectively controlled by corresponding switches 214A and 214B, such that each energy transfer arrangement/switch combination constitutes one "channel" of the multi-channel apparatus. Each such channel functions similarly to the power control apparatus discussed above to deliver power to its load via a single switching stage, while at the same time achieving significantly high power factor. As discussed above, in one aspect, each channel may be configured to deliver power to a load in a "feed-forward" fashion, i.e., without requiring information pertaining to the load (e.g., load voltage and/or load current) as feedback to affect the control of switching operations under normal operation.

In the multi-channel lighting apparatus 500 of FIG. 18, a multi-channel switch controller 204-1 is employed to individually and independently control the switches 214A and 214B via the respective control signals 216A and 216B. In one aspect, the switch controller 204-1 may include a processor 250 to implement the various switch control functions discussed above to adjust one or both of duty cycle and effective switching frequency for each channel based on input information 208. More specifically, in one embodiment, the input information 208 may include representations of a first desired load power for the load 100A and a second desired load power for the load 100B, and the processor 250 is configured to process this information so as to appropriately control the switches 214A and 214B, based on the respective desired load powers and the monitored input voltage $V_{in}$ (from which $V_{rms}$ may be calculated by the processor). Although the lighting apparatus 500 is shown in FIG. 18 as including two channels, it should be appreciated that lighting apparatus according to the present disclosure are not limited in this respect, as different numbers of energy transfer arrangements, associated switches, and associated loads (different numbers of channels) may be included in lighting apparatus according to various embodiments.

In the lighting apparatus 500 of FIG. 18, each of the LED-based loads may include one or more LEDs of a same color (e.g., essentially monochromatic "single" color LEDs, or broader bandwidth white LEDs), and different loads may include different color LEDs (e.g., the load 100A may include only one or more of a first type of LED configured to generate radiation having a first spectrum, and the load 100B may include only one or more of a second type of LED configured to generate radiation having a second spectrum different from the first spectrum). In another aspect, the respective loads may contain the same or different numbers of LEDs, and one or more of the loads may contain multiple LEDs interconnected in any of a variety of serial, parallel, or serial/parallel configurations (which ultimately may determine, at least in part, the required output voltages 222A and 222B).

In other aspects of the embodiment of a multi-channel lighting apparatus 500 shown in FIG. 18, the switch controller 204-1 may be an addressable device so as to facilitate control of the lighting apparatus 500 via a network (e.g., in one embodiment, the processor 250 may be an addressable processor). For example, in a network environment, the input information 208 may be provided to a number of different devices, including multiple lighting apparatus with respective loads, wherein the input information 208 includes load power control information for the multiple lighting apparatus. According to one embodiment, as the input information 208 is communicated via the network to different lighting apparatus, the processor 250 of a given apparatus may be configured to be responsive to particular information/data (e.g., commands representing desired load power) that pertain to it (e.g., in some cases, as dictated by a particular identifier or address associated with the processor). Once the processor 250 identifies particular information/data intended for it, it may process the information/data and control load power conditions accordingly (e.g., via one or both of duty cycle and effective switching frequency).

In yet another aspect of the embodiment shown in FIG. 18, the processor 250 of a given lighting apparatus 500, whether or not coupled to a network, may be configured to interpret input information 208 that is received in a DMX protocol (as discussed, for example, in U.S. Pat. No. 6,016,038), which is a lighting command protocol conventionally employed in the lighting industry for some programmable lighting applications. However, it should be appreciated that power control apparatus and lighting apparatus according to various embodiments of the present disclosure are not limited in this respect, as they may be configured to be responsive to other types of communication protocols.

Figure 19:
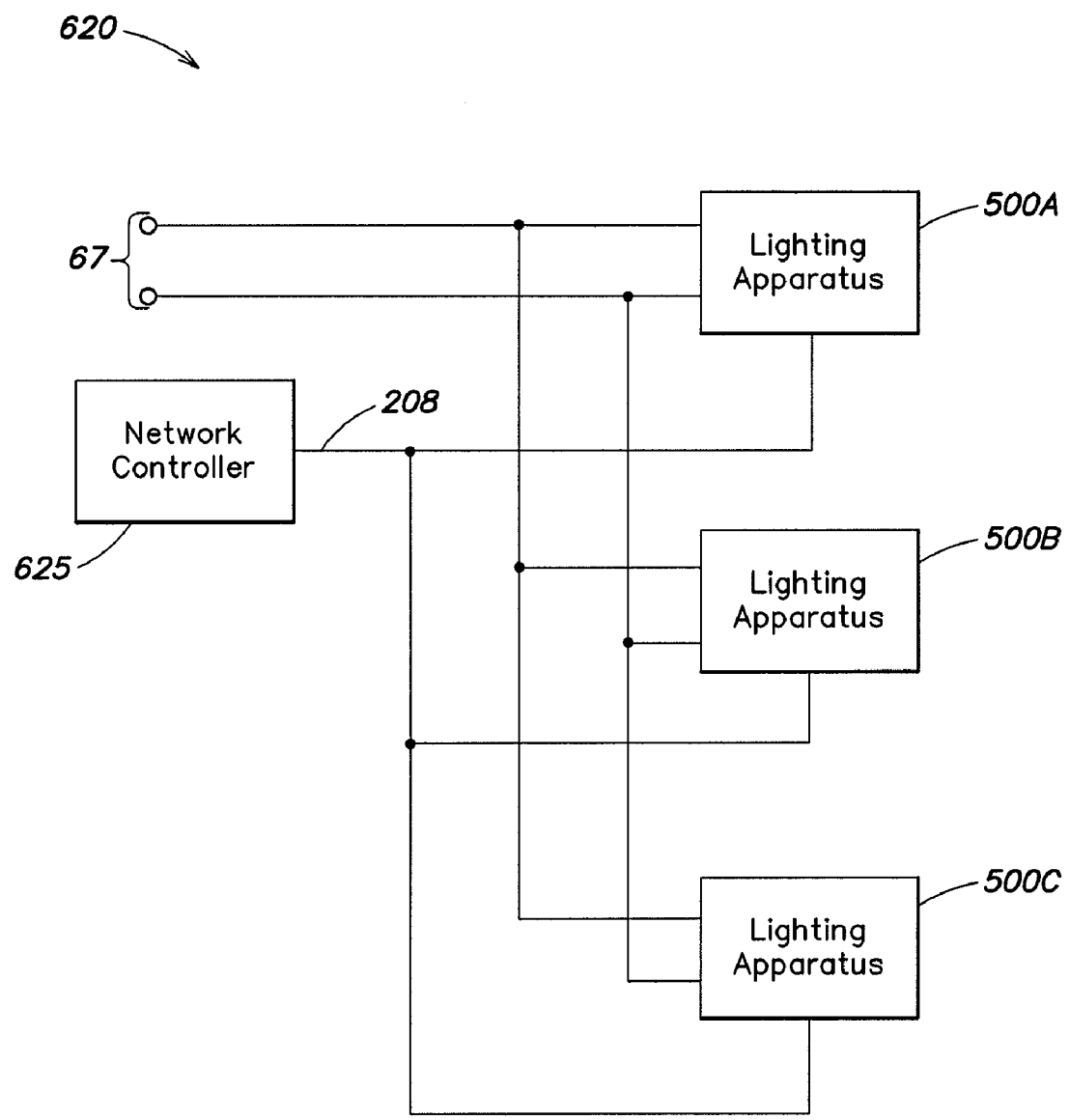
FIG. 19 is a block diagram illustrating a lighting network based on multiple lighting apparatus similar to that shown in FIG. 18, according to one embodiment of the disclosure.

FIG. 19 is a block diagram illustrating yet another embodiment of the present disclosure, based on a network configuration of multiple lighting apparatus. In the embodiment of FIG. 19, multiple lighting apparatus 500A, 500B and 500C, each similar to that shown in FIG. 18, may be coupled together to form a lighting network 620. As shown in FIG. 19, in one implementation of such a network, each lighting apparatus receives operating power from an AC line voltage 67. Additionally, multiple lighting apparatus forming the network 620 may be configured to receive commonly distributed input information 208 that may be provided, for example, from one or more network controllers 625.

In one aspect of this embodiment, as discussed above, multiple lighting apparatus forming the network 620 shown in FIG. 19 may have respective unique identifiers (e.g., addresses) such that a given lighting apparatus may be configured to be responsive to particular portions of the input information 208 (e.g., power control commands) that pertain to it. In another aspect of this embodiment, the configuration of the multiple lighting apparatus to each receive operating power in the form of an AC line voltage 67 facilitates lighting network implementations that may include significant numbers of lighting apparatus distributed over substantial distances, while nonetheless ensuring an appreciably efficient use of power across the lighting network 620. Again, it should be appreciated that while FIG. 19 illustrates three lighting apparatus 500A, 500B and 500C, the network 620 is not limited in this respect, as different numbers of lighting apparatus may be coupled together to form the network 620.

With reference again to the lighting apparatus 500 of FIG. 18, in one embodiment the load 100A may include one or more "warm" white LEDs (that generate spectrums corresponding to color temperatures in a range of approximately 2900-3300 degrees K) and the load 100B may include one or more "cool" white LEDs (that generate spectrums corresponding to color temperatures in a range of approximately 6300-7000 degrees K). By mixing different proportions of the warm and cool spectrums, a wide variety of intermediate color temperatures of white light may be generated, such that the lighting apparatus 500 provides a color temperature controllable white light source for a variety of applications. In particular, the lighting apparatus is configured with individually and independently controllable "warm and cool channels," wherein a desired power for the warm white LEDs (a "warm" power command) and a desired power for the cool white LEDs (a "cool" power command) may be specified in the input information 208 to provide a wide variety of possible color temperatures for the resulting light output by the lighting apparatus, based on mixing different proportions of respective radiation generated by the warm white LEDs and the cool white LEDs.

Regarding white light applications generally, often involving illuminating an environment to facilitate visibility of the environment and/or objects in the environment, it may be readily appreciated that under normal operation, the light output of white light sources generally does not need to change rapidly, and often is static for extended periods of time. For example, for the controllable lighting unit 500 configured to generate color temperature controllable white light according to one embodiment, other than adjusting a desired brightness and color temperature for the light output from time to time (or turning the lighting apparatus on an off), the light output is generally static in nature over significant periods of time between adjustments. Accordingly, for many white light applications, rapid and frequent changes in desired power for each channel of the lighting apparatus typically are not required.

Recall from the discussion above in connection with FIG. 10 and Eq. (1) that the instantaneous power provided by the energy storage device of a given energy transfer arrangement is time varying in nature; in particular, if the input voltage 212 ($V_{in}$) has a full-wave rectified waveform, absent any specific filtering the output voltage of a given energy transfer arrangement also has this general waveform (with a significant component varying at two times the line frequency, e.g., 120 Hz at a line frequency of 60 Hz, as well as a ripple component based on the switching frequency). With reference again to FIG. 18, without appropriate filtering, the presence in the output voltages 222A and 222B of a significant component at two times the line frequency may be perceivable in the light generated by the LED loads. Accordingly, in one aspect of this embodiment, the capacitances of the energy transfer arrangement capacitors 34A and 34B are appropriately selected to effectively mitigate any potentially adverse visibly perceivable effects of a "two-times line frequency" component. It should be appreciated that the actual choice of capacitance in a given implementation may depend at least in part on the anticipated range of output voltage for a given channel, and the number, type and configuration of LEDs constituting the load of a given channel. One exemplary implementation is discussed below in connection with FIGS. 20A-D.

Of course, the presence of suitably sized capacitors 34A and 34B on the respective channel outputs ultimately limits how fast power to each of the loads may be significantly varied (the capacitors 34A and 34B essentially create low pass filters with a cutoff frequency effectively below two-times the line frequency). However, as discussed above, for many common white light applications, dynamic changes in power for the different channels may only occur from time to time (e.g., based on a change in preference in the brightness or color temperature of overall light output) and, for the most part, light output is relatively static. Hence, rapid response of the loads to frequent and significant changes in prescribed desired load power is not generally required for many useful applications, allowing for the presence of significant bulk energy storage (appropriate capacitance) across the load to provide necessary filtering of artifacts related to line frequency.

While the foregoing discussion considers relatively static white light applications, it should be appreciated that lighting apparatus according to other embodiments of the present disclosure may include LED sources for one or more channels configured to generate other than white light. For example, multi-channel lighting apparatus having combinations of red, green, blue or other color LEDs, or colored LEDs together with white LEDs, may be implemented to provide variable color or variable color temperature light output, albeit with some limitation on the speed with which the light output may be changed (e.g., from color to color, or color temperature to color temperature). Such lighting apparatus nonetheless are useful for many lighting applications involving relatively static or gradually changing light output conditions.

One issue of note regarding bulk energy storage on the output of an energy transfer arrangement (i.e., across the load) relates to appropriate operation of the energy transfer arrangement (e.g., establishing an appropriate output voltage across the load and the output capacitor) during significant transitions from low load power to relatively higher load power for a given channel. For example, under "startup" conditions (upon powering up a lighting apparatus shown in FIG. 18), initially there is zero output voltage for each channel. For a desired load power significantly above zero power prescribed for a given channel (e.g., represented by the input information 208), and starting from zero output conditions, the energy transfer element (e.g., inductor or transformer) for each channel may be unable to unload all of its energy in one switching cycle in the presence of a significant output capacitance (i.e., the converter may operate temporarily in continuous mode). This situation also may exist occasionally during normal operation, for transitions between relatively low load power states (dim light output) to significantly higher load power states (bright light output) for a given channel.

Abrupt transitions between zero or low load power states and higher load power states may be addressed in various manners. For example, in one implementation, the input current drawn by the energy transfer element (e.g., the input current through the primary winding of a transformer) may be sensed and compared to a predetermined threshold representing an over-current condition (which may be monitored, for example, by the processor 250 of the switch controller 204-1 of FIG. 18). Upon detection of an over-current condition in a given channel (i.e., during significant transitions between low and high load power states), the processor may be configured to control the switch for the channel such that, for some number of switching cycle periods T, the switch remains open (i.e., the time interval $t_{on}$ is skipped for some number of switching cycles), allowing any energy stored in the inductor/transformer to be more fully unloaded (e.g., to charge up the output capacitor). One exemplary circuit implementation employing such an over-current detection scheme is discussed further below in connection with FIGS. 20A-20D (see FIG. 20B).

In another implementation to address start-up or low-to-high power transition issues in connection with output bulk energy storage, such transitions may be deliberately slowed based on modifications to the input information 208 so as to always be below the rate which causes excessive current buildup in the energy storage element of an energy transfer arrangement. For example, consider a lighting command format for the input information 208, wherein a prescribed desired power for each channel is specified in terms of a percentage of the total available operating power for the channel, or relative power with respect to some maximum (i.e., 0-100% for each channel; recall the discussion of $P_{rms}/P_{max}$ in connection with Eqs. (14) and (15)). Hence, an exemplary lighting command received as the input information 208 for a two-channel lighting apparatus 500 of FIG. 18, having the format [C1, C2]=[100%, 100%] would cause the exemplary lighting apparatus to generate maximum radiant output power for each channel. A command of the format [C1, C2]= [50%, 50%] would generate light perceived as less bright than the light generated in response to the former command, and a command of the format [C1, C2]=[0,0] would generate no light.

Based on the foregoing, according to one embodiment, the processor 250 may be configured such that, for a given channel, successive incoming commands indicating an increase in desired load power are digitally filtered to mollify such transitions. For example, consider only the first channel for a moment, wherein a first lighting command [C1, C2]=[25%, X] is received as input information 208, followed immediately by a second lighting command [C1, C2]=[75%, X], indicating that an increase in load power for the first channel is desired. Rather than control the corresponding switch for the first channel to implement an immediate transition from 25% to 75% load power, the processor 250 may be configured to make this transition over some appropriate time period so as to mitigate continuous mode operation of the energy transfer arrangement. In one implementation, the processor may accomplish this by modifying incoming lighting commands so as to insert commands representing intervening load powers, and then processing the modified sequence of lighting commands to ultimately control switching operations for one or more channels.

For example, consider a processor configured with a digital filter such that an increasing power for a given channel between any two successive incoming lighting commands received as input information 208 (e.g., the first and second lighting commands given above) is divided into some number of intervals, say five intervals for purposes of illustration. Such a filter would generate a modified sequence of six lighting commands, based on the first and second lighting commands received above, as follows:

1) [C1, C2]=[25%, X]
2) [C1, C2]=[35%, X]
3) [C1, C2]=[45%, X]
4) [C1, C2]=[55%, X]
5) [C1, C2]=[65%, X]
6) [C1, C2]=[75%, X]

Thereafter, the processor 250 would process the modified sequence of six commands, rather than merely the first and second lighting commands, so as to effect a more gradual transition of increasing load power for the first channel. A similar methodology may be employed for other channels of a lighting apparatus. Again, it should be appreciated that the foregoing example based on dividing an increasing power transition into five intervals is provided primarily for purposes of illustration, and that an actual number of intervals (and resulting time period) for decreasing a transition rate between increasing load powers may be determined based at least in part on the actual nature of the load and output capacitance values employed in a given implementation of a lighting apparatus.

FIGS. 20A, 20B, 20C, and 20D are diagrams illustrating circuit details of a lighting apparatus according to another embodiment of the disclosure, based on the general block diagram of FIG. 18. While the embodiment of FIGS. 20A-20D includes several additional circuit details not shown in FIG. 18, those circuit components discussed in earlier figures are indicated in FIGS. 20A-20D with the same reference numerals.

Figures 1, 20A:
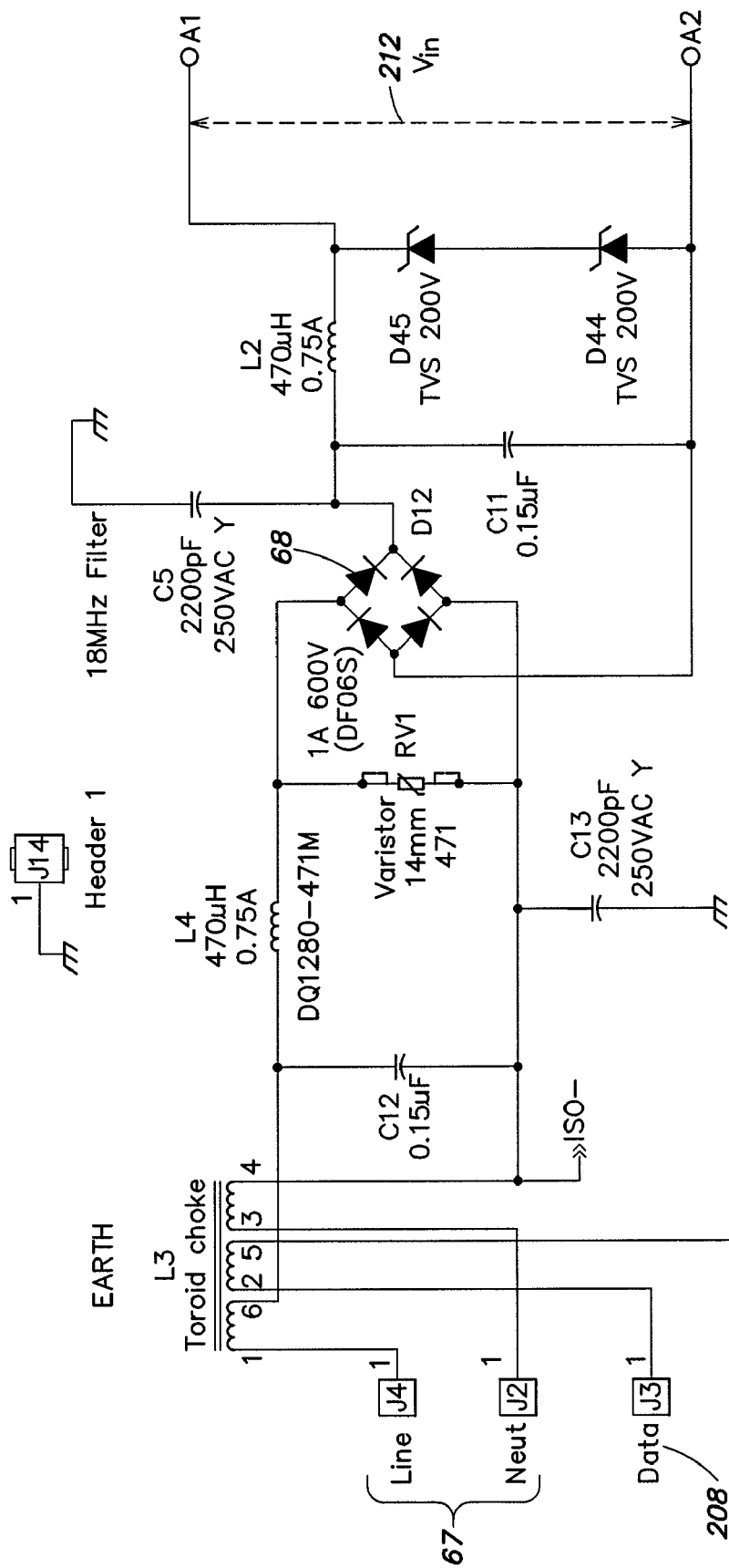
FIGS. 20A, 20B, 20C and 20D are diagrams illustrating circuit details of a multiple channel lighting apparatus according to another embodiment of the disclosure, based on the general block diagram of FIG. 18.
Figures 2, 20A:
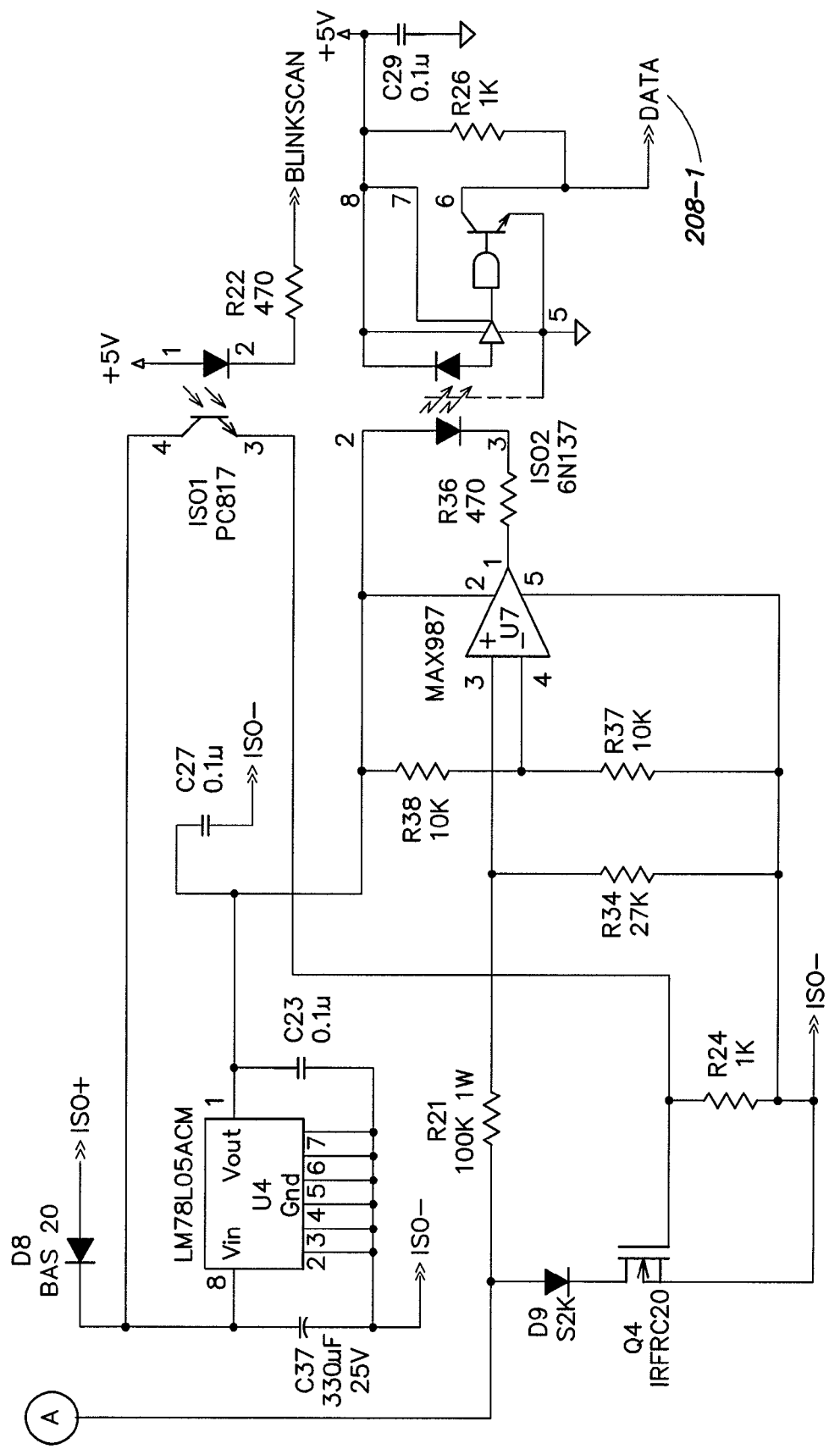
Figures 1, 20B:
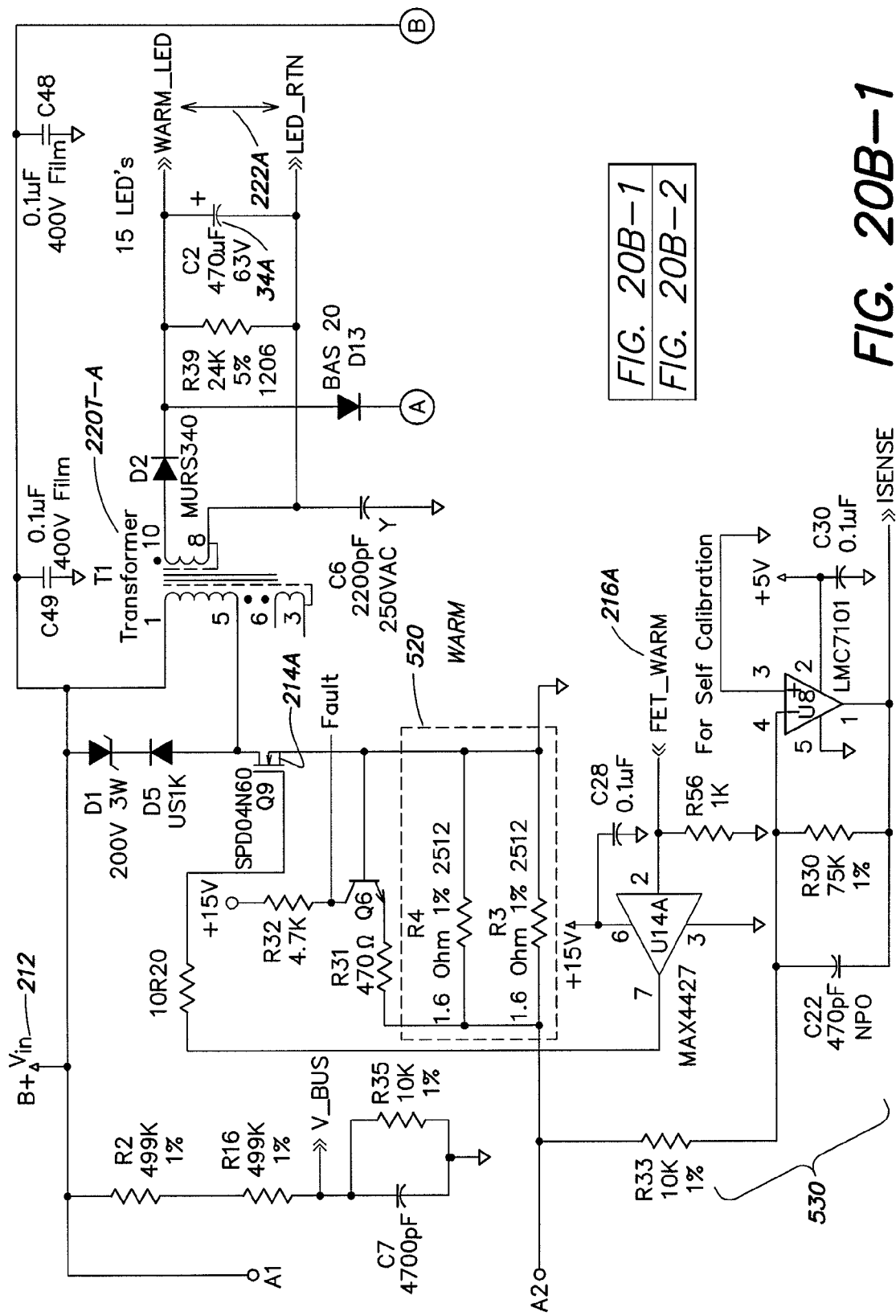
Figures 2, 20B:
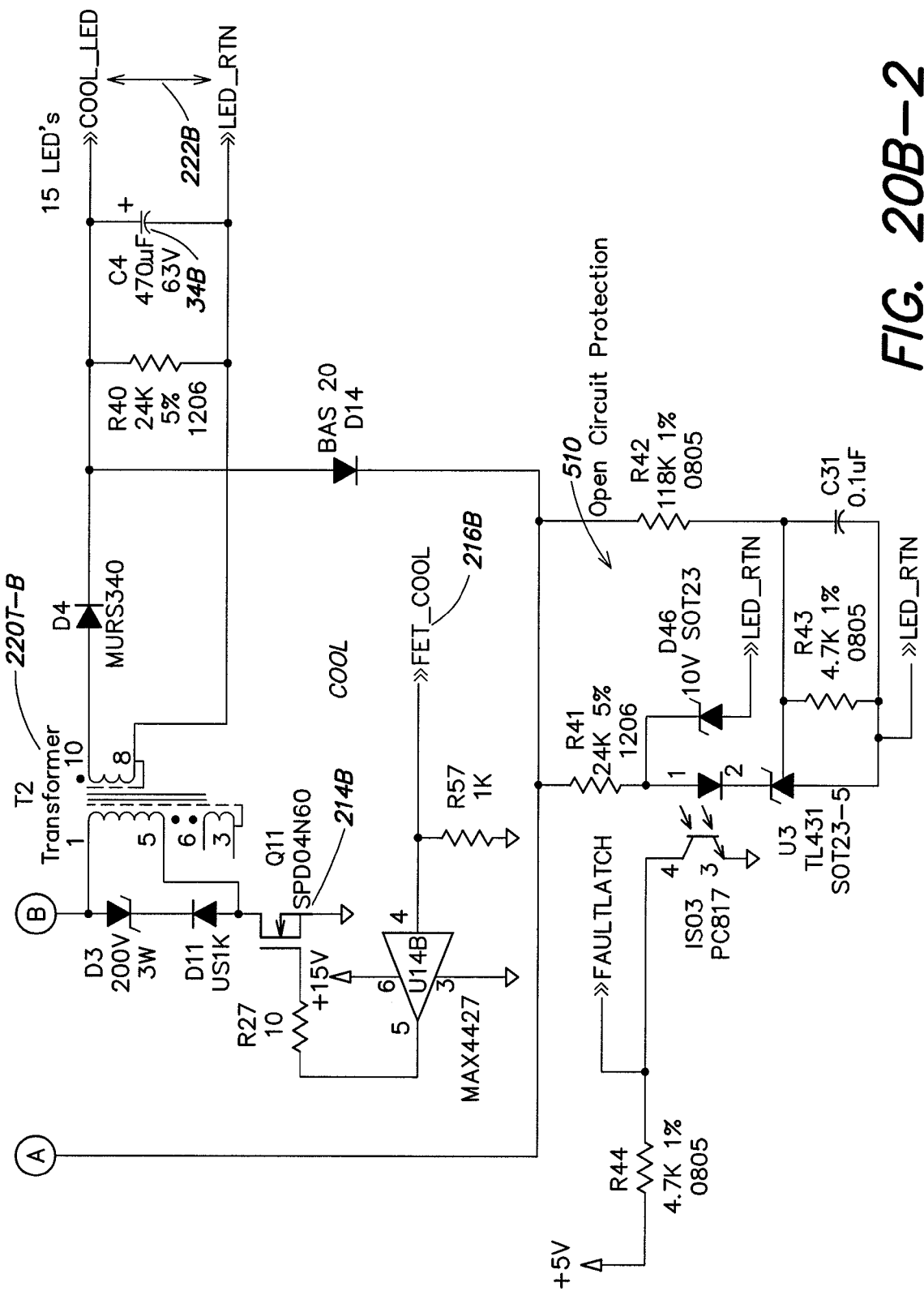
Figure 20C:
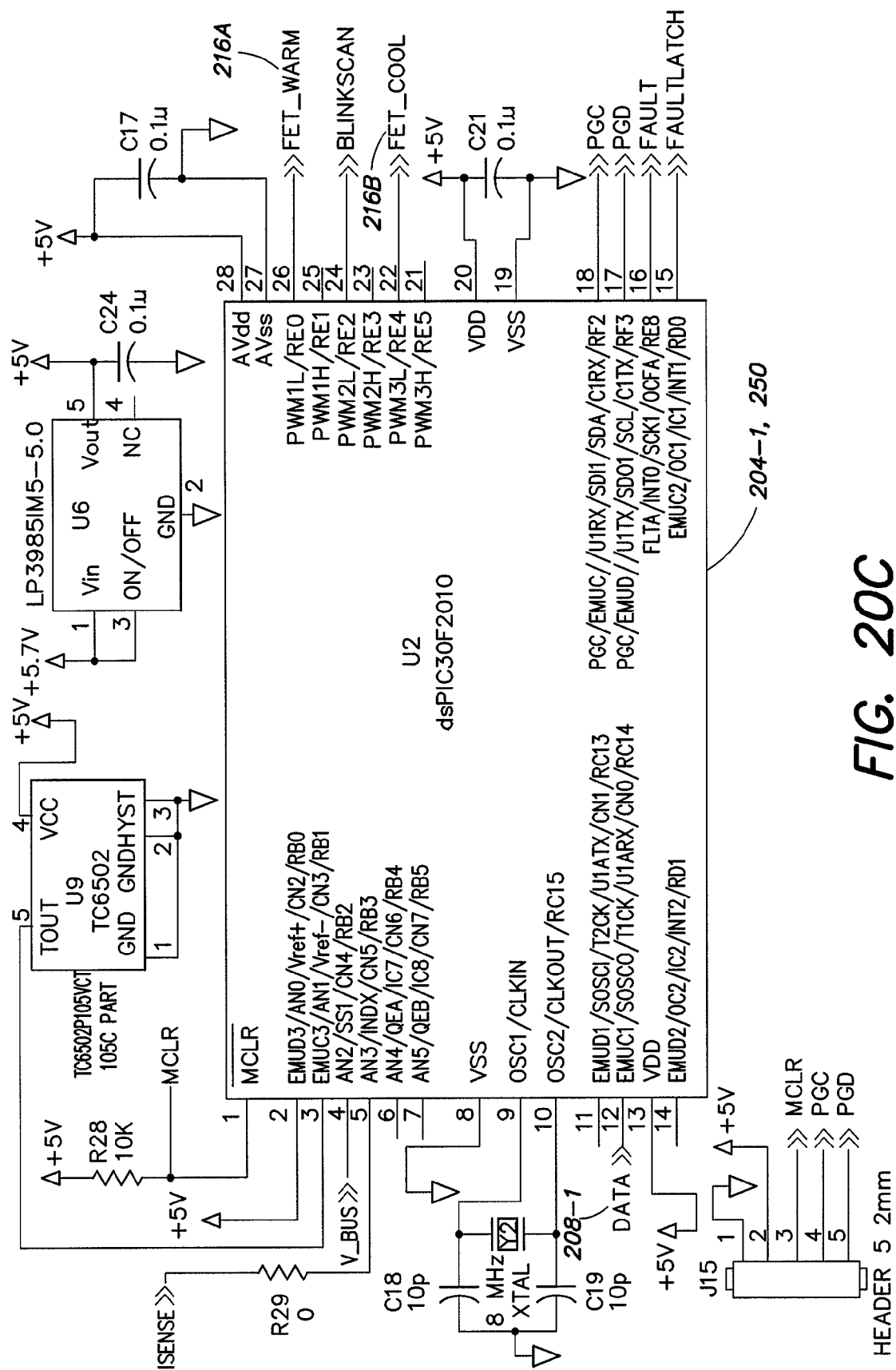
Figure 20D:
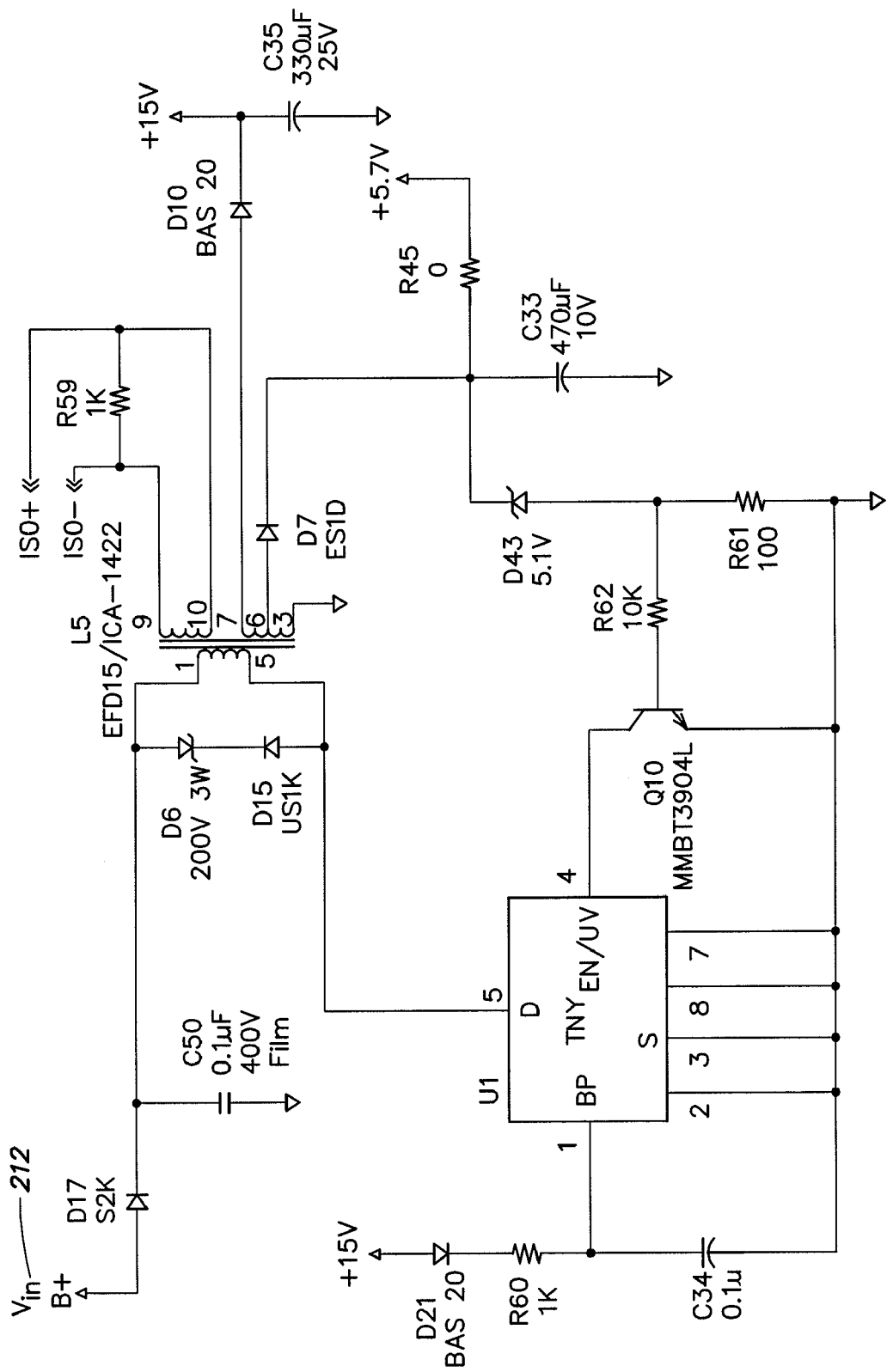

With respect to general areas of functionality, FIG. 20A illustrates connections for the AC line voltage 67 and a DATA line to which signals representing the input information 208 may be coupled. The bridge rectifier 68 also is illustrated in FIG. 20A, together with several high frequency filtering components (discussed further below), and the voltage 212 ($V_{in}$) is indicated between the nodes A1 and A2 in FIG. 20. The bottom of FIG. 20A illustrates various circuitry associated with the DATA line. In FIG. 20B, on the left side, the nodes A1 and A2 are again indicated as connection points to FIG. 20A at the voltage 212 ($V_{in}$), which is also indicated with the designation B+ (see top left of FIG. 20B). FIG. 20B essentially illustrates circuit details of two switching channels of the lighting apparatus, including a "warm" channel constituted primarily by the switch control signal 216A (FET_WARM), the switch 214A (Q9) and the transformer 220T-A (T1) along with other associated components, and a "cool" channel constituted primarily by the switch control signal 216B (FET_COOL), the switch 214B (Q11) and the transformer 220T-B (T2) along with other associated components. FIG. 20C generally illustrates the switch controller 204-1 implemented as a processor 250 with various associated input and output signal connections (including the switch control signals 216A and 216B and a data input signal 208-1), and FIG. 20D generally illustrates power supply components for providing various DC voltages for circuit operation derived from the input voltage 212 (again, indicated as B+ in the circuit drawings).

With respect to drawing power from an AC source, like other embodiments discussed above the lighting apparatus of FIGS. 20A-20D does not employ any bulk energy storage directly on the output of the bridge rectifier 68 shown in FIG. 20A (so as to provide filtering based on the line frequency itself). However, as shown in FIGS. 20A and 20B, the lighting apparatus may include several components to facilitate a reduction of undesirable electromagnetic interference due to the higher frequency switching operations, such that these artifacts do not adversely affect the line voltage 67. To this end, the lighting apparatus may employ multiple stages of high frequency filtering, constituted at least in part by the capacitors C48 and C49 illustrated in FIG. 20B, and the capacitors C5, C11, C12 and C13, the inductors L2 and L4, the varistor RV1, the diodes D44 and D45, and the toroid choke L3 shown in FIG. 20A. In one aspect, the toroid choke L3 includes three windings (rather than the conventional two windings), so that signals on data line DATA (e.g., some of which may represent the input information 208) may be passed through the toroid to reduce interference on the data path. In another aspect, the toroid choke L3 may be further optimized to use an extremely high permeability ferrite (e.g., μ>5000), and a small number of tri-filiar co-wound turns.

In another aspect, the DATA line of the lighting apparatus shown in FIG. 20A may be bidirectional, such that signals on the DATA line may not only include the input information 208 specifying the desired load powers to control the apparatus, but also one or more output signals from the lighting apparatus (e.g., for networking, status, handshaking purposes, etc.). To this end, as shown at the bottom of FIG. 20A, the DATA line is coupled to various circuitry powered by an isolated source of power (ISO+, ISO−) (see FIG. 20D), for processing received signals from which the input information 208 may be extracted and for transmitting one or more signals from the apparatus. In particular, incoming signals on the DATA line pass through IC U7, optoisolator ISO2 and other logic components to provide a conditioned input data signal 208-1, which is provided as an input to the processor 250 shown in FIG. 20C. The processor 250 shown in FIG. 20C also provides as a data output (on pin 24) a signal labeled as BLINK-SCAN which, as shown in FIG. 20A, operates an optoisolator ISO1 which in turn drives the DATA line to an isolated logic low level to provide a bit of data for a signal transmitted from the apparatus.

Turning again to FIG. 20B, according to one embodiment each channel of the lighting apparatus is implemented as a flyback converter configuration, wherein the warm channel flyback converter employs transformer T1, diode D2, and capacitor C2 (also labeled with reference numeral 34A) across which the output voltage 222A is provided, and the cool channel flyback converter employs transformer T2, diode D4 and capacitor C4 (also labeled with reference numeral 34B) across which the output voltage 222B is provided. In one exemplary implementation, each channel is configured to drive a load comprising fifteen LEDs. As discussed above, capacitance values for the capacitors 34A and 34B are selected based at least in part on the number and type of LEDs employed for each channel and expected ranges of output voltages based on the number and type of LEDs.

More specifically, in one implementation, each LED has a forward voltage of about 3.5 Volts at about 350 milliamperes of current, and a series resistance of about 1 ohm (i.e., fifteen LEDs in series for a given channel has a net resistance of about 15 ohms). Using a capacitance value of 470 micro Farads for the capacitors 34A and 34B results in a time constant $\tau=(1.1)RC$ of about 7.8 milliseconds, corresponding to a cutoff frequency of about 130 Hz, which is sufficient to reduce visible artifacts at approximately two times the line frequency. The resistors R39 and R40 facilitate a "ramp down" of the light output generated in each channel, especially at relatively low output powers (LEDs are quite efficient at low power, and may glow a bit for several seconds after power to a channel is turned off).

As noted above, due to the bulk energy storage on the output of each channel, abrupt transitions from lower to higher load powers generally should be avoided (to mitigate unintentional operation of the converters in continuous mode). To this end, in one aspect of the apparatus illustrated in FIGS. 20A-20D, the input current drawn by the energy transfer element (e.g., the input current through the primary winding of a transformer) for one or more channels may be sensed and compared to a predetermined threshold representing an over-current condition (or the onset of continuous mode operation). For example, with reference to FIG. 20B, a current sensor 520, constituted by precision resistors R3 and R4, may be placed in a path of current representing a net current through both the "warm" and "cool" channels at any given time. A voltage across the current sensor 520 increases with increased current through the sensor 520. There is some magnitude of peak current through the sensor 520 (and hence some peak voltage across the sensor 520) which corresponds to an onset of continuous mode operation or an over-current condition. Accordingly, transistor Q6 and resistors R31 and R32 are employed to generate a FAULT signal (low activated) when the peak voltage across the sensor 520 indicates such an over-current condition, which may be monitored by the processor 250 (see pin 16 of the processor in FIG. 20C). In another aspect of this embodiment, the processor may be configured to control the switch for the corresponding channel in response to a detected FAULT signal such that, for some number of switching cycle periods T, the switch remains open (i.e., the time interval $t_{on}$ is skipped for some number of switching cycles), allowing any energy stored in the inductor/transformer to be more fully unloaded (e.g., to charge up the output capacitor). This mechanism may be employed by the processor 250 alone or in combination with digital filtering of incoming lighting commands provided by the input information 208, as discussed above, so as to mollify potentially abrupt increases in desired load power for one or more channels.

In yet another aspect of the exemplary lighting apparatus shown in part in FIG. 20B, the voltage developed across the current sensor 520 may be appropriately scaled and low pass filtered by circuitry 530 to provide an output signal ISENSE representing an average current $I_{rms}$ drawn by a given channel. This signal ISENSE may be monitored by the processor 250 (e.g., via pin 5 of the processor depicted in FIG. 20C). Since the processor makes a periodic determination of $V_{rms}$ via measurements of $V_{in}$, the processor may use the ISENSE signal representing $I_{rms}$ in conjunction with a determination of $V_{rms}$ to calculate an average power $P^*_{rms}$ actually being drawn by a given channel. In one aspect, during operation, the processor may be configured to compare periodic determinations of $P^*_{rms}$ to some target maximum power limit $P_{max}$ for purposes of detecting an over-current condition or continuous mode operation, as discussed above. In another aspect, the actual average power $P^*_{rms}$ being drawn by a given channel may be used during an initial set-up of the lighting apparatus (e.g., by the manufacturer), or periodically during operation in the field, to determine appropriate calibration parameters for the lighting apparatus.

More specifically, to determine calibration parameters for the lighting apparatus, for a given channel a maximum input command is provided as input information, i.e., specifying 100% of available load power for the channel, while all other channels remain off (zero power). With reference again to Eq. (18) above, at a maximum input command, $t_{on}$ may be initially determined with the switching frequency set to a maximum frequency $f_{Max}$ and an initial value specified for the parameter $2LP_{max}$ (e.g., stored in memory, such as EEPROM), based on an inductance L of the transformer primary winding for the channel, and a nominal value for $P_{max}$ representing a target maximum channel power pursuant to various design criteria. With the channel operating based on $t_{on}$ thusly calculated and the maximum switching frequency $f_{max}$, the processor may then monitor the signal ISENSE to determine the actual average power $P^*_{rms}$ being drawn by the channel, and compare this value to the target maximum channel power $P_{max}$. If the processor determines that $P^*_{rms}$ is less than the target maximum channel power $P_{max}$, the processor may appropriately adjust the value for the parameter $2LP_{max}$ and recalculate the time interval $t_{on}$ based on Eq. (18) using the adjusted value for $2LP_{max}$. The processor may continue this process iteratively until the actual average power drawn $P^*_{rms}$ is essentially equal to the target maximum channel power $P_{max}$, and store in memory (e.g., EEPROM) the adjusted value of the parameter $2LP_{max}$ required for this equality, to be used in subsequent determinations of $t_{on}$ in response to arbitrary power commands. In this manner, the value of $2LP_{max}$ used during normal operation to calculate $t_{on}$ based on Eq. (18) may be determined as a calibration value during an initial manufacturing set-up procedure of the apparatus, and optionally recalculated from time to time during operation of the apparatus in the field.

As discussed above, generally under normal operation, in the lighting apparatus of FIGS. 20A-20D no feedback information relating to the load is required to control switching operations to provide a specified and variable desired load power to the load for each channel. Rather, input information 208 present on the DATA line, and received by the processor 250 as the conditioned input data signal 208-1, represents the desired load power for each channel and is used by the processor in a "feed-forward" manner to primarily determine the duty cycle and/or effective switching frequency of each channel's switch. The only other information normally required by the processor to control switching operations is $V_{rms}$ (see Eqs. (9), (10) and (18)), which the processor obtains by periodically sampling the voltage $V_{in}$ via the signal V_BUS; this signal is obtained via the resistors R2 and R16 shown on the top left of FIG. 20B, and is provided as an input to the processor 250 shown in FIG. 20C (via pin 4 of the processor).

In one aspect of this embodiment, however, as shown in FIG. 20B, the lighting apparatus may employ open circuit protection circuitry 510 to monitor each channel's output voltage solely to determine an open circuit condition (e.g., in the event of LED failure or, more generally, the absence of a load coupled to the transformer secondary). In the event of an open circuit condition (i.e., the load is unable to draw current from the transformer secondary), if normal switching operations continued uninterrupted, the energy transfer arrangements for each channel would continue trying to provide a prescribed power and, at some point, this would result in component failure of one or more components of the energy transfer arrangement. Accordingly, in one implementation, as shown in FIG. 20B, the output voltage of each channel may be monitored by the open circuit protection circuitry 510 (e.g., via the diodes D13 and D14) and compared to a predetermined maximum reference voltage (e.g., as determined by the resistors R42 and 43). If the monitored voltages exceed the maximum reference voltage, the circuitry 510 forces the signal FAULTLATCH (output of optoisolator ISO3) to a logic low level, which is in turn monitored by the processor 250 (see FIG. 20C, processor pin 15). Upon detection of the FAULTLATCH signal, the processor may cause both channels to cease switching operations altogether, so as to protect other circuit components of the energy transfer arrangements. In this manner, it should be appreciated that the feedback provided by the open circuit protection circuitry is not employed to facilitate normal operation of the apparatus (i.e., controlling switching operations to provide specified desired load powers), but rather to shut down the apparatus entirely in the event of an open load condition for any channel.

In implementations in which the open circuit protection circuitry 510 is employed, this circuitry naturally draws some power from the energy transfer arrangements to which it is coupled. As a result, the power drawn by the circuitry 510 may in some cases affect the accuracy of power delivered to the respective loads, especially if the desired load power specified by the input information is itself relatively low; essentially, the power drawn by the circuitry 510 constitutes some constant offset between the specified and actual load power for each channel. Accordingly, to account for the presence of the open circuit protection circuitry and the corresponding power drawn by this circuitry from the energy transfer arrangements, the processor 250 may be configured to add an appropriate constant C to the calculation of $t_{on}$ given in Eq. (9) or Eq. (18) according to:

$$t_{on} = \frac{1}{V_{rms}} \cdot \sqrt{\frac{1}{f_{eff}}} \cdot \sqrt{2LP_{max}} \cdot (\sqrt{\text{power command}} + C), \quad (21)$$

where, as discussed above, the power command represents a desired channel power in relative terms of $P_{rms}/P_{max}$. Based on the foregoing, it should be appreciated that the relationship given above in Eq. (21) may be used in place of Eqs. (9) or (18) in any of the processes or procedures described herein to more accurately model the operation of an apparatus according to the present disclosure employing open circuit protection circuitry.

Having thus described several illustrative embodiments, it is to be appreciated that various alterations, modifications, and improvements will readily occur to those skilled in the art. Such alterations, modifications, and improvements are intended to be part of this disclosure, and are intended to be within the spirit and scope of this disclosure. While some examples presented herein involve specific combinations of functions or structural elements, it should be understood that those functions and elements may be combined in other ways, based on the general teachings of the present disclosure, to accomplish the same or different objectives. In particular, acts, elements, and features discussed in connection with one embodiment are not intended to be excluded from similar or other roles in other embodiments. Accordingly, the foregoing description and attached drawings are by way of example only, and are not intended to be limiting.

The invention claimed is:

1. A lighting apparatus, comprising:
at least a first load that includes at least one first LED-based light source; and
a switching power supply including a first single switching stage for the first load, the switching power supply configured to provide power factor correction and a first load power to the first load via control of the first single switching stage,
wherein the switching power supply further is configured to control the first single switching stage to provide the first load power without monitoring or regulating a first load current or a first load voltage associated with the first load, the switching power supply further comprising a rectifier configured to be coupled to an A.C. voltage source and provide as an output a rectified voltage waveform; and at least one controller configured to control first switching operations of the first single switching stage,
wherein the first single switching stage comprises at least a first energy transfer arrangement configured to provide the first load power to the first load based on a periodic coupling of the rectified voltage waveform to the first energy transfer arrangement, and
wherein the at least one controller is configured to control first switching operations of the first single switching stage to implement the periodic coupling of the rectified voltage waveform to the first energy transfer arrangement and the provision of the first load power to the first load.

2. The apparatus of claim 1, wherein the at least one first LED-based light source is configured to generate essentially white light.

3. The apparatus of claim 2, wherein the at least one first LED-based light source includes at least one white LED.

4. The apparatus of claim 1, wherein the switching power supply further is configured to control the first single switching stage such that a power factor associated with the apparatus is approximately or equal to unity.

5. The apparatus of claim 1, wherein the first energy transfer arrangement includes a plurality of components arranged in a flyback converter configuration.

6. The apparatus of claim 1, wherein the at least one controller is configured to control the first switching operations such that the first single switching stage operates in a discontinuous mode.

7. The apparatus of claim 1, wherein the at least one controller is configured to control the first switching operations based at least in part on at least one of the rectified voltage waveform and a current drawn from the rectifier.

8. The apparatus of claim 7, wherein the at least one controller further is configured to control the first switching operations based at least in part on first information representing a first desired load power for the first load.

9. The apparatus of claim 8, wherein:
the first information includes a first lighting command representing a first value for the first desired load power during a first time period and a second lighting command representing a second value for the first desired load power during a second time period immediately following the first time period, wherein the second value is greater than the first value; and
the at least one controller is configured to control the first switching operations so as to gradually increase the first load power from the first value to the second value via at least one intervening value between the first value and the second value.

10. The apparatus of claim 9, wherein the at least one controller is configured to process the first and second lighting commands so as to generate at least one additional lighting command representing the at least one intervening value.

11. The apparatus of claim 8, wherein the at least one controller is configured to control at least one of a duty cycle and a frequency of the first switching operations.

12. The apparatus of claim 11, wherein:
the at least one controller is configured to control the duty cycle and the frequency of the first switching operations; and
the at least one controller is further configured to apportion respective weights associated with the duty cycle and the frequency of the first switching operations based at least in part on the first information representing the first desired load power.

13. The apparatus of claim 12, wherein the at least one controller is configured to equally apportion the weights associated with the duty cycle and the frequency of the first switching operations.

14. The apparatus of claim 12, wherein a first parameter $t_{gain}$ represents the duty cycle as a percentage of a maximum duty cycle, wherein a second parameter $t_{gain}$ represents the frequency as a percentage of a maximum frequency, and wherein the at least one controller is configured to apportion the weights associated with the duty cycle and the frequency such that a product given by $(t_{gain})^2$ multiplied by $f_{gain}$ is less than or equal to one.

15. The apparatus of claim 12, wherein a first parameter $t_{gain}$ represents the duty cycle as a percentage of a maximum duty cycle, wherein a second parameter $f_{gain}$ represents the frequency as a percentage of a maximum frequency, and wherein the at least one controller is configured to apportion the weights associated with the duty cycle and the frequency such that $(t_{gain})^2 = f_{gain}$.

16. The apparatus of claim 1, further comprising:
a second load that includes at least one second LED-based light source,
wherein the switching power supply includes a second single switching stage for the second load, the switching power supply configured to provide the power factor correction, the first load power, and a second load power to the second load via control of the second single switching stage, and
wherein the at least one controller is configured to control the second single switching stage to provide the second load power without monitoring or regulating a second load current or a second load voltage associated with the second load.

17. The apparatus of claim 16, wherein the second single switching stage comprises:
a second energy transfer arrangement configured to provide the second load power to the second load based on a second periodic coupling of the rectified voltage waveform to the second energy transfer arrangement,
wherein the at least one controller is configured to control second switching operations of the second single switching stage to implement the second periodic coupling of the rectified voltage waveform to the second energy transfer arrangement and the provision of the second load power to the second load.

18. The apparatus of claim 17, wherein the at least one controller is configured to independently control the first switching operations and the second switching operations based at least in part on first information representing a first desired load power and second information representing a second desired load power.

19. The apparatus of claim 18, wherein:
the at least one first LED-based light source includes at least one first LED configured to generate first radiation having a first spectrum; and
the at least one second LED-based light source includes at least one second LED configured to generate second radiation having a second spectrum different from the first spectrum.

20. The apparatus of claim 19, wherein the at least one controller is configured as an addressable device so as to facilitate control of the apparatus via a network.

21. The apparatus of claim 19, wherein the at least one first LED includes at least one first white LED.

22. The apparatus of claim 21, wherein the at least one second LED includes at least one second white LED.

23. The apparatus of claim 22, wherein the at least one controller is configured as an addressable device so as to facilitate control of the apparatus via a network.

24. The apparatus of claim 1, wherein the switching power supply further comprises:
open circuit protection circuitry configured to detect an open circuit condition representing an absence or a failure of at least the first load, wherein the switching power supply further is configured to interrupt operation of at least the first single switching stage upon detection of the open circuit condition.

25. A lighting method, comprising acts of:
A) generating first light from a first load including at least one first LED-based light source; and
B) providing power factor correction and a first load power to the first load via control of a first single switching stage without monitoring or regulating a first load current or a first load voltage associated with the first load,
wherein the first single switching stage includes a first energy transfer arrangement, and wherein the act B) further comprises an act of:
B1) controlling first switching operations of the first switching stage so as to periodically couple a rectified voltage waveform to the first energy transfer arrangement.

26. The method of claim 25, wherein the act A) comprises an act of:
generating essentially white light from the at least one first LED-based light source.

27. The method of claim 25, wherein the act B) comprises an act of:
controlling the first single switching stage such that a power factor associated with the first single switching stage is approximately or equal to unity.

28. The method of claim 25, wherein the first energy transfer arrangement includes a plurality of components arranged in a flyback converter configuration.

29. The method of claim 25, wherein the act B1) comprises an act of:
controlling the first switching operations such that the first single switching stage operates in a discontinuous mode.

30. The method of claim 25, wherein the act B1) comprises an act of:
B2) controlling the first switching operations based at least in part on at least one of the rectified voltage waveform and a current associated with the rectified voltage waveform.

31. The method of claim 25, wherein the act B1) comprises an act of:
B3) controlling the first switching operations based at least in part on first information representing a first desired load power for the first load.

32. The method of claim 31, wherein:
the first information includes a first lighting command representing a first value for the first desired load power during a first time period and a second lighting command representing a second value for the first desired load power during a second time period immediately following the first time period, wherein the second value is greater than the first value; and
the act B3) comprises an act of:
B4) controlling the first switching operations so as to gradually increase the first load power from the first value to the second value via at least one intervening value between the first value and the second value.

33. The method of claim 32, wherein the act B4) comprises an act of:
processing the first and second lighting commands so as to generate at least one additional lighting command representing the at least one intervening value.

34. The method of claim 31, wherein the act B3) comprises an act of:
B5) controlling at least one of a duty cycle and a frequency of the first switching operations.

35. The method of claim 34, wherein the act B5) comprises acts of:
B6) controlling the duty cycle and the frequency of the first switching operations; and
B7) apportioning respective weights associated with the duty cycle and the frequency of the first switching operations based at least in part on the first information representing the first desired load power.

36. The method of claim 35, wherein the act B7) comprises an act of:
   equally apportioning the weights associated with the duty cycle and the frequency of the first switching operations.

37. The method of claim 35, wherein a first parameter $t_{gain}$ represents the duty cycle as a percentage of a maximum duty cycle, wherein a second parameter $f_{gain}$ represents the frequency as a percentage of a maximum frequency, and wherein the act B7) comprises an act of:
   apportioning the weights associated with the duty cycle and the frequency such that a product given by $(t_{gain})^2$ multiplied by $f_{gain}$ is less than or equal to one.

38. The method of claim 35, wherein a first parameter $t_{gain}$ represents the duty cycle as a percentage of a maximum duty cycle, wherein a second parameter $f_{gain}$ represents the frequency as a percentage of a maximum frequency, and wherein the act B7) comprises an act of:
   apportioning the weights associated with the duty cycle and the frequency such that $(t_{gain})^2 = f_{gain}$.

39. The method of claim 25, further comprising acts of:
   C) generating second light from a second load including at least one second LED-based light source; and
   D) providing a second load power to the second load via control of a second single switching stage without monitoring or regulating a second load current or a second load voltage associated with the second load.

40. The method of claim 39, wherein the second single switching stage includes a second energy transfer arrangement, and wherein the act D) further comprises an act of:
   D1) controlling second switching operations of the second switching stage so as to periodically couple the rectified voltage waveform to the second energy transfer arrangement.

41. The method of claim 40, wherein the act D1) comprises an act of:
   independently controlling the first switching operations and the second switching operations based at least in part on first information representing a first desired load power and second information representing a second desired load power.

42. The method of claim 41, wherein:
   the at least one first LED-based light source includes at least one first LED configured to generate first radiation having a first spectrum; and
   the at least one second LED-based light source includes at least one second LED configured to generate second radiation having a second spectrum different from the first spectrum.

43. The method of claim 42, wherein the at least one first LED includes at least one first white LED.

44. The method of claim 43, wherein the at least one second LED includes at least one second white LED.

45. The method of claim 25, further comprising acts of:
   detecting an open circuit condition representing an absence or a failure of at least the first load; and
   interrupting operation of at least the first single switching stage upon detection of the open circuit condition.

* * * * *